United States Patent [19]

Mahoney

[11] Patent Number: 5,280,547
[45] Date of Patent: Jan. 18, 1994

[54] DENSE AGGREGATIVE HIERARHICAL TECHNIQUES FOR DATA ANALYSIS

[75] Inventor: James V. Mahoney, Sunnyvale, Calif.

[73] Assignee: Xerox Corporation, Stamford, Conn.

[21] Appl. No.: 535,796

[22] Filed: Jun. 8, 1990

[51] Int. Cl.$^5$ .................................................. G06K 9/00
[52] U.S. Cl. ........................................ 382/49; 382/37
[58] Field of Search ........................... 382/49, 37, 56; 364/131, 133; 395/162

[56] References Cited

U.S. PATENT DOCUMENTS

| | | | |
|---|---|---|---|
| 4,174,514 | 11/1979 | Sternberg | 340/146.3 |
| 4,224,600 | 9/1980 | Sellner | 340/146.3 |
| 4,363,104 | 12/1982 | Nussmeier | 364/515 |
| 4,507,726 | 3/1985 | Grinberg et al. | 364/200 |
| 4,601,055 | 7/1986 | Kent | 382/49 |
| 4,622,632 | 11/1986 | Tanimoto et al. | 364/200 |
| 4,758,980 | 7/1988 | Tsunekawa et al. | 364/900 |
| 4,802,090 | 1/1989 | Mattheyses | 364/200 |
| 4,809,346 | 2/1989 | Shu | 382/49 |
| 4,850,027 | 7/1989 | Kimmel | 382/49 |
| 4,860,201 | 8/1989 | Stolfo et al. | 364/200 |
| 5,022,091 | 6/1991 | Carlson | 382/49 |
| 5,193,125 | 3/1993 | Mahoney | 382/41 |

FOREIGN PATENT DOCUMENTS 245508 10/1986 European Pat. Off. ...... G06K 9/36

OTHER PUBLICATIONS

Mahoney, J. V., "Exhaustive Directional Neighbor Linking and its Role in Image Analysis," *Canadian Psychology/Psychologie canadienne*, May 1989, vol. 30, No. 2a, p. 440.

Mahoney, J. V., *Image Chunking: Defining Spatial Building Blocks for Scene Analysis*, Master of Science thesis, MIT Dept. of Electrical Eng. and Computer Sci., 1987.

Miller, R., and Stout, Q. F., "Simulating Essential Pyramids," *IEEE Transactions on Computers*, vol. 37, No. 12, Dec. 1988, pp. 1642–1648.

Frederickson, P. O., and McBryan, O. A., "Parallel Superconvergent *Multigrid Methods: Theory, Applications and Supercomputing*", McCormick, Marcel-Dekker, Apr. 1988, pp. 195–210.

(List continued on next page.)

Primary Examiner—Leo H. Boudreau

[57] ABSTRACT

A body of data is operated upon hierarchically in such a way that, at one or more levels of the hierarchy, the number of aggregative data items produced is not substantially less than the number produced at the preceding level. The body of data can be an image, so that each aggregative data item indicates an attribute of a distinct image region. Such attributes include presence of a single connected component or properties of a component such as width, orientation and curvature. A class of abstract computation structures, called exhaustive hierarchical structures, is introduced in which such dense or exhaustive hierarchical aggregative data analysis processes can be embedded. The embedding of exhaustive hierarchical analysis in a computation structure of this class is analogous, and in some implementations similar in processing efficiency, to the embedding of conventional hierarchical aggregative data analysis processes in tree structures. The exhaustive hierarchical embedding introduced analyzes extensively overlapping regions in a manner that places minimum demands on the number of communication links, memory resources, and computing power of the individual processing units. Specifically, the embedding scheme is a general scheme for mapping locations in an array into nodes at two adjacent levels of a binary exhaustive hierarchical structure. The scheme establishes positional relations in the array that correspond to parent-child relations at a given level in the exhaustive hierarchical computing structure; these positional relations are uniform power-of-two offsets in each array dimension at a given hierarchical level. Consequently, this exhaustive hierarchical analysis can be implemented efficiently using conventional communication techniques, including hypercube and grid techniques, on a massively parallel processor. To minimize memory requirements, hierarchical results at each location can be encoded across all levels.

85 Claims, 21 Drawing Sheets

OTHER PUBLICATIONS

Pavlidis, T., *Algorithms for Graphics and Image Processing*, Computer Science Press, Rockville, Md., 1982, pp. 99–127.

Ullman, S., "Visual Routines," *Cognition*, vol. 18, 1984, pp. 97–157.

Koch, C., and Ullman, S., "Selecting One Among the Many: A Simple Network Implementing Shifts in Selective Visual Attention," MIT Artificial Intelligence Laboratory, A.I. Memo 770, Jan. 1984, pp. 1–18.

Shafrir, A., "Fast region coloring and the computation of inside/outside relations," Master of Science thesis, Dept. of Mathematics, Feinberg Graduate School, Weizmann Institute of Science, Rehovot, Israel, May 1985, pp. 1–74.

Edelman, S., "Fast Distributed Boundary Activation," Master of Science thesis in Computer Sciences, Feinberg Graduate School, Weizmann Institute of Science, Rehovot, Israel, Jun. 1985, pp. 17–32 and 45–51.

Stout, Q. F., "Mapping Vision Algorithms to Parallel Architectures," *Proceedings of the IEEE*, vol. 76, No. 8, Aug. 1988, pp. 982–995.

Miller, R. and Stout, Q. F., "Some Graph-and Image-Processing Algorithms for the Hypercube," *Hypercube Multiprocessors 1987*, Philadelphia, Pa.: SIAM, 1987, pp. 418–425.

Lee, S.-Y. and Aggarwal, J. K., "Exploitation of Image Parallelism via the Hypercube," *Hypercube Multiprocessors 1987*, Philadelphia, Pa.: SIAM, 1987, pp. 426–437.

Castan, S., "Architectural Comparisons," in Cantoni, V. and Levialdo, S., eds., *Pyramidal Systems for Computer Vision*, Berlin: Springer-Verlag, 1986, pp. 261–271.

Ferretti, M., "Overlapping in Compact Pyramids," in Cantoni, V. and Levialdo, S., eds., *Pyramidal Systems for Computer Vision*, Berlin: Springer-Verlag, 1986, pp. 247–260.

Stout, Q. F., "Hypercubes and Pyramids," in Cantoni, V. and Levialdo, S., eds., *Pyramidal Systems for Computer Vision*, Berlin: Springer-Verlag, 1986, pp. 75–89.

Kjell, B. P., and Dyer, C. R., "Segmentation of Textured Images by Pyramid Linking," in Cantoni, V. and Levialdo, S., eds., *Pyramidal Systems for Computer Vision*, Berlin: Springer-Verlag, 1986, pp. 273–288.

Rosenfeld, A., "Some Pyramid Techniques for Image Segmentation," in Cantoni, V. and Levialdo, S., eds., *Pyramidal Systems for Computer Vision*, Berlin: Springer-Verlag, 1986, pp. 261–271.

Uhr, L., "Parallel, Hierarchical Software/Hardware Pyramid Architectures," in Cantoni, V. and Levialdo, S., eds., *Pyramidal Systems for Computer Vision*, Berlin: Springer-Verlag, 1986, pp. 1–20.

Reeves, A. P., "Pyramid Algorithms on Processor Arrays," in Cantoni, V. and Levialdo, S., eds., *Pyramidal Systems for Computer Vision*, Berlin: Springer-Verlag, 1986, pp. 195–213.

Ballard, D. H., and Brown, C. M., *Computer Vision*, Prentice-Hall, Englewood Cliffs, N.J., 1982, pp. 75–88, 106–113, and 149–165.

"Exhibit A", a three page excerpt from a search report describing patents to Stolfo et al., Kimmel, Mattheyses, Tsunekawa et al., Tanimoto et al., Kent, Grinberg et al., Nussmeier, Sellner, and Sternberg.

1

DENSE AGGREGATIVE HIERARHICAL TECHNIQUES FOR DATA ANALYSIS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques for analyzing a body of data, such as data defining an image or another signal. More specifically, the invention relates to techniques that produce results indicating overall attributes of extended subsets of a body of data.

A number of techniques have been proposed for producing results indicating attributes of a body of data.

Tanimoto et al., U.S. Pat. No. 4,622,632, describe a pyramidal array of processors that can operate on a pyramidal hierarchical data structure with a number of image resolution levels. FIG. 1 shows such a data structure in which the neighborhood of each unit cell includes four unit cells on the next lower level, and in the pyramidal processing system of FIG. 2 a data element corresponds exactly with a unit cell in the pyramidal data structure. For each unit cell, the pyramidal processing unit comprises registers, a virtual processor, and external storage. The neighborhood of a cell and relationships within neighborhoods are described at cols. 5-6. The association of actual and virtual processors and communication between processors is described in relation to FIGS. 3-5b. Control of the pyramidal processing unit and matching operations are described in relation to FIGS. 11-13a.

Miller, R., and Stout, Q. F., "Simulating Essential Pyramids," *IEEE Transactions on Computers*, Vol. 37, No. 12, December 1988, pp. 1642-1648, describe pyramid techniques that are useful when an image contains multiple objects of interest. These techniques simulate a separate "essential" pyramid over each object. FIG. 1 shows a standard pyramid computer, while FIG. 5 illustrates an essential pyramid, defined at pages 1644-1645. Implementations of essential pyramids are described at pages 1645-1646.

Conventional multigrid image processing techniques are also hierarchical, employing substantially fewer processing units at each level than at the next lower level. Frederickson, P. O., and McBryan, O. A., "Parallel Superconvergent Multigrid," *Multigrid Methods: Theory, Applications and Supercomputing*, McCormick, Marcel-Dekker, April 1988, pp. 195-210, describe a parallel superconvergent multigrid (PSMG) algorithm for the solution of large sparse linear systems on massively parallel supercomputers. Section 2.1 describes the use of the PSMG algorithm for a discretization problem by constructing two coarse grid solutions and combining them to provide a fine grid correction that is better than the coarse grid solutions. If the number of processors on a massively parallel machine is comparable to the number of fine grid points, the two coarse grid solutions can be solved simultaneously. For a problem in d dimensions, 2d coarse grids are obtained and the fine grid solution is defined by performing a suitable linear interpolation of the coarse grid points. This technique therefore obtains more results at each level of the hierarchy.

Kent, U.S. Pat. No. 4,601,055, describes an iconic-to-iconic low-level image processor with a sequence of identical intermediate stages between an input stage and an output stage, as shown and described in relation to FIG. 1. As shown in FIGS. 1-3, forward, recursive, and retrograde paths allow various operations, including forward and retrograde neighborhood operators. A discussion of the neighborhood operator begins at col. 6 line 42, and FIG. 5 illustrates the neighborhood operators, path functions, and combining logic for a plurality of neighborhood operations. A region of interest operator is described beginning at col. 13, line 48. The discussion beginning at col. 13, line 59 explains how the processor can construct multiresolution, pyramid, sequences of images by sampling and pixel doubling, and an example of pyramid-based processing is described in relation to FIG. 9.

SUMMARY OF THE INVENTION

The techniques of the present invention analyze a body of data items to obtain information about attributes of groups of the data items. For example, data defining an image can be processed to obtain information about geometric structures in regions of the image. In general, the techniques of the invention can be efficiently implemented with a parallel processor.

One aspect of the invention originated in the recognition of a problem with conventional techniques for analyzing an image to obtain information about its geometric structures. Pavlidis, T., Algorithms for Graphics and Image Processing, Computer Science Press, Rockville, Md., 1982, pp. 99-127, describes an example of a conventional hierarchical image analysis technique, a data structure called the binary image tree. A node at a given level in the tree corresponds to a respective rectangular region in the image, and each child of a node corresponds to half of the node's respective region, as defined by a vertical or horizontal split. The root node corresponds to the entire image. The data item in a node at a given level in the hierarchy is aggregative in the sense that it is produced by operating on the data of a group of child nodes from the next lower level such that the parent node's data item indicates an attribute of the image region corresponding to the parent node. An operation at a node in the hierarchy which produces a data item that indicates an attribute of the corresponding subset of the input data set is subsequently referred to as an aggregative operation.

Since the binary image tree includes fewer nodes at higher levels in the hierarchy, the resulting description is more and more sparse at higher levels. In other words, the sizes and positions of the respective regions corresponding to the nodes similarly become progressively more constrained at the higher levels, reducing the geometric structures that can be detected. A geometric structure in an image can occur at any size and position within the image, so that the sizes and positions of the regions of interest cannot be known in advance. In other words, if an analysis technique constrains the regions of interest to particular sizes or positions, as conventional hierarchical techniques based on trees or pyramids do, the technique is unable to detect geometric structures that do not fit into the constrained regions.

This problem is not unique to two-dimensional image analysis and other analysis of signals that map into two dimensions. It can also affect analysis of signals that map into one dimension, such as time varying signals, or of signals that map into more than two dimensions, such as a sequence of images over time or a depth image such as from a laser range finder. Furthermore, the problem could affect analysis of any body of data in which operations are performed on groups of data items in the aggregate to obtain information about large-scale attributes of the data.

This aspect of the invention is further based on the discovery that it is possible to operate hierarchically on a body of data in such a way that, at one or more levels of the hierarchy, the number of aggregative data items produced (e.g., the number of distinct image regions described) is not substantially less than the number described at the next lower level. For example, it is possible to hierarchically describe image regions in such a way that while the size of the image regions doubles, say, from one level to another (as in the binary image tree), the regions described at a higher level are defined at nearly as many distinct positions as the regions at the next lower level. (This implies that the regions described at the higher level will partially overlap.)

The set of data items produced by such an operation will subsequently be referred to as a dense hierarchy of aggregative data items. That is, a hierarchical collection of data items is dense if, for one or more levels of the hierarchy, the number of distinct aggregative data items is not substantially less than the number of data items at the next lower level. A dense hierarchy of data items can be exhaustive in the sense that the number of distinct aggregative data items at each level is equal to the number of data items at the next lower level. Producing a dense or exhaustive hierarchy of aggregative data items substantially alleviates the problem of constrained regions described above by addressing directly the issue of constrained positions.

This technique can be applied to image analysis, for example, with pixel values of an image being the data items of the lowest level of the hierarchy. The aggregative operations can operate on groups of data items that together relate to a region of the image. In this way, an aggregative data item indicates an attribute of a respective larger region and the lower level data items from which it is produced indicate attributes of respective smaller regions that together form the respective larger region.

This aspect of the invention is further based on the discovery of a class of abstract computation structures in which exhaustive hierarchical aggregative data analysis processes can be embedded. This class of computation structures is referred to as exhaustive hierarchical computation structures. The embedding of exhaustive hierarchical analysis in a computation structure of this class is analogous, and in some implementations (notably certain parallel implementations) similar in processing efficiency, to the embedding of conventional hierarchical aggregative data analysis processes in tree structures. (The latter has been illustrated above through the example of image analysis using the binary image tree.)

The idea of embedding hierarchical analysis in a computation structure may be understood by considering it in the familiar context of the binary tree. A binary tree computation structure may be viewed as a set of nodes divided into subsets each corresponding to a particular level of hierarchical processing, such that (i) there exists a top level consisting of a single node; (ii) there exists a base level; (iii) for each level P except the base level, there exists one other level C (possibly the base level) consisting of twice as many nodes as P, and each node of P is uniquely associated with two nodes of C. The base level nodes of such a structure can be mapped to the elements of any body of data, such as a two-dimensional image. Through an appropriate mapping of the base level nodes of such a structure to locations in a two-dimensional image, a correspondence between the nodes at non-base levels and certain rectangular image regions may be established, as seen above in the case of the binary image tree. Under such a mapping, the analysis of the rectangular image regions corresponding to the tree nodes may be said to be embedded in the tree structure in the sense that a node in the tree and all its descendants together carry out the analysis of the node's corresponding region.

One exhaustive hierarchical computation structure that is closely related to the preceding binary tree structure may be viewed as a set of nodes divided into subsets each corresponding to a particular level of hierarchical processing, such that (i) there exists a top level; (ii) there exists a base level; (iii) for each level P except the base level, there exists one other level C (possibly the base level) containing the same number of nodes as P, and each node of P is associated with two nodes of C, each of which is associated with just one other node of P. This structure is subsequently referred to as a binary computational jungle, or just a binary jungle. Through an appropriate mapping of the nodes of this structure to the locations of a one-dimensional array, or of a variant of this structure (one that is two-dimensional in a particular sense) to locations in a two-dimensional array, a correspondence between the nodes at non-base levels and rectangular array regions may be established. The ideal structure as defined above may be appropriately modified for such a mapping to deal with edge effects and the like.

One aspect of the invention pertains to this mapping. It is a general scheme for mapping locations in an array into nodes at two adjacent levels of a binary exhaustive hierarchical structure. In other words, this is a scheme for establishing positional relations in the array that correspond to parent-child relations at a given level in the exhaustive hierarchical computation structure. The scheme defines a node and its first child to correspond to the same location in the array. The scheme defines the array location corresponding to a node's second child to have a non-zero offset in one dimension from the node's array location and to have a zero offset in the other dimensions; the non-zero offset's absolute value is a power of two determined by level in the hierarchy. For instance, in a one-dimensional array, the offset at the first level can be $2^0=1$, so that each second level data item is produced by operation on adjacent first level data items; the offset at the second level can be $2^1=2$, so that each third level data item is produced by operation on the second level data items that are separated by another data item; the offset at the third level can similarly be $2^2=4$, and so forth. In a two-dimensional array, the non-zero offsets at even levels are in one dimension, and the non-zero offsets at odd levels are in the other dimension.

In what will be referred to as a fully parallel implementation of hierarchical analysis using a binary tree, each node in the tree corresponds to a distinct processing unit, so that all computations at a given level can take place simultaneously. In addition, each processing unit is able to communicate directly, for example is connected by a wire, to each processing unit corresponding to one of its child nodes at the next lower level. A single pass of fully parallel hierarchical analysis in a tree can therefore be completed in time proportional to the logarithm of the number of leaves of the tree, where at each level, each processing unit operates upon a fixed amount of data read from its child processing units. Binary hierarchical analysis can, of course, be implemented by a serial processor, or other kinds of parallel processors. The importance here of the time performance of the fully parallel implementation is that it represents the theoretical ideal for hierarchical analysis using a binary tree structure. The attributes of a fully parallel implementation that enable this ideal to be achieved are (i) a one to one correspondence between processing units and nodes in the tree structure; (ii) simultaneous operation of all processing units at a given level; and (iii) direct communication links between processing units, which means that communication is completed in a small fixed amount of time. The primary advantage of embedding the analysis of two-dimension image regions, for example in a binary tree structure, derives from the computational principle of divide-and-conquer: the amount of computational effort expended by each processing unit is constant across all levels of the hierarchy, but the size of the region described by this computational effort doubles with every step up the hierarchy. This advantage ensues even in a serial implementation.

In a fully parallel implementation of exhaustive hierarchical analysis in a binary jungle, each node in the jungle corresponds to a distinct processing unit, so that all computations at a given level can take place simultaneously. Fully parallel hierarchical analysis in a jungle can therefore also be completed in time proportional to the logarithm of the number of leaves of the tree. Again, this time performance represents the theoretical ideal for hierarchical analysis using a binary jungle structure. The divide-and-conquer advantage claimed above for the binary tree also ensues with exhaustive hierarchical analysis embedded in a jungle.

A further important advantage follows from the fact that the regions described at any given level of the tree overlap. Since the areas of the regions at a given level increase exponentially as level in the hierarchy increases, and since at each level the regions are defined at every possible position, the maximum overlap between regions at a given level also increases exponentially with hierarchical level. However, at any given level of the hierarchy, a given node corresponds to the union of two regions that do not overlap, just as in the binary image tree. In other words, the overall hierarchical process describes regions that overlap extensively at all levels, but the individual operations of the process done by each processing unit never involve overlapping regions, which simplifies the computations.

To fully appreciate this advantage, it is worthwhile to imagine a non-hierarchical computation structure in which the analysis of densely overlapping regions could be embedded. This structure would consist of just two sets of nodes R and I. Each node in I is mapped to a distinct location in a two dimensional image. Each node of R is associated with the elements of a distinct subset of the nodes in I, and thus with a distinct region of the image. In a fully parallel implementation, there would be a distinct processing unit for each node in R and I, and the association between a node in R and a node in I would be implemented by a direct communication link. If two nodes in R correspond to overlapping regions in the image, then there are a set of nodes in I, corresponding to the intersection of the regions, which are associated with both nodes. Therefore, the processing units corresponding to locations in the intersection would each have communication links to both processing units in R corresponding to the regions. The number of communication links into a processor would be equal to the number of regions that include the corresponding image location.

This is a problematic situation because it encounters several practical engineering limits in the design of the individual processing units of a massively parallel computer. First, the number of direct communication links into a processing unit is limited. Second)the amount of memory storage for incoming values in a processing unit is also limited. In addition, the computing power of an individual processor is limited, so it could not process a large number of incoming values all at once, even if it could receive and buffer them simultaneously; that is, the processing unit is not itself a powerful, parallel processor. Although they have been illustrated in the extreme case of a non-hierarchical computation structure, these difficulties also arise in a hierarchical computation structure to the extent that an individual processor is associated with multiple parent processors. The exhaustive hierarchical embedding introduced in the invention represents the computational ideal in so far as regions with extensive overlap are analyzed in a manner that places minimum demands on the number of communication links, memory resources, and computing power of the individual processing units.

Another aspect of the invention is based on the recognition of the difficulty of realizing a fully parallel implementation. Such an implementation would employ a hierarchical parallel processor with a respective processing unit for each data item, from the body of data at the lowest level up to the highest level of aggregative data items. In such a processor, the processing units of each level could be directly connected to provide their results to the processing units of the next higher level, for very fast communication. This structure would be difficult and expensive to build on a large scale. The invention solves this problem based on the recognition that the operations that produce the hierarchy are parallel at each level of the hierarchy but are serial between levels, so that the aggregative data items at one of the higher levels can only be produced after the data items at the next lower level are produced. Therefore, a satisfactory emulation of the hierarchical parallel processor can be obtained with a single level parallel processor if at each step the necessary communication of results between the processing units can be completed in a small, fixed time. This solution can be implemented based on the discovery that conventional communication techniques for a massively parallel processor, including hypercube and grid techniques, can under some conditions provide sufficiently fast power-of-two communication. This type of implementation is subsequently referred to as a flat parallel implementation.

A further aspect of the invention is based on the observation that for a flat parallel implementation, in which each processing unit produces all the results for all levels of the hierarchy, the local memory of each processing unit may not be sufficient to store all of the results it produces at all of the levels of the hierarchy. This problem can be solved by encoding or selecting among the data items of lower levels after operations on them are completed. For example, the level on which a result changes from one binary value to another can be stored. A flat parallel implementation in which the processing units do not store the results at all levels is referred to as an inplace implementation.

Although in principle a fully parallel implementation can most closely approach ideal time performance in exhaustive hierarchical analysis, under certain conditions serial implementations and other parallel implementations may in practice provide suitable performance. Exhaustive hierarchical analysis may be usefully employed in any system in which the maximum amount of time to carry out any basic operation of the analysis, such as arithmetic or logical operations, or parent-child communication, for all nodes at any given level of the hierarchy, is fixed and sufficiently small. In a machine without dedicated communication links at all levels of the hierarchy, this maximum time would most likely be dominated by the longrange communication operations involved at the highest levels. The critical general requirement, therefore, for implementing exhaustive hierarchical analysis in a form other than the parallel implementations discussed above, is a rate of data transfer high enough to allow communication at the highest levels to be treated as a basic, or unit time, operation.

A further aspect of the invention is based on the discovery of techniques that employ a dense or exhaustive hierarchy to obtain attributes of regions in an image. These techniques are not only useful for square and oblong rectangular regions, but can also be used for one-pixel wide slices of the image, by idling at appropriate levels of the hierarchy.

Another aspect of the invention is based on the recognition of a problem in propagating an attribute of a region downward through a dense hierarchy of data items. In such a hierarchy, each region is included in a number of larger regions, and the larger regions frequently have different values for the attribute.

In general, this problem can be solved by operating on a set of higher level data items to produce data items at the next lower level that indicate an attribute of a subregion that is included in each of the regions in the set.

In one specific technique, the next lower level data item could include a central value, e.g. the mode, mean, or median, or an extremum, i.e. the maximum or minimum, of the attribute values of the regions that include it. This solution can be implemented by a downward pass through the hierarchy, choosing at each region the maximum (or minimum or average) of the attribute values from its parent regions. This solution is appropriate for attributes such as topological class, local extent, and local width.

In another specific technique, the next lower level data item could include an attribute value of one of the regions that include it based on a criterion that selects one of the regions. For example, for orientation, a pixel can be given the value from the minimum-scale connected component that includes it and that has sufficient pixels to provide a good orientation estimate. This technique can be implemented by a downward pass through the hierarchy.

Another aspect of the invention is based on the recognition of a general problem in analysis of an image or other body of data. It is often desirable to obtain general information about an image or other body of data quickly, but a body of data as large as an image of a practical size includes too much information to permit rapid identification of its global properties. To create a histogram, for example, requires time-consuming construction of a global distribution.

This aspect of the invention is further based on the discovery of a technique for rapidly obtaining general information about a body of data by hierarchically processing local information. This technique detects one or more values that have a relatively high local frequency within the image, called prominent values. The technique also provides a rough estimate of the relative global frequencies of the prominent values.

The technique can be implemented by producing a hierarchy of prominent values in which each prominent value is selected from a set of prominent values at the next lower level of the hierarchy. Each prominent value at the next lower level has a count roughly indicating its frequency up to that level in the hierarchy. The prominent value at the higher level is the more frequent of the prominent values at the next lower level, as indicated by the counts. If two of the prominent values at the next lower level are sufficiently similar, their counts are summed to obtain a count for the prominent value at the higher level, but otherwise the count of the more frequent is used.

When a prominent value is obtained in this manner, the data items in the body of data with that value can be ignored in subsequent operations, so that other prominent values can be obtained. This can be repeated until insufficient additional values remain.

The following description, the drawings and the claims further set forth these and other objects, features and advantages of the invention.

DETAILED DESCRIPTION

A. Conceptual Framework

Figure 1:
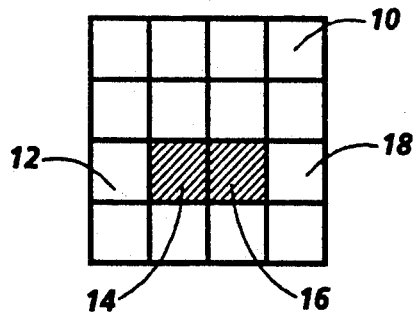
FIG. 1 shows an image array that includes a geometric structure.

The following conceptual framework is helpful in understanding the broad scope of the invention, and the terms defined below have the meanings indicated throughout this application, including the claims.

A "data processor" or "processor" is any component, combination of components, or system that can process data, and may include one or more central processing units or other processing components. A "processing unit" is a processor that is a component within another processor. Two processing units are "connected" by any combination of connections between them that permits communication of data from one of the processing units to the other.

"Memory" is any component, combination of components, or system that can store data, and may include local and remote memory and input/output devices.

A processor "accesses" data or a data structure by any operation that retrieves or modifies the data or data included in the data structure, such as by reading or writing data at a location in memory. A processor can be "connected for accessing" data or a data structure by any combination of connections with memory that permits the processor to access the data or the data structure.

A "data structure" is any combination of interrelated items of data. An item of data is "included" in a data structure when it can be accessed using the locations or data of other items in the data structure; the included item of data may be another data structure. An "array of data" or "data array" or "array" is a data structure that includes items of data that can be mapped into an array. A "two-dimensional array" is a data array whose items of data can be mapped into an array having two dimensions.

A processor "operates on" data or a data structure by performing an operation that includes obtaining a logical or numerical result that depends on the data or data structure.

To "obtain" or "produce" data or a data structure is to perform any combination of operations that begins without the data or the data structure and that results in the data or data structure. Data or a data structure can be "obtained from" or "produced from" other data or another data structure by any combination of operations that obtains or produces the data or data structure by operating on the other data or on data in the other data structure. For example, an array can be obtained from another array by operations such as producing a smaller array that is the same as a part of the other array, producing a larger array that includes a part that is the same as the other array, copying the other array, or modifying data in the other array or in a copy of it.

A "hierarchy" of data items includes data items, each of which is at one of a series of levels within the hierarchy. To "produce" a hierarchy of data items is to perform a combination of operations that begins without the complete hierarchy of data items and that includes the production of all of the data items of the hierarchy that are not present at the beginning. In other words, a hierarchy may be produced by a combination of operations that ends when all of the data items of the hierarchy have been produced, whether or not all of the data items are still stored. All of the data items of all of the levels could still be stored at the end of the operations, but the hierarchy is produced even though some of the data items are not stored after being used to produce data items at a higher level.

To produce a hierarchy "sequentially" is to produce the hierarchy by a sequence of substeps in which the first substep produces a first higher level of data items from a lowest level of data items, the second substep produces a second higher level of data items from the first higher level, and so forth.

Data "indicates" an attribute when the data indicates the presence of the attribute or a measure of the attribute. An "aggregative data item" is an item of data that indicates an attribute of a group of other data items. In a hierarchy of data items, a given level can include aggregative data items, each of which indicates an attribute of a respective group of data items of the next lower level of the hierarchy.

An "aggregative operation" is an operation on a set of data items, called input data items below, that produces a set of aggregative data items, called resulting data items below, with each of the aggregative data items being produced by operating on a respective set of the input data items. The respective sets of input data items are "evenly distributed" in relation to the complete set of input data items if each of the input data items is included in roughly the same number of respective sets of input data items as every other input data item and if no two of the respective sets are identical.

If the respective sets of input data items on which an aggregative operation is performed are all of the same size a, the "aggregation degree" of the aggregative operation is equal to a. More generally, the respective sets of input data items could each have one of a small number of different sizes $a_1, a_2, \ldots$ For the aggregative operations discussed below, a is generally greater than 1 and small compared to the number of input data items, except as otherwise indicated.

The "density" of an aggregative operation is the ratio c of the number of resulting data items to the number of input data items. This ratio can be related to the aggregation degree a as follows, assuming in each case that the respective sets are evenly distributed: A "minimal aggregative operation" is one for which c is approximately equal to 1/a, so that each of the input data items is in one of the respective sets of input data items. A "dense aggregative operation" is one for which c is not substantially less than 1, so that each of the input data items is in not substantially less than a respective sets of input data items. An "exhaustive aggregative operation" is a dense aggregative operation for which c is equal to 1, so that each of the input data items is in a respective sets of input data items.

A "hierarchical aggregative operation" is a combination of operations that sequentially produce a hierarchy and in which each substep of the sequence is an aggregative operation. An "aggregative hierarchy" is a hierarchy produced by a hierarchical aggregative operation. An aggregative hierarchy can be described as "minimal," "exhaustive," or "dense" if all of the substeps of the hierarchical aggregative operation that produces it are minimal, exhaustive, or dense, respectively. A "mixed aggregative hierarchy" is produced by a hierarchical aggregative operation that includes aggregative operations of varying densities, possibly including minimal, exhaustive, and other densities that are between minimal and exhaustive or greater than exhaustive.

An "image" is a pattern of light. Data "defines" an image or another signal when the data includes sufficient information to produce the image or signal. For example, an array can define all or any part of an image, with each item of data in the array providing a value indicating the color of a respective location of the image.

A "dimensioned body of data" is a body of data that maps into a space that includes one or more dimensions. For example, an array that defines a two-dimensional image is a dimensioned body of data. A "geometric structure" is a configuration of data items that occurs in a dimensioned body of data. Examples of geometric structures include points; relations among points; properties of points, such as color, surface orientation, or depth; configurations of points, such as lines and curves, line junctions, corners, angles, connected regions, region boundaries, surfaces, solids; and so forth.

Each location in an image may be called a "pixel." In a body of data defining an image in which each item of data provides a value, each value indicating the color of a location may be called a "pixel value." Each pixel value is a bit in the "binary form" of the image, a grey-scale value in a "grey-scale form" of the image, or a set of color space coordinates in a "color coordinate form" of the image, the binary form, grey-scale form, and color coordinate form each being a body of data defining the image.

A "connected component" or "blob" is a set of pixels in an image, all of which have pixel values that meet a criterion and all of which are pairwise connected through an appropriate rule such as that the pixels in a pair are connected by a chain of neighbors within the set. For example, a connected component of a binary form of an image can include a connected set of pixels that have the same binary value, such as black.

A "data space" is a space into which the data items of a dimensioned body of data can be mapped. In general, a number of bodies of data can be mapped into the same data space. For example, arrays defining many different images can all be mapped into the same two-dimensional data space.

An "analysis region" or "region" of a data space or of any of the bodies of data that can be mapped into the data space is a bounded part of the data space, defined without regard to the values of the data items mapped into the analysis region. A region of the array defining an image defines an analysis region of the image, so that an aggregative data item defines an attribute of an analysis region of an image when it indicates an attribute of the data items in an analysis region of the array defining the image. The attribute could, for example, be the presence of exactly one connected component in a respective analysis region. The size and position of the aggregative data item's respective analysis region do not depend on the presence or absence of a connected component, but rather on the set of data items on which operations are performed to produce the aggregative data item. An image is therefore divided into analysis regions by the aggregative operations performed on an array defining the image in a way that does not depend on the pixel values in the image. Typically, each pixel value is in at least one analysis region at the lowest level of the hierarchy, and the analysis regions of each higher level are formed by combining analysis regions of the next lower level. Analysis regions "overlap" if they share one or more pixels.

A "slice" is a rectangular analysis region with a width of one pixel, and a slice "extends" in the direction of its length.

An item of data is produced by "combining" other items of data when logical or arithmetic operations are performed on the other items of data that yield an item of data of the same type. For example, if the other items of data are simple booleans, the combined item of data is a simple boolean. If the other items of data are numbers, the combined item of data could be a number, produced by adding the other items of data, calculating the mean of the other items of data, selecting one of the other items of data, or a similar operation that produces a number.

A "power-of-two offset" within an array that defines a dimensioned body of data is an offset that spans one of the integral exponential powers of two, e.g. $2^0=1$, $2^1=2$, $2^2=4$, etc.

An operation "encodes" data items when performing the operation on the data items produces different data from which the encoded data items can subsequently be recovered.

An "image input device" is a device that can receive an image and provide a signal defining a version of the image. A "scanner" is an image input device that receives an image by a scanning operation, such as by scanning a document. A "user input device" is a device such as a keyboard or a mouse that can provide signals based on actions of a user. The data from the user input device may be a "request" for an operation, in which case the system may perform the requested operation in response. An "image output device" is a device that can provide an image as output. A "display" is an image output device that provides information in visual form, such as on the screen of a cathode ray tube.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

An "edge" occurs in an image when two neighboring pixels have different pixel values. The term "edge pixel" may be applied to one or both of the two neighboring pixels.

A "border" of a polygonal region, such as a rectangle, is the line of pixels at the perimeter of the region along one of its sides. A "boundary" of a region is a perimeter, defined by the portions of the boundaries of its pixels along which those pixels either have no neighboring pixels or have neighboring pixels that are not in the region. A connected component "crosses" a boundary of a region if the connected component includes a pair of neighboring pixels that are on opposite sides of the boundary, one being in the region and the other not being in the region.

B. General Features of Dense Aggregative Hierarchies

Figure 2:
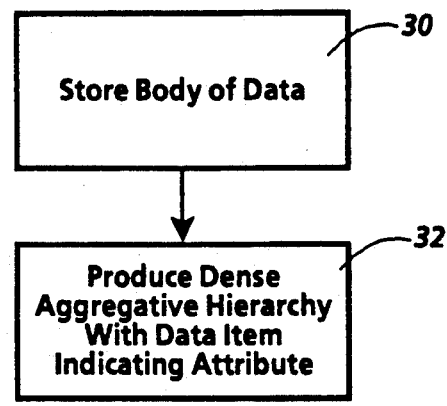
FIG. 2 is a flow chart of general steps of a method of analyzing a body of data according to the invention.
Figure 3:
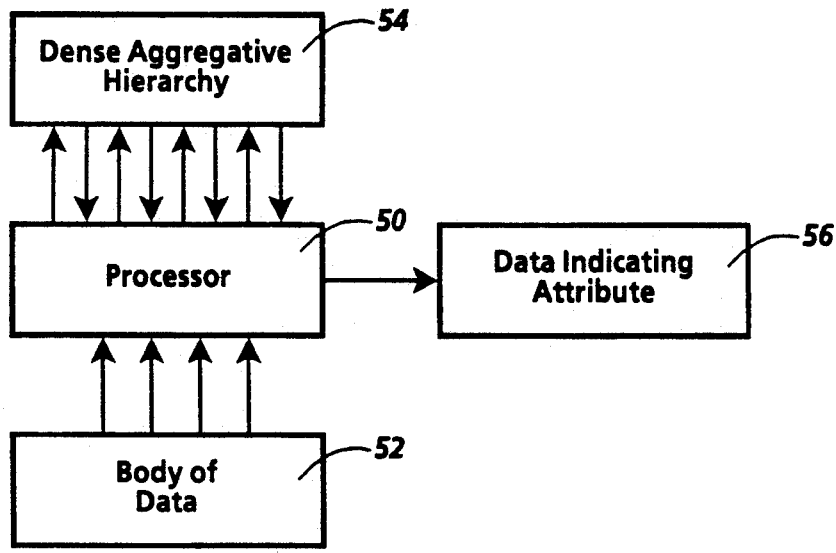
FIG. 3 is a schematic block diagram showing general components of a system that performs the steps of FIG. 2.
Figure 4:
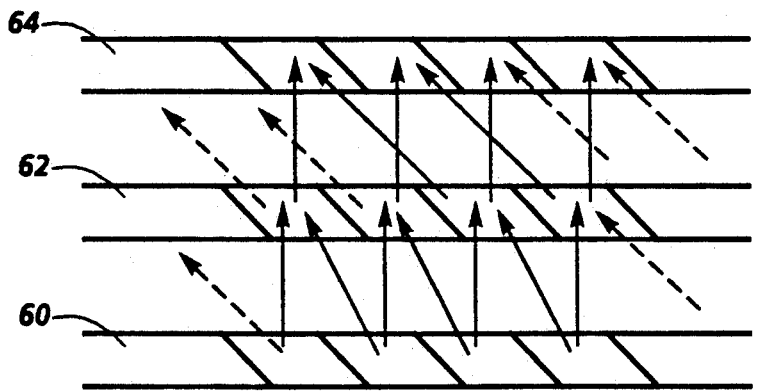
FIG. 4 is a schematic diagram showing a one-dimensional body of data and levels of an exhaustive aggregative hierarchy produced by performing operations on the body of data.

FIGS. 1-4 illustrate general features of the invention. FIG. 1 shows an image array that includes a geometric structure. FIG. 2 shows general steps in a method of analyzing data by producing a dense aggregative hierarchy that includes a data item indicating an attribute of a group of data items in a body of data. FIG. 3 shows general components in a system that operates on a body of data and produces a dense aggregative hierarchy from which data indicating a group attribute can be obtained. FIG. 4 shows how a body of data and levels of an exhaustive aggregative hierarchy produced by operating on it can be related.

FIG. 1 shows image array 10, which is a square binary image array including 16 pixels, each of which is either dark, meaning it is on, or light, meaning it is off. Pixels 12, 14, 16, and 18 form one row of image array 10, with pixels 12 and 18 being off and pixels 14 and 16 being on.

One of the geometric structures in image array 10 is the adjacent two on pixels 14 and 16. Although this structure is visible to a human viewing FIG. 1, it is not explicitly indicated by any one of the data items in image array 10. Image array 10 can be analyzed to produce a data item indicating this geometric structure, but not all analysis techniques would be sure to detect this geometric structure. For example, a technique that pairs pixels 12 and 14 with each other and pixels 16 and 18 with each other would not find the pair of adjacent on pixels 14 and 16. On the other hand, a technique that pairs pixels 14 and 16 with each other would find the pair of adjacent on pixels.

FIG. 2 illustrates general steps in a method of obtaining data indicating group attributes. This method can be used in image processing to alleviate the problem illustrated by FIG. 1. The step in box 30 stores the data items of a body of data. The step in box 32 then operates on the stored body of data to produce a dense aggregative hierarchy including a data item that indicates an attribute. If the attribute is a geometric structure in an image, the data item could indicate its presence in an analysis region or could indicate some other measure of it. The dense aggregative hierarchy can be an exhaustive aggregative hierarchy that includes, at each level, a respective aggregative data item for each pixel position of the image.

FIG. 3 illustrates general components of a system that can perform the method of FIG. 2. Processor 50 is connected for accessing stored body of data 52, which can be a data array that defines an image. Processor 50 operates on body of data 52 to produce dense aggregative hierarchy 54, including a data item indicating an attribute of body of data 52. Processor 50 also produces data 56 indicating the attribute, which could be all or part of hierarchy 54 or could be other data produced by operating on hierarchy 54.

FIG. 4 illustrates a general technique by which a processor such as processor 50 could operate on one-dimensional body of data 60 to produce levels 62 and 64 of an exhaustive aggregative hierarchy. The processor operates on two adjacent data items of body of data 60 to produce each aggregative data item in level 62. Similarly, the processor operates on two of the data items in level 62 to produce each aggregative data item in level 64, but the data items in level 62 are separated by another data item, an offset of two. In other words, level 62 is produced by operating on data items that are offset by $2^0=1$, while level 64 is produced by operating on data items that are offset by $2^1=2$. The general technique of operating on data items with increasing power-of-two offsets can be extended to higher levels and can be generalized to two or more dimensions as discussed in greater detail below.

C. An Implementation of Dense Aggregative Hierarchies

The invention has been implemented on a Connection Machine from Thinking Machines Corporation. The Connection Machine implementation can be viewed as a two-dimensional simulation of a three-dimensional network of processing units, referred to herein as a "binary image jungle" (BIJ).

1. Binary Image Jungle

Figure 5:
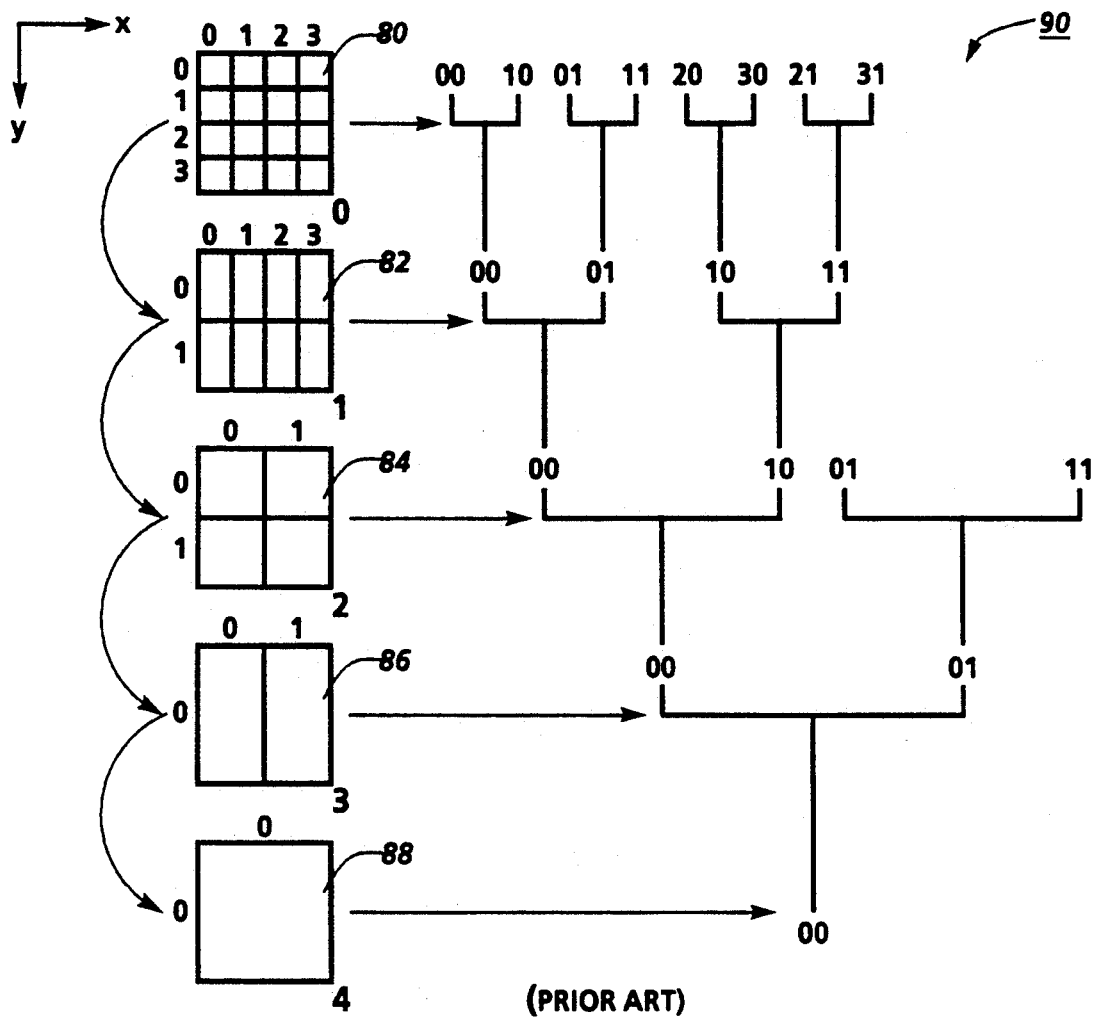
FIG. 5 is a schematic diagram showing a series of images tessellated into regions as indicated in the levels of a binary hierarchical tree.
Figure 6:
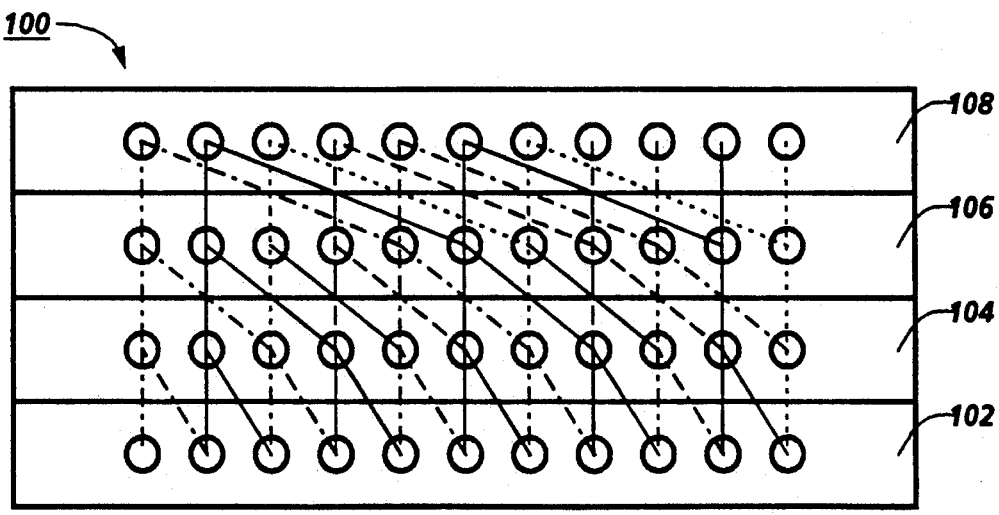
FIG. 6 is a schematic diagram showing an extension of a tree machine according to the invention.

The BIJ contrasts with conventional tree or pyramid structures, illustrated in FIG. 5. FIG. 6 illustrates part of a BIJ in one dimension.

FIG. 5 shows a series of images 80, 82, 84, 86, and 88, each tessellated into one or more rectangular analysis regions of a respective level of a binary tree 90, part of which is shown. Image 80 shows the analysis regions at level 0 of tree 90; each analysis region of image 80 could, for example, be a square pixel. Image 82 shows level 1, at which pairs of pixels from image 80 are combined to form analysis regions of a larger size; each pair includes a top pixel and a bottom pixel, so that the resulting rectangular analysis regions are twice as long in the y-direction as in the x-direction. At level 2, shown in image 84, pairs of the rectangular analysis regions from image 82 combine to form square analysis regions of a larger size; each pair includes a left analysis region and a right analysis region. Image 86 shows level 3, at which pairs of square analysis regions from image 84 combine to form rectangular analysis regions, and image 88 shows level 4, at which rectangular analysis regions from image 86 combine to form a square analysis region that is the entire image.

FIG. 5 thus illustrates that, for a square image of width N, the binary tree has 2 log N+1 levels. The nodes on the lowest level can be pixel values of an image. At odd levels of the hierarchy, rectangular analysis regions are formed by the union of adjacent square analysis regions at the next lower level, and, at even levels of the hierarchy, square analysis regions are formed by the union of adjacent rectangular analysis regions. The analysis regions combined at odd levels can be called the "top child" and the "bottom child," while those combined at even levels can be called the "left child" and the "right child." The region formed by combining two child regions can be called the "parent". For simplicity, the term "first child" will be used to mean the top child at odd levels and the left child at even levels, and the term "second child" will be used to mean the bottom child at odd levels and the right child at even levels.

A tree or pyramid of processors, called a tree or pyramid machine, could be used to implement hierarchical tree 90. This implementation would include a processing unit for each node of tree 90, and each processing unit would have a small, fixed amount of memory, the exact amount depending on the operations to be performed. The primitive operations of a simple tree or pyramid machine would be arithmetic and logical operations performed by the processing unit at each node of the tree on data stored in local memory at that node or read from its children. Such a machine can be controlled to loop sequentially through all the levels of the hierarchy, either upward or downward, performing the same operations in parallel at all the nodes at each level, storing each node's results in its local memory. At any given time, only the processing units of one level are performing operations on data, and the only communication of data is between those processing units and their children. As the level in the hierarchy increases, the results of the operations become more and more sparse.

FIG. 6 shows one-dimensional hierarchical network 100. Hierarchical network 100 has local connectivity similar to the tree or pyramid machine but the results of the operations do not become more sparse as the level increases. In other words, each level of the network includes as many processing units as the number of data items in the body of data at the lowest level of the network, so that the network can produce an exhaustive aggregative hierarchy of data items. If the body of data is an image, each level could include as many processing units as the number of pixels in the image.

FIG. 6 shows levels 102, 104, 106, and 108 of network 100. Each level includes 11 processing units, shown as circles, and the processing units of adjacent levels are connected, the connections being shown as lines. The processing units at lowest level 102 store the data items of the body of data. Each processing unit at each of higher levels 104, 106, and 108 is directly connected to two child processing units in the next lower level, and operates on the results of the two connected child processing units to produce an aggregative data item. The resulting structure may be viewed as a collection of intertwined tree machines that share processing units at their lower levels, and is therefore referred to herein as a "jungle." Because each higher level processing unit in network 100 is connected to two child processing units, network 100 is a "binary jungle."

FIG. 6 illustrates connections at power-of-two offsets. The first child of each processing unit on levels 104, 106, and 108 is shown directly below its parent, while the second child is offset by an integer power of two. For level 104, the offset is $2^0=1$; for level 106, $2^1=2$; and for level 108, $2^2=4$. If the levels are numbered from 0 to 3, the power-of-two offset at level l can be calculated as $2^{l-1}$. In a two-dimensional binary jungle, x- and y-offsets at even levels could be (0, $2^{l/2}-1$) and at odd levels could be ($2^{(l-1)/2}$, 0).

As a result of the connections shown in FIG. 6, each aggregative data item produced by a processing unit at level 108 indicates an attribute of a set of data items at level 102 that extend from directly below the processing unit at level 108 to the right. For an implementation in two dimensions, each processing unit at the highest level could produce an aggregative data item indicating an attribute of a set with a corner value stored by the lowest level processing unit directly below the highest level processing unit.

If the two-dimensional implementation is used to process an image whose pixels are stored at its lowest level, it operates as a "binary image jungle" or "BIJ." If the two-dimensional implementation as described above were used as a BIJ, with pixel values defining an image being stored by the processing units at the lowest level, each higher level processing unit in network 100 would produce an aggregative data item indicating an attribute of a respective analysis region, and the respective analysis regions of the processing units at a given level would all be of the same size, with a processing unit for every possible positioning of an analysis region of that size within the image. In other words, network 100 produces an exhaustive hierarchy of aggregative data items.

The study of BIJ techniques is rooted in the hypothesis that the computational power and efficiency requirements of middle-level vision could be met almost entirely by a BIJ. The term "middle-level vision" describes those visual processes that, on the one hand, are practically independent of the observer's immediate goals or current situation, and, on the other hand, are essentially independent of prior knowledge of particular objects or configurations. In particular, processes for initially separating figure from ground and for establishing useful shape properties and relations are in the realm of middle-level vision. Ullman, S., "Visual Routines," *Cognition*, Vol. 18, 1984, pp. 97-157, describes routines that can be thought of as performing middle-level vision functions.

2. The Connection Machine System

Despite their promise, BIJ networks would be difficult and expensive to build for a practical image size. But a BIJ of a practical size can be simulated on a single instruction, multiple data (SIMD) parallel processing machine, an example of which is the Connection Machine from Thinking Machines Corporation. A SIMD machine can be thought of as including a powerful central controller and a collection of processing units, usually many simple processing units. The controller broadcasts a series of instructions, constituting the program, to the processing units, which synchronously execute each instruction.

Figure 7:
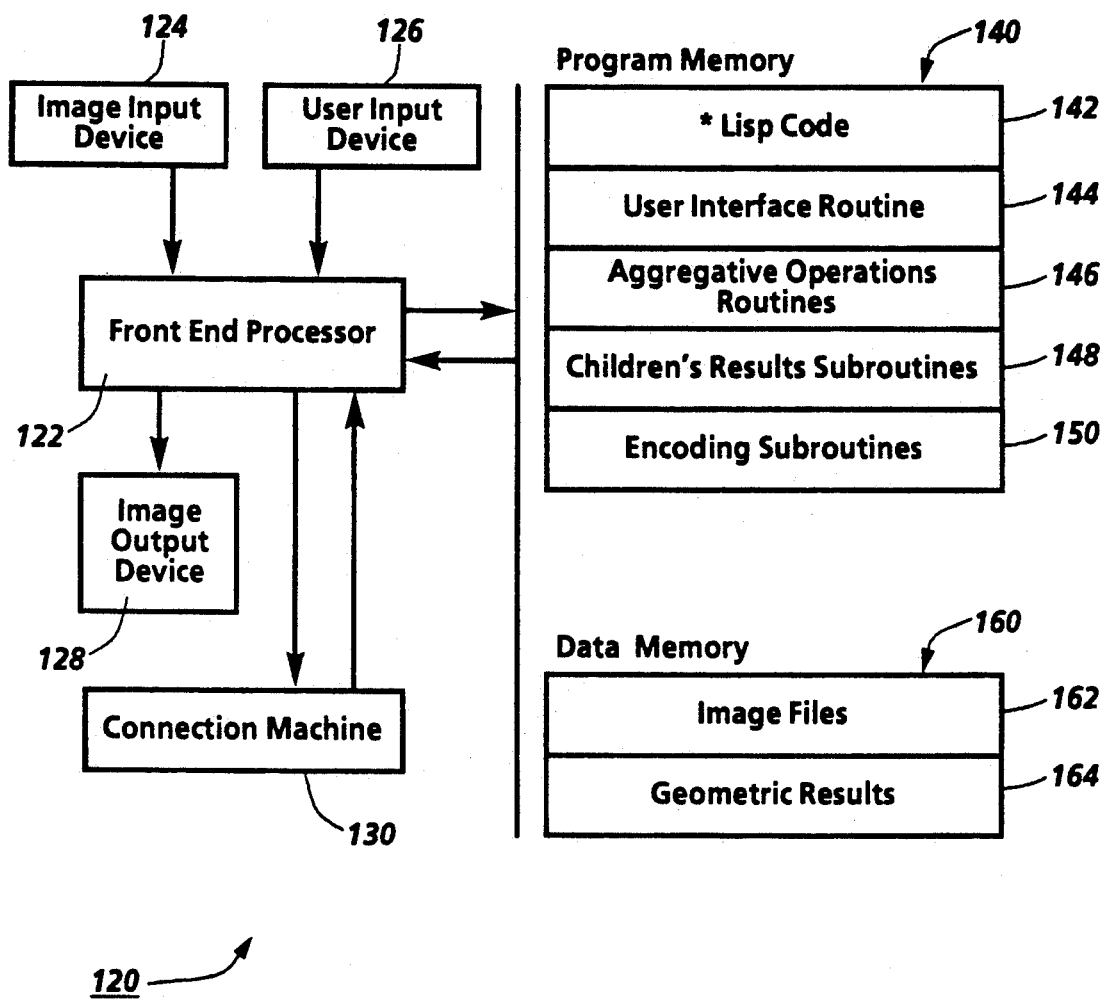
FIG. 7 is a schematic block diagram showing components of a system that simulates the machine of FIG. 6.

FIG. 7 shows components of a Connection Machine system that performs image processing by simulating a BIJ. System 120 in FIG. 7 includes front end processor 122, such as a Symbolics or Sun workstation, connected for receiving image input from image input device 124, which could be a scanner or other input/output device capable of providing data defining an image. Front end processor 122 is also connected for receiving user signals from user input device 126, which could be a keyboard and mouse, so that an input image could be interactively drawn by the user. Front end processor 122 is connected for providing image output to image output device 128, which could be a display.

Front end processor 122 is connected to Connection Machine 130 in the conventional manner, and controls Connection Machine 130 by executing instructions from program memory 140, in the process accessing data memory 160 for storage and retrieval of data.

Front end processor 122 can initialize variables, cold boot Connection Machine 130, and allocate storage to Connection Machine 130 in the conventional manner. To cause processing units in Connection Machine 130 to perform arithmetic and logical operations, front end processor 122 makes appropriate *Lisp calls in the conventional manner.

Program memory 140, in the illustrated implementation, stores *Lisp code 142, used to execute high level routines 144 which, in turn, call aggregative subroutines 146 which are written in *Lisp. Aggregative routines 146 call children's results subroutines 148, also written in *Lisp, and also perform encoding of data items in the hierarchy.

Examples of high level routines 144 and aggregative subroutines 146 are described in detail below and in cot)ending coassigned U.S. patent applications Ser. No. 07/535,438, entitled "Exhaustive Hierarchical Near Neighbor Operations on an Image" ("the linking application") Ser. No. 07/535,213, entitled "Hierarchical Operations on Border Attribute Data for Image Regions," both of which are incorporated herein by reference in their entirety.

Data memory 160 includes image files 162, in which front end processor 122 can store an image for subsequent analysis or as a result of analysis. Front end processor 122 can also store geometric results 164 in data memory 160 as a result of analysis.

Connection Machine 120 provides hypercube network communications, which can be used to simulate grid network communications. Both communication techniques could be used for power-of-two offset communication, as discussed in more detail below.

3. Exhaustive Hierarchical Computation on the Connection Machine

Figure 8:
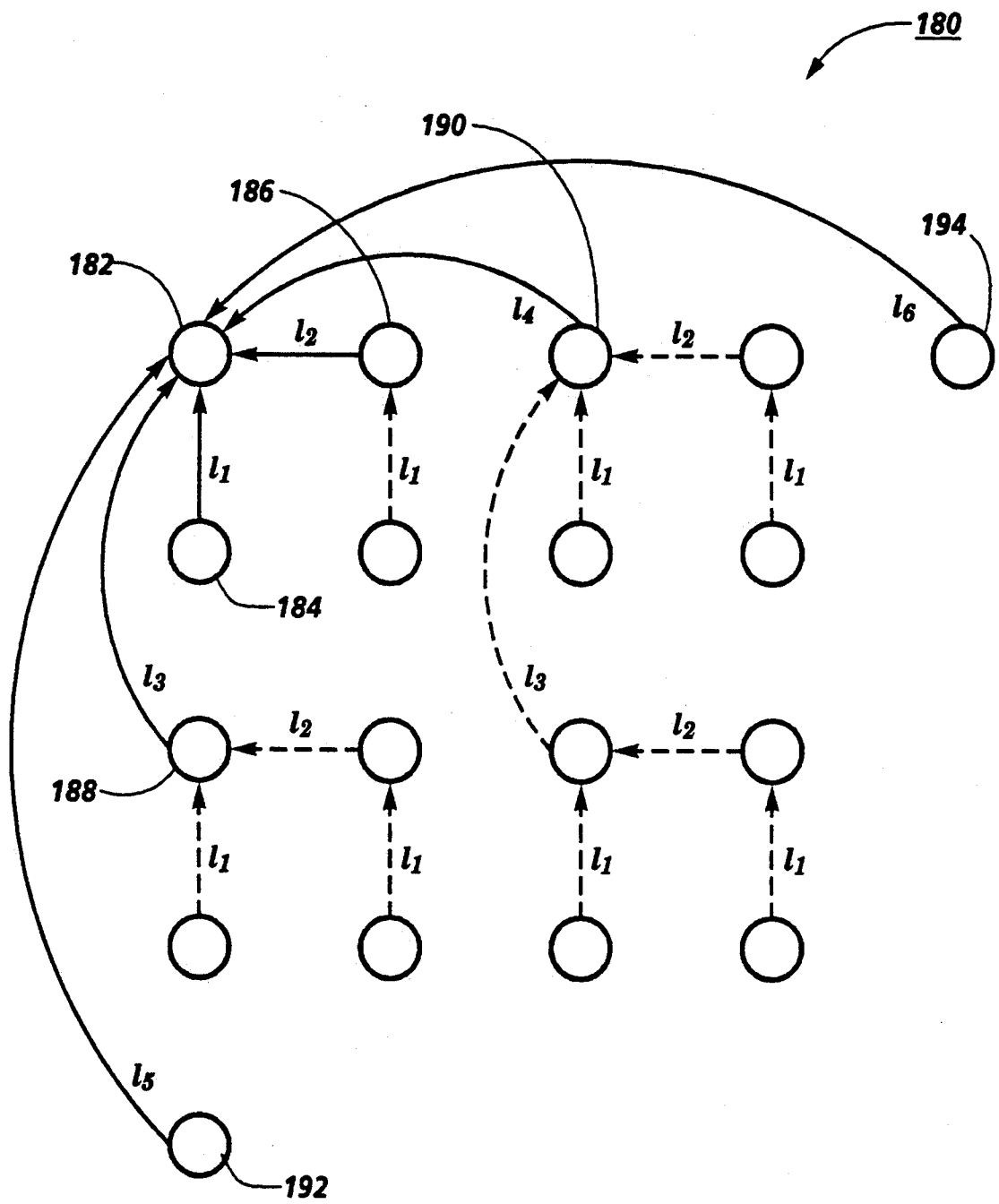
FIG. 8 is a schematic diagram showing communications between processing units in the system of FIG. 7.
Figure 9:
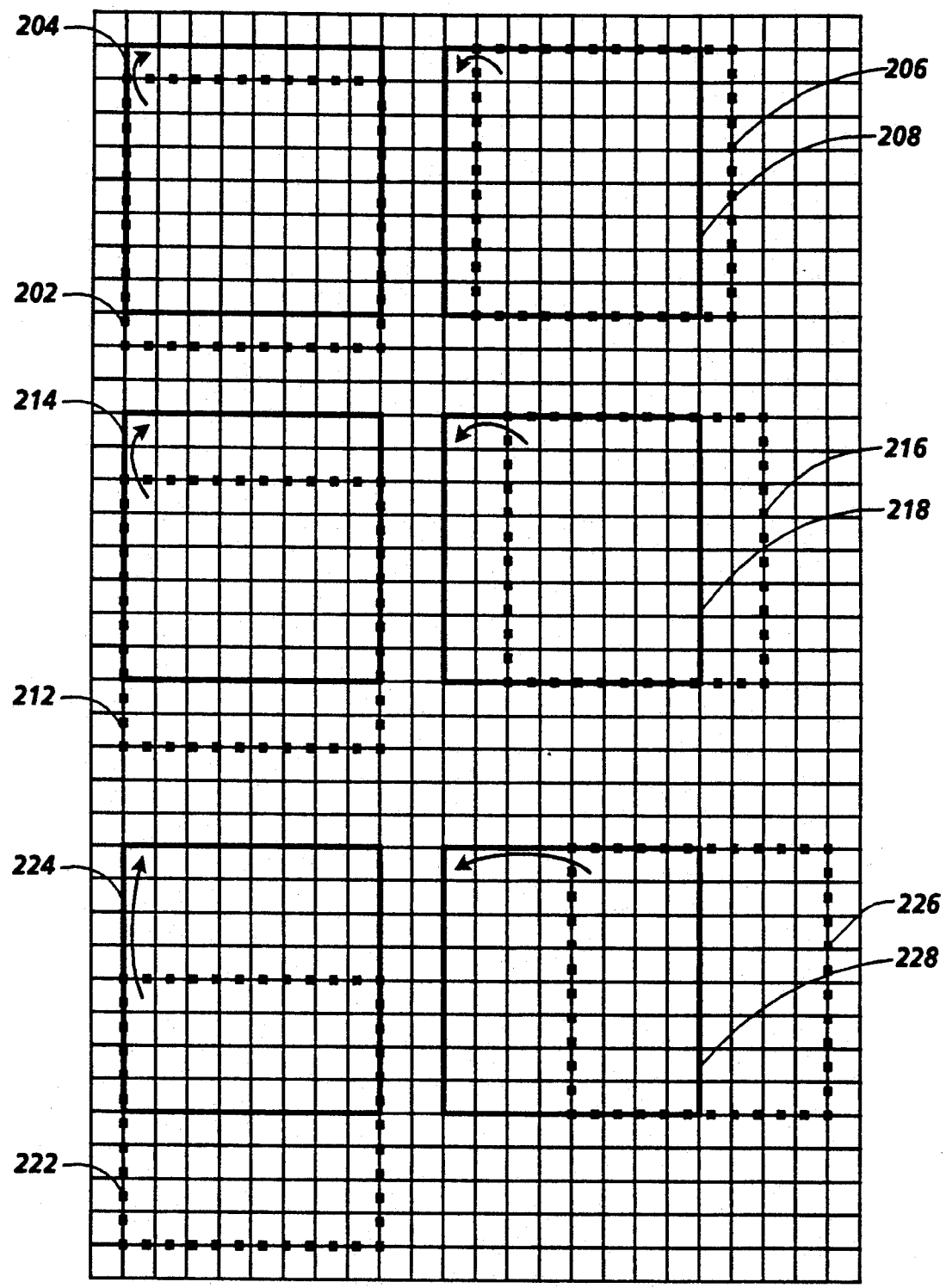
FIG. 9 shows a series of shifts on a grid network that provide the communications of FIG. 8.
Figure 10:
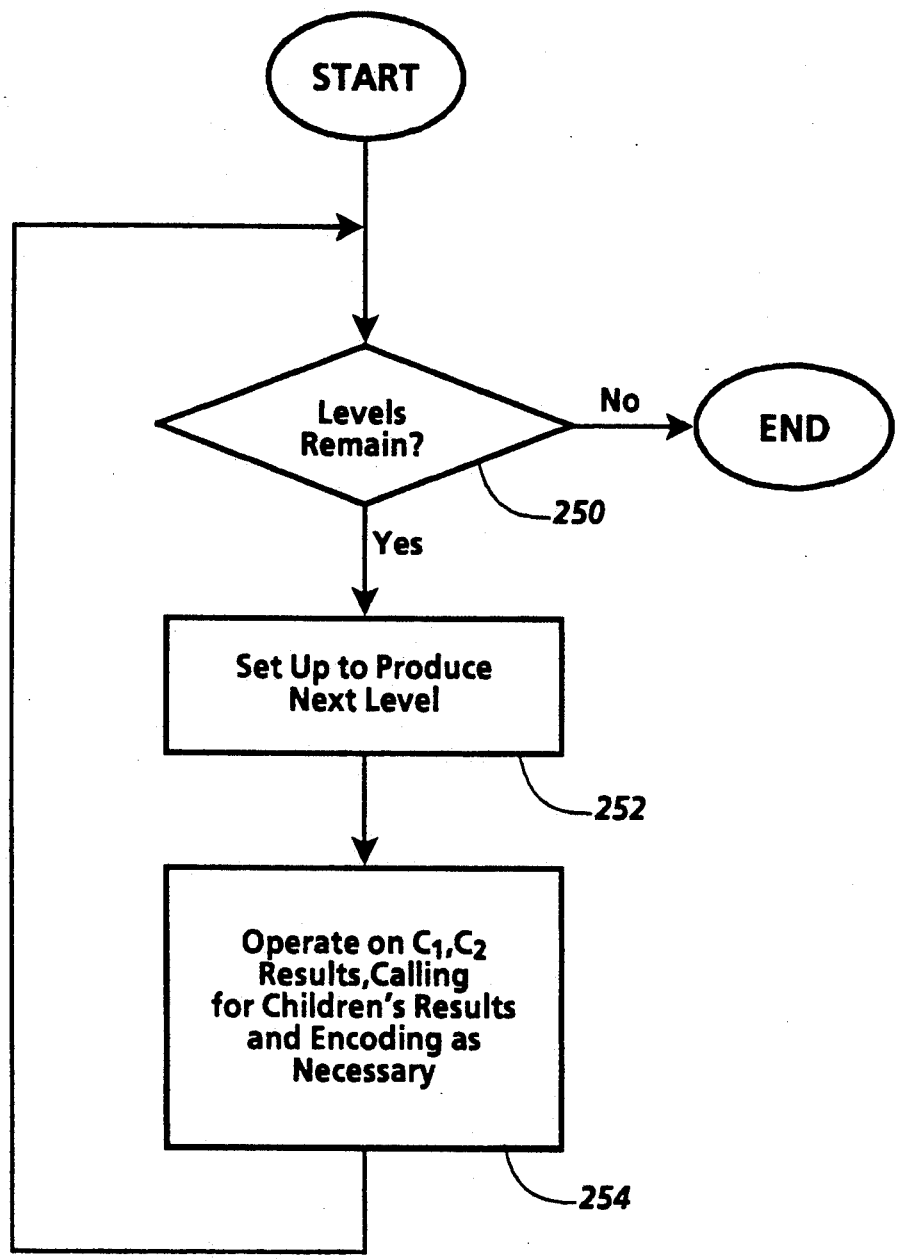
FIG. 10 is a flow chart showing general steps in producing a dense or exhaustive hierarchy according to the invention.

FIG. 8 illustrates one way of using Connection Machine 130 to simulate a BIJ for a two-dimensional image. FIG. 9 illustrates communication by power-of-two shifts on a grid network. FIG. 10 illustrates steps followed by system 120 in making a pass through a dense hierarchy of aggregative data items.

FIG. 8 shows a part of array 180 of processing units in Connection Machine 130. As can be understood from FIG. 8, in order to simulate a BIJ, array 180 requires a mechanism for communicating across any power-of-two offset in the x- or y-dimensions in a small, fixed time and sufficient local storage for each processing unit. If these requirements are met, array 180 can simulate a BIJ with a plane of processing units, called a "flat" implementation. A flat implementation conserves processing units but sacrifices the opportunity for pipelining.

FIG. 8 shows the connections that lead to processing unit 182 with solid arrows and other connections that feed into the results received by processing unit 182 with dashed arrows. Connections at each level are indicated by $l_1$, $l_2$, and so forth. At level 0, processing unit 182 does not receive results from other processing units, but stores a pixel value of the image being analyzed. At level 1, processing unit 182 receives a pixel value from processing unit 184; at level 2, a level 1 result from processing unit 186; at level 3, a level 2 result from processing unit 188; at level 4, a level 3 result from processing unit 190; at level 5, a level 4 result from processing unit 192; and at level 6, a level 5 result from processing unit 194.

The Connection Machine provides uniform parallel grid communication as a primitive operation, and automatically optimizes communication across power-of-two offsets by employing a hypercube interconnect.

A hypercube network can lead to run-time proportional to log N performance, because the network can be set up in such a way that processors corresponding to pixels at power-of-two offsets in the x- and y-dimensions are always separated in the network by exactly two wires.

FIG. 9 shows how the connections in FIG. 8 could be provided with a series of shifts on a grid network whose length is a power of two. At level 1, results from processing units 202 are shifted to processing units 204; at level 2, results from processing units 206 to processing units 208; at level 3, results from processing units 212 to processing units 214; at level 4, results from processing units 216 to processing units 218; at level 5, results from processing units 222 to processing units 224; and at level 6, results from processing units 226 to processing units 228.

Parallel communication across a given offset is implemented in such a network by sequentially shifting values between adjacent nodes in array 180. For such a network, the communication time at level l of the hierarchy is proportional to $2^l$. For an N×N array, the communication time for one complete pass through the hierarchy is proportional to $N+N/2+N/4+...1$. This arrangement would be suitable for exhaustive aggregative operations if shifts between adjacent processing units were fast enough that the maximum communication time—the time to shift data across the full width N of array 180—could be treated as a single time step.

A single image-sized array of processing units can simulate a BIJ exactly if each processing unit in the array has h times as much local memory as a BIJ processing unit, where h=2 log N+1 is the number of levels in the BIJ. At level l of such a simulation, each processing unit of the array simulates one processing unit of the BIJ and also simulates a child processing unit at the next lower level. Each processing unit's local memory can be divided into h segments, and the communication of results from the child processing unit can be simulated by a local memory transfer from segment 1−1 to segment 1.

The amount of local memory required per processing unit can be reduced to a small fixed multiple of the memory in each BIJ processing unit with an in-place technique. The useful results at intermediate levels are encoded across levels to reduce the amount of memory required. For example, a processing unit's local memory could be divided into two segments—a parent segment and a child segment—each the size of the memory of each BIJ processing unit being simulated. At the end of the aggregative operation at each level, the roles of the two segments are swapped, such as by swapping contents or by swapping pointers to the segments. A small amount of additional local memory is required to hold the encoded results across all levels.

FIG. 10 shows general steps followed by front end processor 122 in producing a dense or exhaustive hierarchy, taking into account the above discussion. The test in box 250 begins an iterative loop that produces one level of the hierarchy during each iteration. If levels remain to be produced, the step in box 252 sets up the processing units of Connection Machine 130 to produce the next level. Then, the step in box 254 causes each processing unit to operate on the results from the next lower level of its first and second children, C1 and C2, calling children's results subroutines 148 and encoding subroutines 150 as necessary. Children's results subroutines 148 can employ grid network or hypercube network communication as appropriate. When all the levels have been produced in this manner, production of the hierarchy is completed.

More generally, steps like those in FIG. 10 can be followed in making an upward or downward pass through an existing hierarchy, with several differences. If a downward pass is being made, the step in box 254 would operate on C1 and C2 results by writing them. If an upward pass is being made, the step in box 254 could operate on C1 and C2 results by reading them. Furthermore, the step in box 254 could include decoding previously encoded results from intermediate levels.

Additional steps could be added to the steps in FIG. 10 to obtain a sequence of steps that includes both upward and downward movements within a hierarchy. For example, each iterative loop could be like the steps in FIG. 10, but additional preliminary steps could determine whether each iterative loop made an upward or a downward movement.

The techniques described above can be used to provide, in effect, a programming language for analyzing images. This approach includes decomposing visual processes into basic sequences of simple operations; performing the basic operations in a fixed time for an image of a given size; and performing the basic operations with a machine that includes simple processing units of limited speed and memory and in which the other processing units to which a given processing unit is directly connected are small in number in relation to the total number of processing units, so that communications are local. The requirement of fixed time operations is especially important for real time response, such as in robotic vision or document analysis. The fixed time should not depend on the complexity of the image, and preferably would not depend on the size of the image.

Specific applications of these techniques to image analysis are described below and in copending coassigned U.S. patent applications Ser. No. 07/535,438, entitled "Exhaustive Hierarchical Near Neighbor Operations on an Image"; Ser. No. 07/535,213, entitled "Hierarchical Operations on Border Attribute Data for Image Regions"; Ser. No. 07/535,089, entitled "Labeling Pixels of an Image Based on Near Neighbor Attributes"; Ser. No. 07/535,091, entitled "Comparison of Image Shapes Based on Near Neighbor Data"; and Ser. No. 07/537,468, now issued as U.S. Pat. No. 5,193,125, entitled "Local Hierarchical Processing Focus Shift Within an Image," all of which are incorporated herein by reference in their entirety. More generally, the techniques can be used to perform three types of general operations: (1) Select and shift, or focus of attention, operations move among features in an image; (2) figure/ground separation operations produce parallel results, such as new images of figures; (3) property description operations produce scalar results, such as numbers or boolean values indicating shape properties or spatial relations in an image.

More advanced applications of these techniques could include image editing, to modify an analyzed image.

D. General Features of Hierarchical Operations on Regions

Figure 11:
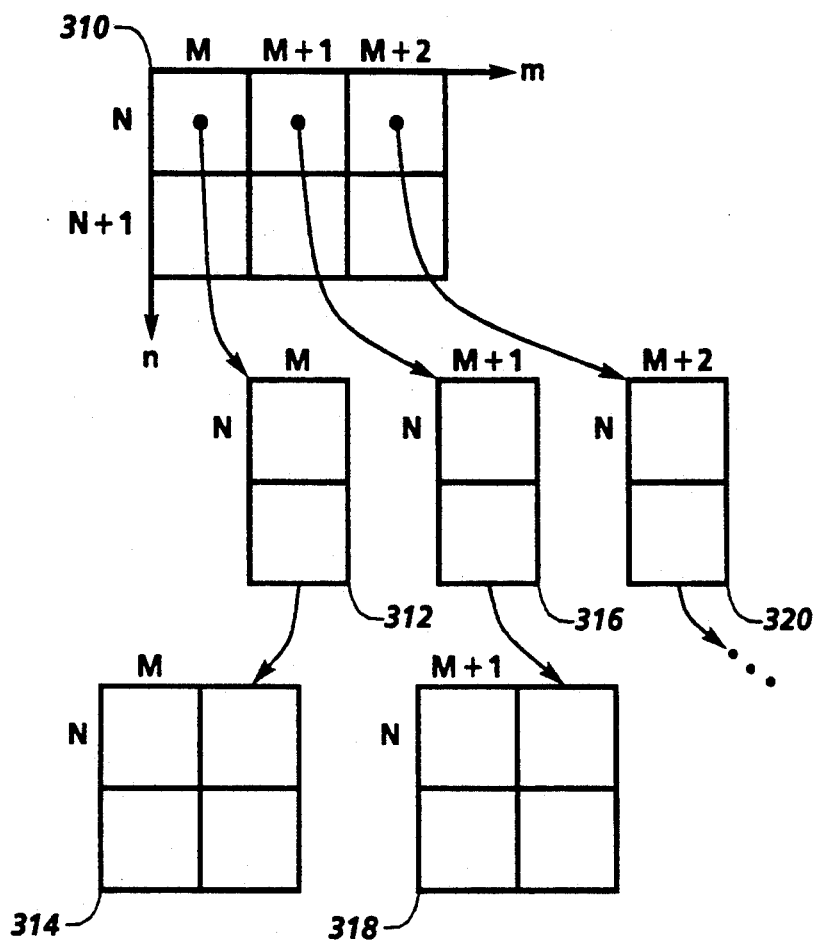
FIG. 11 shows a sequence of respective regions of increasing size for each of several pixels in an image.
Figure 12:
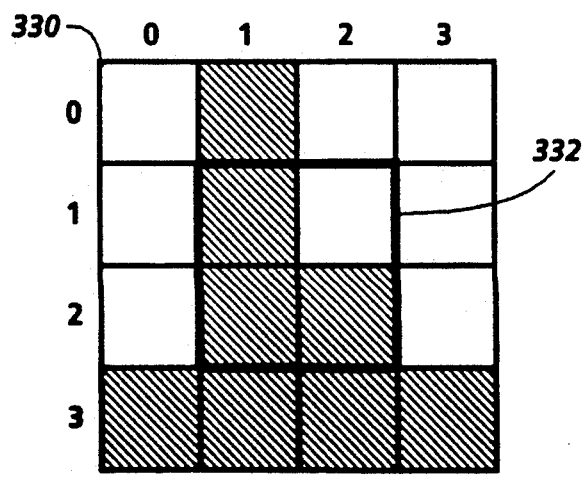
FIG. 12 is a simple image of sixteen pixels.
Figure 13:
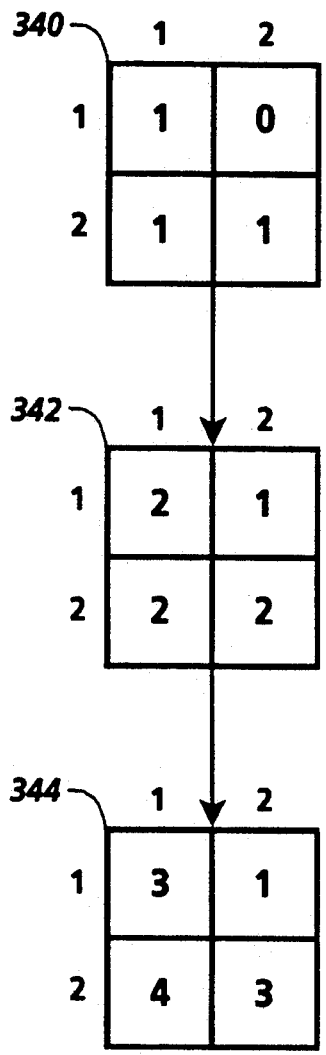
FIG. 13 illustrates a technique for hierarchically counting black pixels according to the invention.
Figure 14:
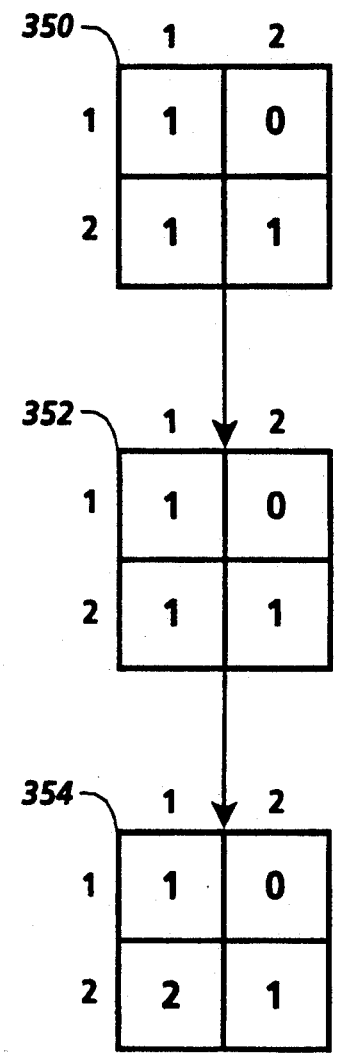
FIG. 14 illustrates a technique for counting pixels of horizontal slices of an image according to the invention.
Figure 15:
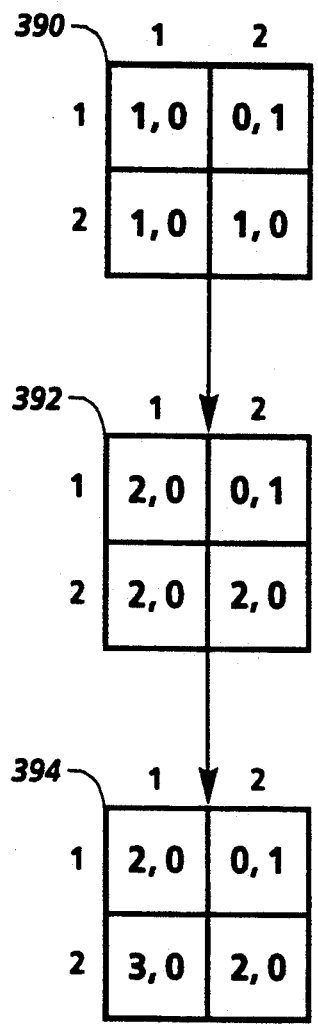
FIG. 15 illustrates a technique for encoding region attribute data.
Figure 16:
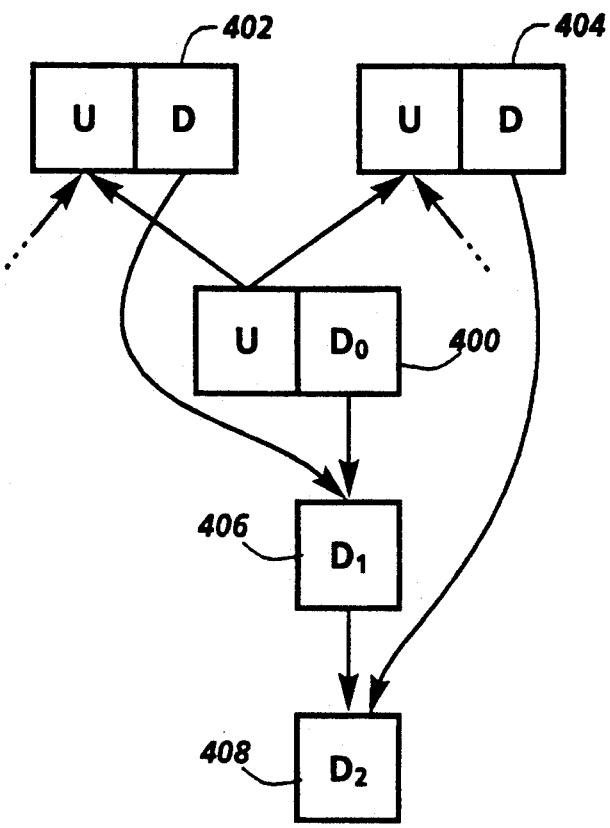
FIG. 16 illustrates a technique for propagating information downward within a hierarchy.
Figure 17:
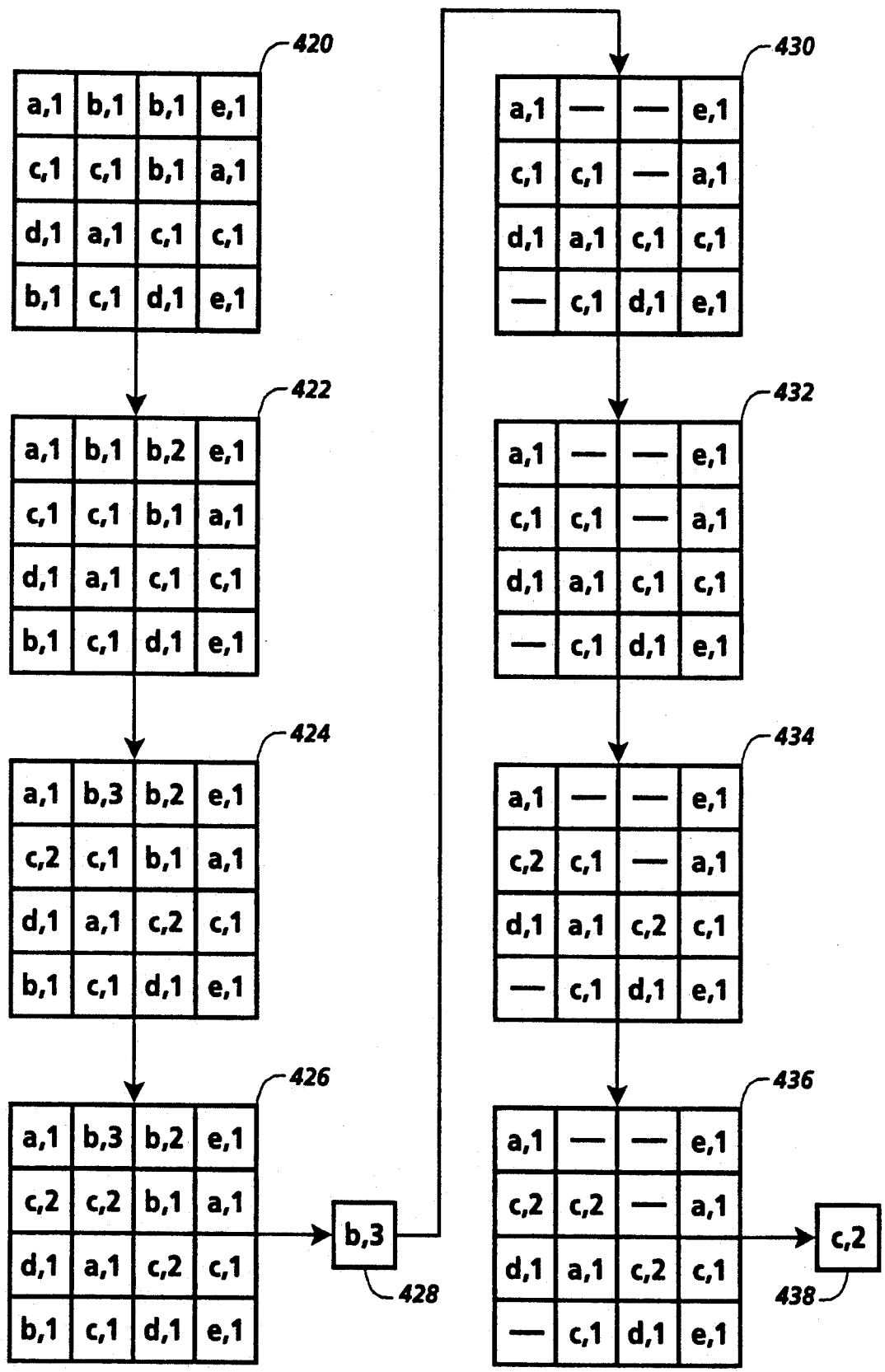
FIG. 17 illustrates the process of obtaining prominent values.

FIGS. 11–15 illustrate general features of some applications of the invention. FIG. 11 shows, for each of several pixels in an image, a sequence of respective regions of increasing size. FIG. 12 is a simple image used for the examples in FIGS. 13–14. FIG. 13 illustrates a technique for hierarchically counting the black pixels of respective regions of increasing size. FIG. 14 illustrates a technique for hierarchically counting the black pixels of respective horizontal slices of increasing size. FIG. 15 illustrates a technique for encoding region attribute data. FIG. 16 illustrates a downward propagation of region attribute data. FIG. 17 illustrates obtaining prominent values.

FIG. 11 shows fragment 310 of a two-dimensional binary image, each of whose pixels can be designated as (m, n) using coordinates as shown. For each pixel, a sequence of respective regions of increasing size can be defined, within each of which the pixel occupies the same position, such as the upper left-hand corner. For pixel (M, N) in fragment 310, the respective regions include two-pixel region 312 and four-pixel region 314; for pixel (M+1, N), two-pixel region 316 and four-pixel region 318; for pixel (M+2, N), two-pixel region 320 and a four-pixel region (not shown); and so forth. Each pixel's respective two-pixel region includes the neighboring pixel below it in fragment 310, so that, for example, two-pixel region 312 includes the two neighboring pixels (M, N) and (M, N+1). Similarly, each pixel's respective four-pixel region includes its own respective two-pixel region and the respective two-pixel region of the neighboring pixel to its right in fragment 310, so that, for example, four-pixel region 314 includes the pixels in regions 312 and 316, including pixels (M, N), (M, N+1), (M+1, N), and (M+1, N+1).

FIG. 12 shows binary image 330, a simple image in which black pixels are shown shaded. Binary image 330 can be used to illustrate several techniques by which attributes of regions can be determined with local hierarchical operations. Boundary 332 surrounds four pixels, (1, 1), (1, 2), (2, 1), and (2, 2), to which FIGS. 13–14 relate.

Each of FIGS. 13–14 shows a sequence of three data item arrays, each array including a respective data item for each of these pixels. The first array in each sequence shows starting data items upon which a processor can operate to produce the other arrays. The starting data items each indicate attribute values for the respective pixel. The data items of the second array in each sequence indicate attribute values for the pixel's respective two-pixel region, and the data items of the third array indicate attribute values for the pixel's respective four-pixel region.

Array 340 in FIG. 13 shows starting data items that are equal to the pixel values of the pixels within boundary 332 in FIG. 12, with black pixels having the value 1 and white pixels having the value 0. Array 342 shows, for each pixel, the sum of its pixel value in array 340 with the pixel value in array 340 of the pixel immediately below it in image 330, so that each value in array 342 indicates the number of black pixels in a respective two-pixel region. For example, the respective two-pixel region of pixel (1, 2) includes two black pixels. Similarly, array 344 shows, for each pixel, the sum of its value in array 342 with the value in array 342 of the pixel immediately to its right in image 330. For example, the respective four-pixel region of pixel (1, 2) includes four black pixels.

FIG. 13 thus illustrates several general features: Each value in an array is produced by operating on two values, one a previously obtained value for the same pixel and the other a previously obtained value for another pixel. The techniques described in section C above could therefore be applied, with a power-of-two offset between the pixels whose results are operated on to produce each value. Also, the operation performed on the two values is generally an operation that combines the values, as defined above. In FIG. 13, each operation combines two numbers by addition, but other combining operations could be used. Finally, the sequence of steps in FIG. 13 produces a hierarchy of data items, each indicating an attribute of a respective region of image 330.

Array 350 in FIG. 14 again shows starting data items that are equal to the pixel values. Array 352 shows, for each pixel, the same value as in array 350, so that array 352 can be viewed as produced by performing a null or "idle" operation on array 350. In effect, array 352 indicates the number of black pixels in the uppermost horizontal slice of the respective pixel's two-pixel region. Array 354 shows, for each pixel, the sum of its value in array 352 with the value in array 352 of the pixel immediately to its right in image 330. For example, the respective slice for pixel (1, 2) includes two black pixels.

If the sequence of FIG. 14 were continued to larger regions, every other operation would be a null or idle operation, so that the values produced would indicate attributes of progressively longer horizontal slices. If FIG. 14 shows idling at odd steps in the sequence, idling at even steps in the sequence would produce values indicating attributes of progressively longer vertical slices, each the leftmost vertical slice of a respective region of one of the pixels.

As discussed in section C above, exhaustive hierarchical operations like those described above can be performed with an in-place implementation on a parallel processor like the Connection Machine from Thinking Machines Corporation. As can be understood from FIGS. 13-14, for a hierarchy that has a large number of levels, each processing unit in an in-place implementation can produce a large amount of data relating to the respective regions of a pixel. FIG. 15 illustrates one technique for reducing the amount of data through an encoding technique.

In FIG. 15, each data item includes two values indicating respectively the highest levels for which the respective region is full, with no white pixels, and vacant, with no black pixels. Because fullness and vacantness are binary attributes that make only one transition from one value to the other during a given sequence of increasingly large regions, the level at which the transition takes place can be encoded with a number. In array 390, each starting data item for a black pixel indicates that its highest full level is the first level and its highest vacant level is the zeroth level. In array 392, each data item of a two-pixel region that includes two black pixels indicates that its highest full level is the second level. The data item for pixel (2, 1) indicates that its highest vacant level is the first level, because its respective two-pixel region has one white pixel and one black pixel. In array 394, only the data item of pixel (1, 2) is changed, because its respective four-pixel region has all black pixels, while the other four-pixel regions each have both white and black pixels.

FIG. 16 illustrates a technique for propagating information such as attribute values downward within a dense hierarchy of data items. Node 400 is at the next lower level in the hierarchy from nodes 402 and 404. For each node, an upward attribute value U and a downward attribute value D are produced. Each upward attribute value U is produced by operating on a set of upward attribute values from the next lower level. The upward attribute values can then be used to produce the downward attribute values, such as by starting at one of the levels of the hierarchy with downward attribute values equal to the upward attribute values of that level. In propagating downward, each downward attribute value D is similarly produced by operating on a set of downward attribute values from the next higher level. FIG. 16 illustrates one way to do this.

Node 400 begins with downward attribute value $D_o$, which could, for example, be equal to its upward attribute value U. One step operates on $D_0$ and the downward attribute value D from node 402 to produce $D_1$, a preliminary downward attribute value shown in box 406. Then, another step operates on $D_1$ and the downward attribute value D from node 404 to produce $D_2$, the final downward attribute value shown in box 408. $D_2$ could, for example, be the maximum or minimum of the values operated on, or could be a central value. Also, $D_2$ could be chosen by applying a criterion to nodes 402 and 404 to select a downward attribute value for node 400.

FIG. 17 illustrates a technique for obtaining information about prominent values in a body of data. The body of data could, for example, be an array of pixel values or other attribute values for the pixels of an image. Array 420 is produced from the body of data by preparing, for each pixel, a starting data item that includes the pixel attribute value and a count that is initialized to one. In the manner illustrated in FIG. 11, a sequence of operations is then performed to produce arrays 422, 424, and 426. To produce array 422, each value in array 420 is compared with the neighboring value immediately below it. If the neighboring value is different, the value is given a count of one, but if the neighboring value is the same, the value is given a count of two, as shown. Similarly, to produce array 424, each value in array 422 is compared with the neighboring value immediately to its right. If the neighboring value is different and its count is not greater, the value is left unchanged. If the neighboring value is different and its count is greater, the neighboring value and its count replaces the previous value. And if the neighboring value is the same, the counts are added. To produce array 426, each value in array 424 is compared with the value offset by two below it, and the same rules are applied as above.

When array 426 is produced, the counts are compared to find the largest count, a count of three for the value b. The pair (b, 3) is produced in box 428 to indicate this result. Then, a new starting array 430 is produced in which locations that had the value b are inactive. To produce arrays 432, 434, and 436, the same rules are applied as above except that inactive locations are always treated as having a different value and a lower count. Again, the counts are compared to find the largest count, a count of 2 for the value c. The pair (e, 2) is produced in box 438 to indicate this result.

The technique of FIG. 17 produces prominent values, but not necessarily in their order of frequency in the image. The count provided with each prominent value tends to indicate the size of the largest group of a given value rather than the total number of occurrences of the value. Nonetheless, in the simple example of FIG. 17, the technique successfully identifies the two most frequent values, b and c.

E. An Implementation of Operations for Regions

The invention has been implemented on a Connection Machine from Thinking Machines Corporation, using the in-place implementation techniques described above to produce exhaustive hierarchies of data items.

1. Image Chunking

The implementation provides image analysis based on simple local analysis regions called chunks. Chunks are defined across a wide range of scales for a given image size, and chunks at each scale are positioned so that they overlap densely. The chunks at a given scale may include one chunk at every possible position within the image, providing an exhaustive set of chunks.

Figure 18:
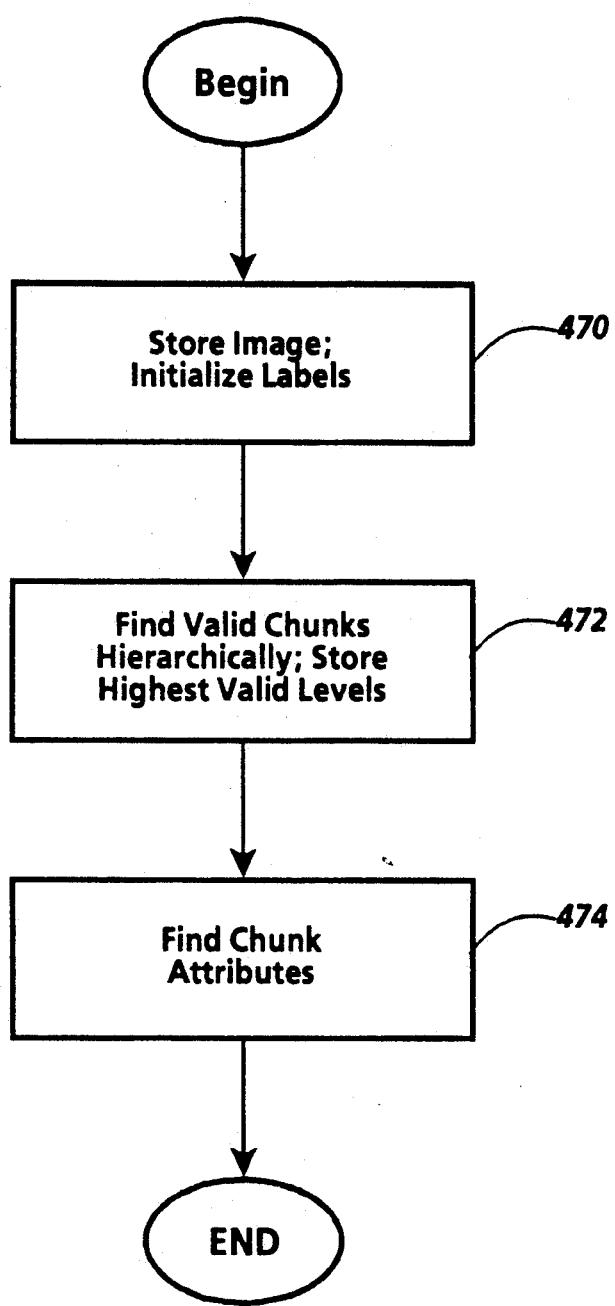
FIG. 18 shows general steps in an image analysis operation based on chunking.

FIG. 18 shows general steps in an image analysis operation based on chunking. The step in box 470 stores an image to be analyzed, with each processing unit's local memory containing the respective pixel's value. Label bits in each processing unit's local memory are initialized. The step in box 472 finds chunks that meet a validity criterion by producing an exhaustive hierarchy of data items. The data items can optionally be encoded by storing the highest valid level at each processing unit. The step in box 474 finds one or more attributes of valid chunks.

2. Finding Valid Chunks

For every location in the image in parallel, a hierarchical process can classify corresponding rectangular regions at a series of scales as (i) containing no black connected components; (ii) containing a single connected component; or (iii) possibly containing more than one connected component. Under this chunk validity criterion, a region known to contain a single connected component is referred to as valid. A region with no connected component is referred to as vacant. A region possibly containing more than one connected component is referred to as invalid. A valid region with no holes (no white components) is referred to as full. Vacancy, validity, and fullness can be established hierarchically based on the following five rules:

1. A white pixel is vacant and a black pixel is initially both valid and full.
2. The union of two adjacent vacant regions is vacant.
3. The union of two adjacent full regions is full.
4. The union of an adjacent vacant region and valid region is valid.
5. The union of two adjacent valid regions is valid if the components in the two subregions are connected.

Note that under these classification rules, some regions containing a single connected component may be labeled invalid. This uncertainty in the classification arises because the classification process is local, whereas connectivity is a global relation.

Whether or not the components in two adjacent regions are connected can in turn be expressed locally and hierarchically. The condition is met if any black pixel in one region is adjacent to a black pixel in the other region. For example, 4-adjacency can be the criterion for adjacency of black pixels. A region with a black pixel in its right border that is adjacent to a black pixel outside the region is referred to as right-connected. A region with a black pixel in its bottom border that is adjacent to a black pixel outside the region is referred to as down-connected. Right-connectedness and down-connectedness can be established hierarchically based on the following rules:

1. A black pixel is right-connected if the neighboring pixel with offsets (1,0) is also black. A black pixel is down-connected if the neighboring pixel with offsets (0,1) is also black.
2. At odd levels:
   (a) A region is right-connected if either of its children is right-connected.
   (b) A region is down-connected if its bottom child is down-connected.
3. At even levels:
   (a) A region is right-connected if its right child is right-connected.
   (b) A region is down-connected if either of its children is down-connected.

These rules lend themselves to exhaustive hierarchical operations like those described above. To process a square image of width N in a grid of the same width, each processing unit can produce the data items at all levels for a respective pixel. Let $l=0$ at the base level of the hierarchy, with top level $h=2 \log N+1$. The computation is applied to rectangular regions ranging in size from one pixel to the entire image. A processing unit at the current level l of the computation is denoted by P, and the region for which P produces a data item is denoted by R, with subregions r1 and r2 as described in the linking application. The processing unit at level $l-1$ that produced a data item for subregion r2 of R is denoted by P2. P itself produced a data item for subregion r1 of R at level $l-1$. At each step, communication between processing units is implemented by shifting the array. The offsets of P2 from P $(x_{o2}, Y_{o2})$ are $(0, 2^{(l-1)/2})$ at odd levels and $(2^{l/2-1}, 0)$ at even levels.

Figure 19:
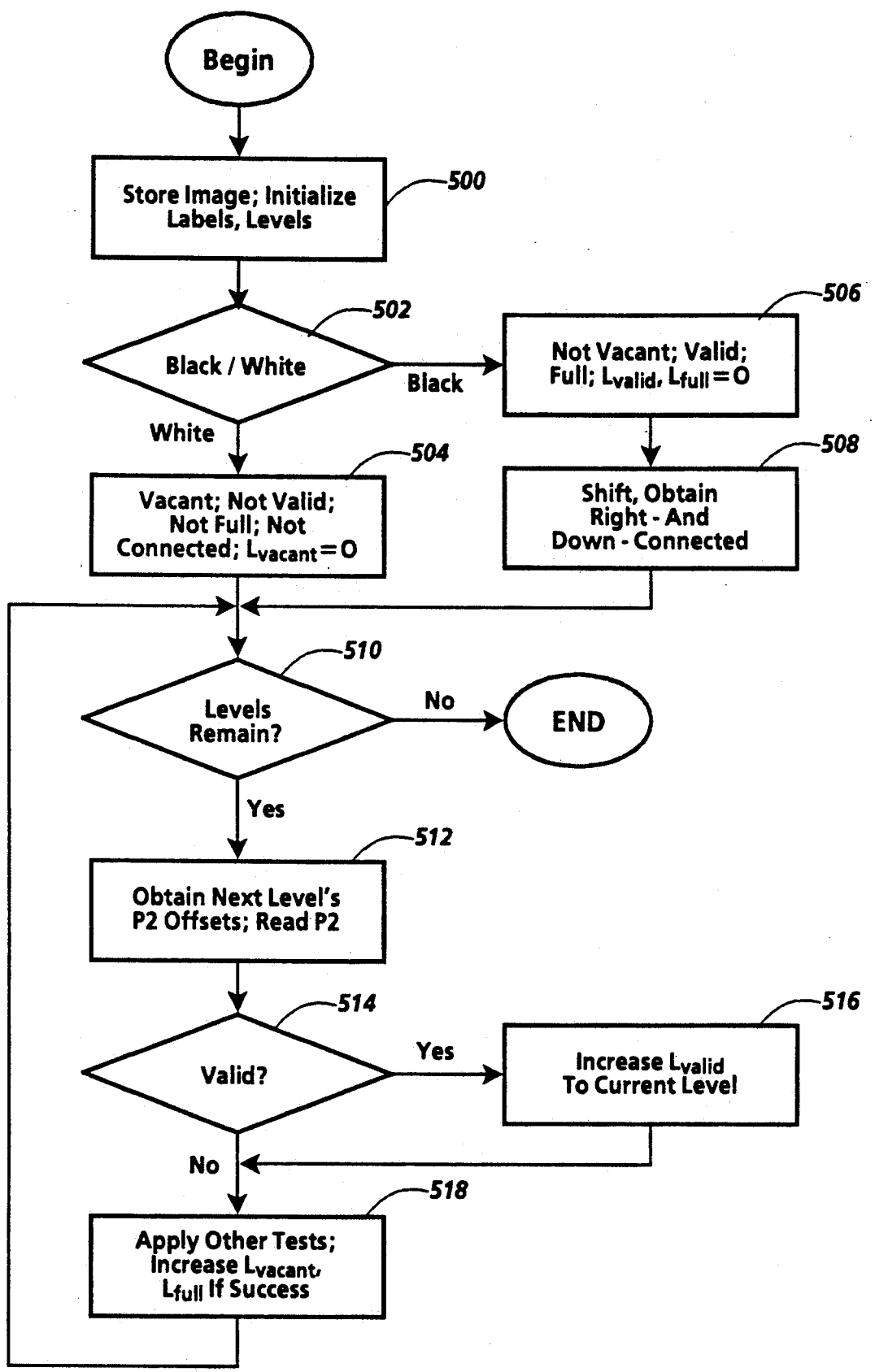
FIG. 19 illustrates an operation which finds the results of various test for the respective region at every pixel at all hierarchical levels.

The operation in FIG. 19 finds, for every pixel at all hierarchical levels, the results of the valid, vacant, and full tests for the respective region. In addition, it encodes the results by recording the maximum level at which each test succeeds.

The step in box 500 begins by storing the image and initializing label bits and level bits for each processing unit. Label bits can include bits for the results of the valid, vacant, full, right-connected, and down-connected tests. Level fields can include $L_{valid}$, $L_{vacant}$, and $L_{full}$.

The step in box 502 branches at each processing unit based on whether its pixel is white or black, to produce the appropriate data for the lowest level of the hierarchy. If white, the step in box 504 sets the vacant label to "on," sets the other labels to "off," and changes $L_{vacant}$ to zero. If black, the step in box 506 sets the valid and full labels to "on," sets the vacant label to "off," and changes $L_{valid}$ and $L_{full}$ to zero. The step in box 508 then shifts the pixel values to provide data so that each processing unit can determine whether it has a black pixel that is right- or down-connected, with each label being set accordingly.

Operations relating to a topological class and local extent are described in detail in copending, coassigned U.S. patent applications Ser. No. 07/535,213 entitled "Heirarchical Operations on Border Attribute Data for Image Regions", which is incorporated herein by reference in its entirety.

The step in box 510 then begins an iterative loop that produces each of the higher levels of the hierarchy. To begin, the step in box 512 obtains the level's offsets to P2, which are used by each processing unit to read the labels in its P2. Then, in box 514, each processing unit applies the validity criterion, saving the result in its valid label. The step in box 516 increases $L_{valid}$ to the current level if the criterion was met. The step in box 518 applies the other tests, saving the results in the labels and increasing $L_{vacant}$ and $L_{full}$ if successful with the respective tests.

The operation in FIG. 19 produces a complete encoding of the results across scales from which it is easy to later recover results at any given scale. Specifically, suppose $L_{valid}$, $L_{vacant}$, and $L_{full}$ are the maximum valid, vacant, and full levels at a processing unit P. Suppose the null value for these measures is $-1$; that is, $L_{valid}=1$ at P if P does not find a valid region at any scale. Then, P would be labeled valid at level 1 if (i) $1>L_{vacant}$; and (ii) $1 \leq L_{valid}$. P would be labeled vacant at level 1 if $1 \leq L_{vacant}$. P would be labeled full at level 1 if $1 \leq L_{full}$.

3. Orientation

The orientation of local segments of the boundary of the component in a valid region can also be measured hierarchically.

Eight configurations of pixels in a two pixel by two pixel neighborhood are defined in Table I. The top-left, top-right, bottom-left, and bottom-right positions of the pixels are indicated by tl, tr, bl, and br, respectively. The eight configurations are referred to as edge pairs.

TABLE I

| Quadrant: | tl | tr | bl | br |
|---|---|---|---|---|
| N-edge | 0 | 0 | 1 | 1 |
| NE-edge | 1 | 0 | 1 | 1 |
| E-edge | 1 | 0 | 1 | 0 |
| SE-edge | 1 | 1 | 1 | 0 |
| S-edge | 1 | 1 | 0 | 0 |
| SW-edge | 1 | 1 | 0 | 1 |
| W-edge | 0 | 1 | 0 | 1 |
| NW-edge | 0 | 1 | 1 | 1 |

Based on the number of instances of each of these configurations whose origin, which can be the top-left pixel, falls within a valid region, it is possible to estimate the straightness and, if appropriate, the orientation of a component region. The number of instances of a particular edge pair is referred to as an edge pair count. Each edge pair count for a region can be obtained by summing the corresponding counts for its child regions.

It follows from the properties of digitized arcs that a 1-exit region with a perfectly straight boundary gives rise to either one or two positive edge-pair counts. There is a simple correspondence between the quadrants and the non-zero edge counts which leads to the following formulas for estimating the displacements of a straight edge in x and y, from which the orientation can be calculated using table lookup or an arctan procedure. The respective edge-pair counts are denoted by N, S, E, W, NE, NW, SE and SW, as indicated in Table I. In the first quadrant $dx=N+NW$, $dy=W+NW$. In the second quadrant, $dx=S+SW$, $dy=W+SW$. In the third quadrant, $dx=S+SE$, $dy=E+SE$. In the fourth quadrant, $dx=N+NE$, $dy=E+NE$.

The population of a quadrant is defined to be $\max(|dx|,|dy|)$. A pixel p may be assigned an orientation if for some valid region R with upper left corner at p (i) the maximum quadrant population in R exceeds some constant $\epsilon$, the smallest x or y displacement for which a useful orientation estimate may be measured; (ii) the non-maximal populations are all small enough relative to the maximum population (i.e., the edge in the region is straight enough).

Figure 20:
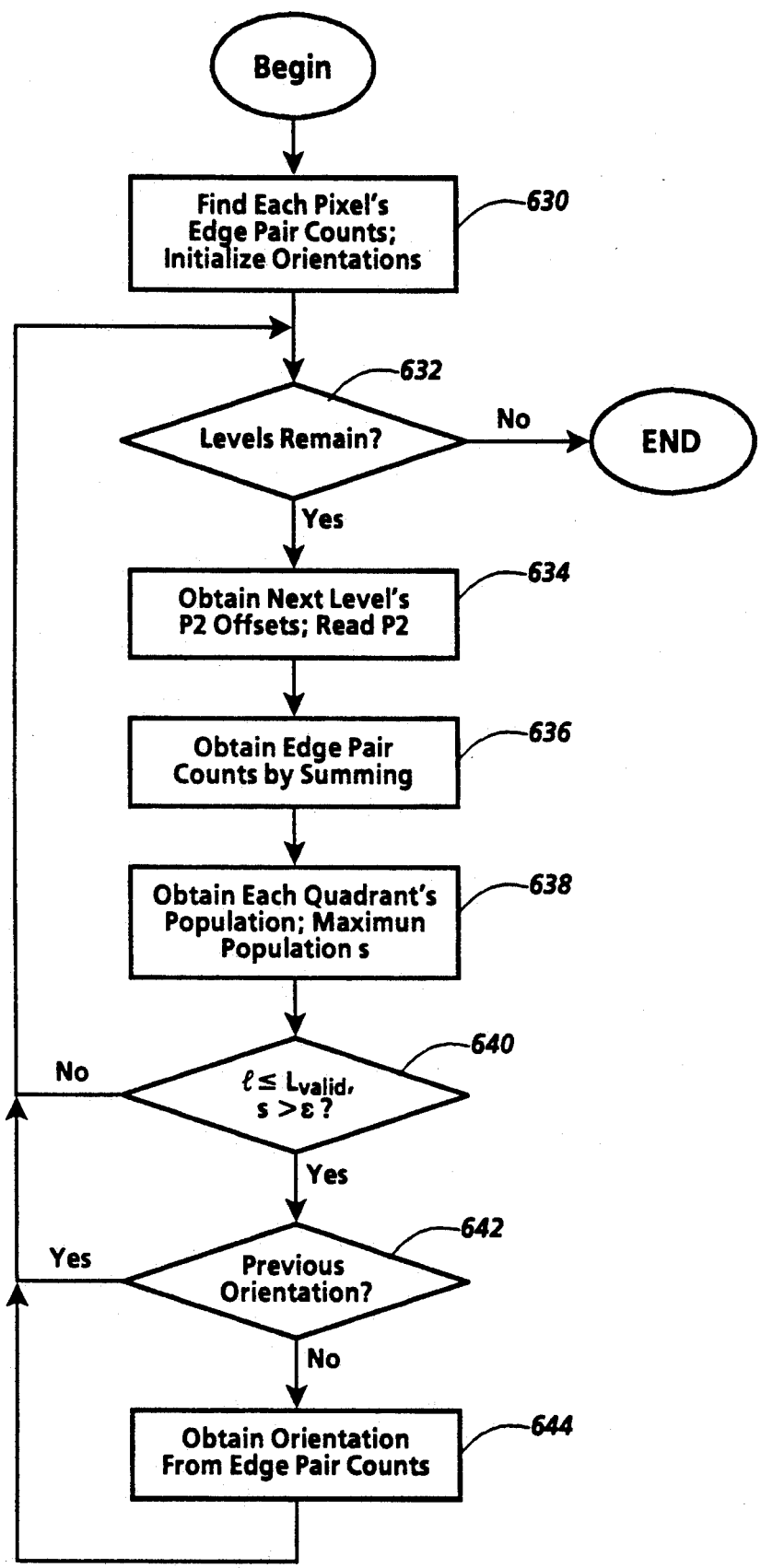
FIG. 20 shows an operation which obtains an orientation at each pixel that satisfies constraints according to the invention.

The operation in FIG. 20 obtains an orientation at each pixel that satisfies all of these constraints. The step in Box 630 begins by finding, for each pixel, the edge pair counts for the two pixel by two pixel region of which the pixel is in the top-left corner. The edge pair counts will all be zero except one. This step also initializes an orientation field for each processing unit. The step in Box 632 begins an iterative loop that continues from $l=1$ to $2\log\epsilon$. The step in Box 634 begins the iterative loop by obtaining the next level's P2 offsets and using them to read the edge pair counts from P2. The step in Box 636 obtains edge pair counts by summing edge pair counts from the next lower level. The step in Box 638 obtains each quadrant's population using the formulas above, and then obtains the maximum population s of the quadrants. The step in Box 640 determines whether the current level is valid and whether s is greater than $\epsilon$. If so, and if the step in Box 642 determines that no previous orientation has been stored for the processing unit, the step in Box 644 obtains the region's orientation from the edge pair counts, such as by table lookup or an arctan procedure.

4. Curvature

The curvature of local segments of the boundary of the component in a valid region can also be measured hierarchically.

The orientation change along the boundary in a 1-exit region may be modeled in terms of an abrupt change between two straight segments of the boundary. Suppose each quadrant is bisected into two octants. Assuming that both straight segments do not fall in the same octant, there is a simple correspondence between the octants and the non-zero edge counts which leads to the following formulas for estimating the displacements of a straight segment in x and y, from which the orientation of each segment can be calculated using table lookup or an arctan procedure.

The respective edge-pair counts are again denoted by N, S, E, W, NE, NW, SE and SW. Let the octants corresponding to a given quadrant q be denoted by $q_a$ and $q_b$, where the a octant includes the horizontal and the b octant includes the vertical. In octant $1_a$, $dx=N+NW$, $dy=NW$. In octant $1_b$, $dx=NW$, $dy=W+NW$. In octant $2_a$, $dx=S+SW$, $dy=SW$. In octant $2_b$, $dx=SW$, $dy=W+SW$. In octant $3_a$, $dx=S+SE$, $dy=SE$. In octant $3_b$, $dx=SE$, $dy=E+SE$. In octant $4_a$, $dx=N+NE$, $dy=NE$. In octant $4_b$, $dx=NE$, $dy=E+NE$.

The population of an octant is defined to be $\max(|dx|,|dy|)$. A pixel p may be assigned an orientation in a given octant if for some valid region R with upper left corner at p, the population in R for that octant exceeds some constant $\epsilon$, the smallest x or y displacement for which a useful orientation estimate may be measured. p may in addition be assigned an orientation difference with respect to R if two octants account for close to half of the edge pixels in R. A useful measure of orientation difference for estimating curvature is the acute orientation difference $\delta_\theta(\theta_1, \theta_2)$, $0 \leq \theta_1, \theta_2 < 360$, which is defined as follows:

$$\delta_\theta(\theta_1,\theta_2)=\min(\theta_h-\theta_l, (\theta_l+180)-\theta_h),$$

where $\theta_h=\max(\mod(\theta_1, 180), \mod(\theta_2, 180))$ and $\theta_l=\min(\mod(\theta_1, 180), \mod(\theta_2, 180))$.

An operation similar to that of FIG. 20 can be used to measure local orientation differences.

5. Thin Chunks

For some geometric measures and operations, highly elongated chunks are more effective than compact chunks such as the square or one-to-two rectangles encountered above. One pixel wide vertical and horizontal single-component regions across a range of lengths—referred to as slices—support more robust computation of local width of elongated image components than compact rectangular regions do. This is because where narrow components merge or are closely spaced, maximal single component regions are forced to be small, making a region-based measure of local width, such as area/perimeter, ineffective. The local width of an elongated figure at a given point is better approximated by the minimum of the lengths of vertical and horizontal slices of the figure that include that point.

Figure 21:
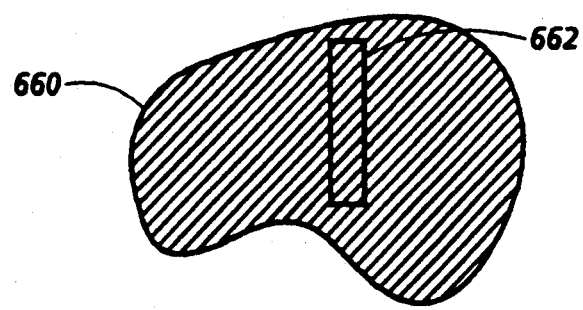
FIGS. 21(a)-21(c) illustrate three single connected black components slices intersecting a component.
Figure 21:
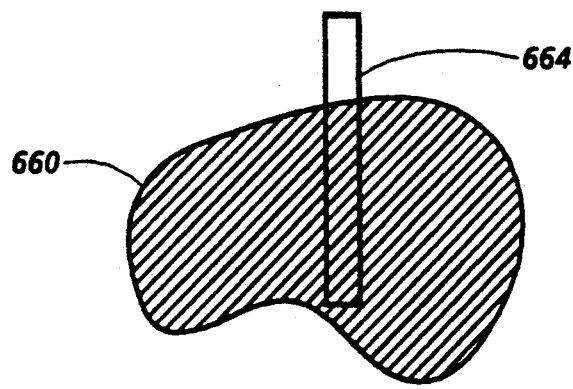
Figure 21:
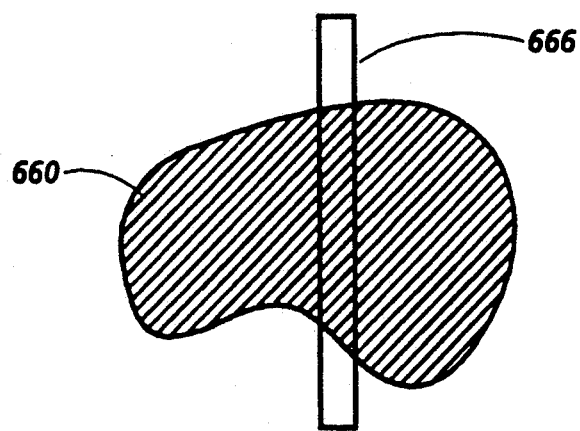

FIGS. 21(a)-21(c) illustrate the simplicity of the geometry of single connected black component slices by showing three vertical slices intersecting component 660. Edges in a slice correspond to border-edges in a compact chunk. A single-component-slice can have zero, one, or two edges. Slice 662 is completely within component 660 and therefore has zero edges. Slice 664 emerges from component 660 at one end and therefore has one edge. Slice 666 emerges from component 660 at both ends and therefore has two edges.

The number of exits in a single component slice is defined to be the number of edges. There is only one geometric property associated with a single-component-slice—length, which is the pixel count over the slice. Slices with two edges support the computation of local width. Slices, like compact rectangular chunks, map well to binary hierarchical processes in two dimensions operating on a rectangular image tessellation. In general, the exhaustive hierarchical operations described herein can be used for slices with minor modifications. Operations for vertical slices are variants of the corresponding operations for compact chunks except that they idle at even levels. Operations for horizontal slices idle at odd levels. To idle, in the case of in-place computations, means to do nothing at all, as illustrated in FIG. 14. In the case of computations on a BIJ or BIJ emulation, processing units at an idling level simply read the results computed by their child processing units and store them for use by their parent. By idling at even levels, the computation skips all horizontal communication in the BIJ, and vice versa.

6. Propagation

The above operations all fit within the general chunking operation described in relation to FIG. 18. Furthermore, although described and implemented separately, all of the above operations could be performed at once in a single upward hierarchical pass, provided that the memory available to each processing unit is sufficient to store its results. Additional operations are required to propagate data such as chunk attributes within an image.

Propagation operations can perform several functions. A chunk attribute can be propagated to the pixels of the chunk, referred to as labeling. All of the pixels of a component can be labeled, referred to as component labeling. A set of processing units can be selected by propagating data.

7. Labeling

In general, the operations described above establish topological and geometric properties for regions at a series of scales and store the results for any given region at a particular image location—the upper left corner pixel of the region. "Label propagation" or "labeling" is the operation of transmitting such results from the pixels where they are originally stored to the other pixels in each respective region. Given such an operation, it is possible to label each black pixel with the topological class and geometric properties of some component to which it belongs. Subsequently, it is possible to select, or single out, all pixels labeled with similar values of a given property in parallel.

Label propagation is complicated by the fact that in an exhaustive hierarchical representation, each pixel belongs to many regions, not just one. Thus, a given black pixel will in general be part of many components defined by valid regions. Some criterion is therefore required for deciding from which of all these components a pixel should take its label for a given property. The term "saliency criterion" is used herein to refer to such a criterion, and the choice of a saliency criterion may be made differently for different properties. In the following paragraphs, saliency criteria and propagation operations are presented for several measures described above.

It is often useful for a pixel to take on the maximum (or minimum) of the attribute values associated with the components that include it, so that the maximum criterion and minimum criterion are both useful saliency criteria. The maximum criterion is appropriate, for example, for topological class, local extent, and local width.

If there were independent storage at each level of the hierarchy, component properties could be propagated to the included pixels by a straightforward hierarchical process, downward through the hierarchy from parent to child. For each valid region, the saliency criterion would be applied to choose between that region's value of the attribute A in question and the parent value. That is, $A(c1)=\max(A(p), A(c1))$ and $A(c2)=\max(A(p), A(c2))$.

In an exhaustive hierarchical process care must be taken with processes that move information downwards in the hierarchy, however, because there is potential for data-clobbering. Unlike a tree, each processing unit has two parents—it is the first child of one parent and the second child of another. Therefore, if the processing units at level 1 of a computation modify a variable v in both children, a processing unit P modifying variable v in its second child P2 must respect the fact that v in P2 holds a result computed by some other processing unit for which P2 was the first child.

Figure 22:
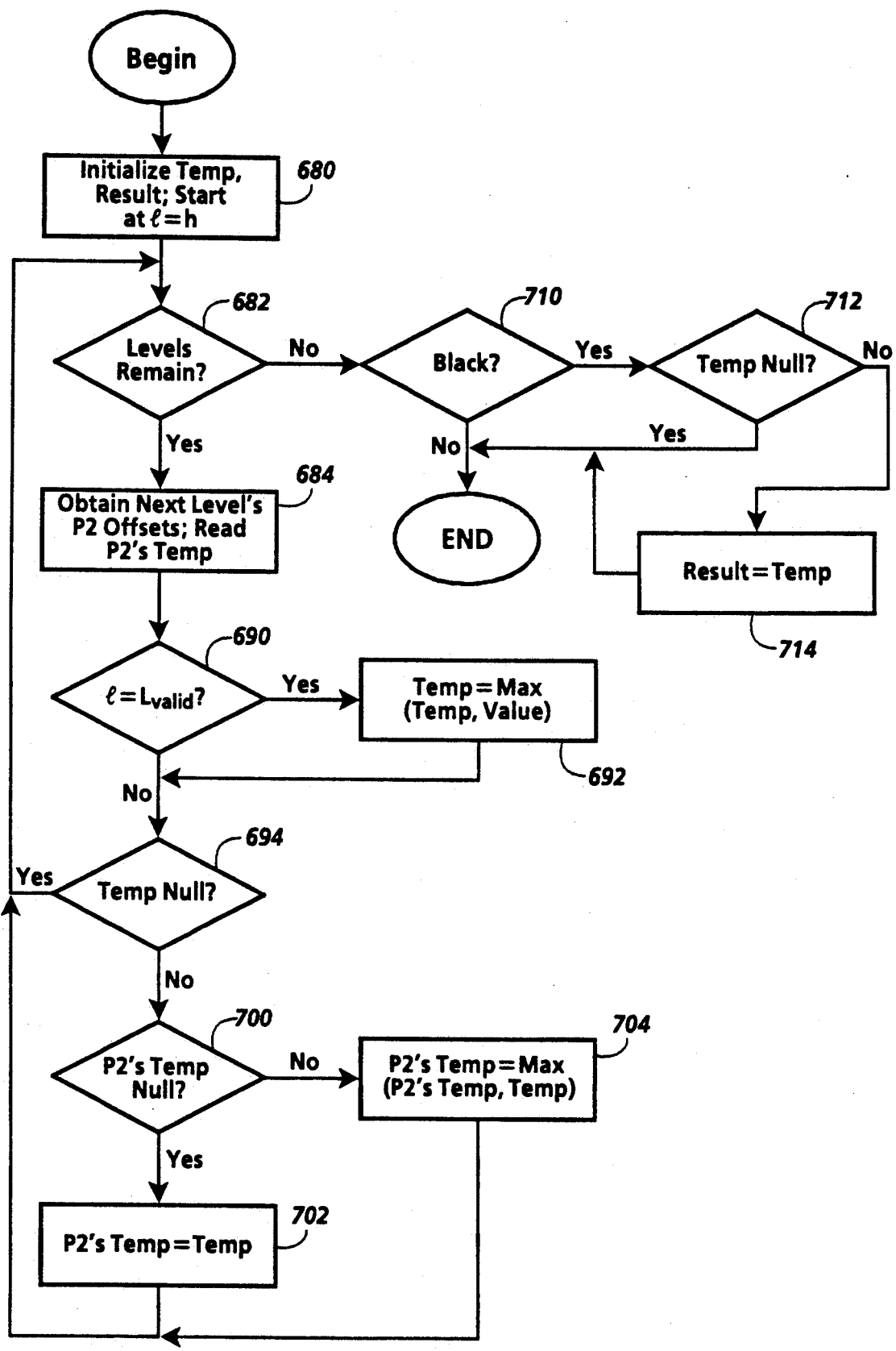
FIG. 22 shows a downward propagation operation that uses a maximum criterion.

FIG. 22 shows a downward propagation operation that uses a maximum criterion. The step in Box 680 begins by initializing Result and Temp fields for each processing unit to a null value and by starting at the top level of the hierarchy, where $1=h$. Each processing unit also has a Value field that contains the value of some attribute at each pixel.

The step in Box 682 begins an iterative loop that operates on each level of the hierarchy down to $l=1$. The step in Box 684 begins the iterative loop by obtaining the offsets to P2 on the next lower level and by using the offsets to read P2's Temp field. The step in Box 690 then determines whether the current level l is $L_{valid}$. If so, the step in Box 692 applies the maximum criterion by setting the Temp field to the maximum of its previous value and the Value field from this processing unit, which can introduce new values into the operation at each level for which any processing unit has $L_{valid}$. If the step in Box 694 determines that the Temp field has the null value, no propagation is performed, and the operation returns to the step in Box 682.

If Temp does not have the null value, the step in Box 700 branches based on whether the value of Temp from P2 has the null value. If so, the step in Box 702 writes the value in Temp to P2's Temp field. But if not, the step in Box 704 applies the maximum criterion by setting P2's Temp field to the maximum of its previous value and the value from Temp.

When all the levels of the hierarchy have been handled, the step in Box 710 determines whether this processing unit's respective pixel is black. If so, and if the step in Box 712 determines that Temp is not the null value, the step in Box 714 sets the Result field to the value in the Temp field.

The step in Box 710 could be omitted to label all pixels with the propagated value, not just the black pixels. The operation of FIG. 22 could also be changed to use a minimum criterion simply by modifying the steps in boxes 692 and 704 to apply the minimum criterion.

In some cases, it might useful for a pixel to take its value for a given attribute from the component that maximizes or minimizes some other property, such as area or scale, which could be implemented by a simple extension of the above operation. For example, for orientation it is preferable for a pixel to take its value from the minimum-scale including component that has a non-null value. As described above, orientation is non-null for regions with a pixel count above some minimum required for getting a good orientation estimate. A simple modification of the operation in FIG. 22 above would propagate minimum scale geometric labels to the corresponding component pixels, using a non-null saliency criterion, simply eliminating the step in Box 704. A more complex criterion for orientation is that a pixel should take on the value associated with the largest including component that is straight enough, i.e., has a curvature below some threshold while maximizing pixel count.

8. Component Labeling

Component labeling, or coloring, provides the capacity for figure/ground separation. Coloring operations make it possible to pull out a particular curve or region in the image. Coloring can be viewed as an operation on a graph. In a conventional implementation of binary image component labeling, each black pixel may be treated as a node of the graph, and each four-adjacency between black pixels, in the four-connected case, may be treated as an edge. Coloring can then be performed iteratively by, at each step, coloring all uncolored nodes that share an edge with a colored node. Note that at each step information is transmitted across each edge, in some sense. Therefore, coloring requires propagation of data. Coloring image chunks can be more efficient than pixel-by-pixel coloring because fewer steps are required. Viewing chunk coloring as an operation on a graph, each chunk can be treated as a node in the graph and each intersection between the components of two chunks can be treated as an edge. It can be seen that the number of iterations for chunk coloring is essentially independent of scale and is determined mainly by the shape of the figure being colored.

In each iteration of chunk coloring, information is transmitted by a hierarchical process consisting of one upward pass and one downward pass. During the upward pass, a valid parent becomes colored if either of its children is colored. During the downward pass, a colored parent colors both of its children. Given any set of initially colored locations, repeated iterations of this basic coloring operation will color all pixels connected to the starting pixels. The operation may be terminated when no new pixels, or not enough new pixels, are colored at a step.

Figure 23:
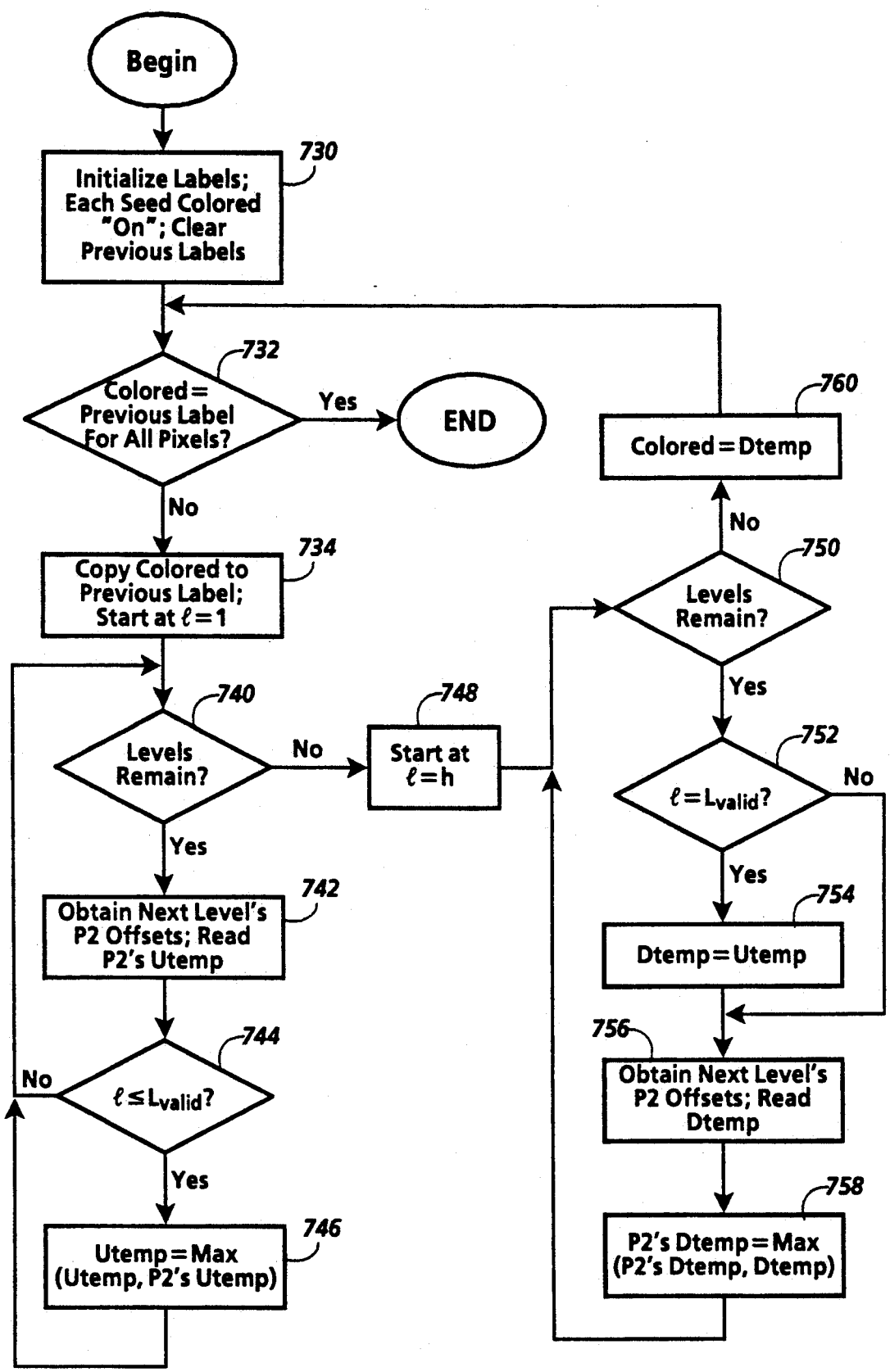
FIG. 23 shows a chunk coloring operation that continues until no new pixels are colored.

FIG. 23 shows a chunk coloring operation that continues until no new pixels are colored. The step in Box 730 begins by initializing labels. In addition to a Colored label, each processing unit has Previous Label, Utemp and Dtemp labels in this implementation. The step in Box 730 initializes the Colored label of each seed pixel to be "on," clears each Previous Label.

The step in Box 732 determines whether every processing unit's Colored label is equal to its Previous Label, which is the test for termination of the operation. If not, the step in Box 734 copies each processing unit's Colored label to its Previous Label, and prepares for an upward pass starting at l=1.

The step in Box 740 begins an iterative loop that performs the upward hierarchical pass. The step in Box 742 begins by obtaining the next level's offsets to P2 and using the offsets to read P2's Utemp label. The step in Box 744 determines whether this level l is at or below the level indicated by $L_{valid}$, in which case the step in Box 746 sets the Utemp label to the maximum of the previous Utemp label and the Utemp label read from P2, applying a maximum criterion.

When the upward pass completes the top level of the hierarchy, the step in Box 748 prepares for a downward pass starting at l=h. The step in Box 750 begins an iterative loop that performs the downward hierarchical pass. The step in Box 752 determines whether this level l is the level indicated by $L_{valid}$, in which case the step in Box 754 introduces data from the upward pass by setting the processing unit's Dtemp label to the value of its Utemp label. Then the step in Box 756 obtains the next level's offsets to P2 and reads P2's Dtemp label. The step in Box 758 sets P2's Dtemp label to the maximum of Dtemp and the value from P2 read in Box 756.

When the downward pass is completed, the step in Box 760 sets each processing unit's Colored label to its Dtemp label before returning to the test in Box 732.

The operation in FIG. 23 could be modified to color white regions by using $L_{vacant}$ instead of $L_{valid}$. The operation in FIG. 23 is not limited to coloring a single component, but could be performed to color a number of components, each including one or more of the seed pixels.

9. Selection

Selective processing refers to the preferential allocation of processing resources to a set of image components that have similar local geometric properties. If each pixel has been labeled with the geometric properties of an including component, selective processing may be achieved by first performing a selection operation to select a set of pixels labeled with similar values of the given property, and then performing the processing in question on the selected set of pixels. A pixel may be selected by setting a single bit label "on" in its processing unit.

If S denotes the single bit label indicating selection in each processing unit, and v denotes the value of an attribute with a range of interest between low limit l and high limit h, a selection criterion can be defined as follows:

$$S \neq \begin{cases} 1 \text{ if } l \leq p \leq h \\ 0 \text{ otherwise.} \end{cases}$$

Selection criteria can be nested because the result of selection is the labeling of each pixel with a value that can be treated as an attribute. If $S_1$ and $S_2$ denote respective single bit labels of two selection criteria, the first selection criterion can be defined as above for a first attribute and the second selection criterion can be defined as follows for a second attribute:

$$S_2 = \begin{cases} 1 \text{ if } S_1 = 1 \text{ (i.e. } 1 \leq S_1 \leq 1) \text{ and } l \leq p \leq h \\ 0 \text{ otherwise.} \end{cases}$$

Figure 24:
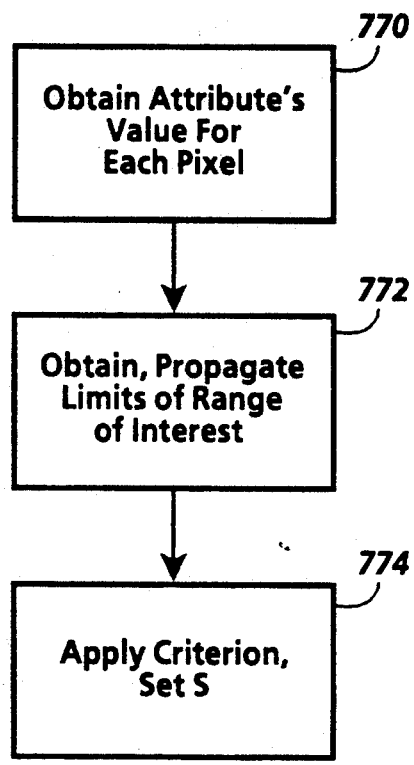
FIG. 24 illustrates general steps in applying a selection criterion to perform a selection operation.

FIG. 24 illustrates general steps in applying a selection criterion to perform a selection operation. The step in Box 770 performs preliminary operations that produce the value of the attribute of interest at each pixel. This step can include operations like those discussed above in relation to attributes of valid chunks as well as labeling. Then, the step in Box 772 obtains the low and high limits of the range of interest, and propagates the limits to all of the processing units. The step in Box 774 uses the low and high limits to apply the selection criterion to the value at each processing unit, setting S to its appropriate value as a result.

The step in Box 772 can be performed in a number of ways, including deriving limits from the attribute value at a current focus pixel or from salient values of the global distribution of attribute values. These two approaches may be called locally-driven selection and globally-driven selection.

Locally-driven selection is grounded in the notion of a processing focus, a particular pixel in the image upon which certain image analysis operations may be applied. Dots in an image can be counted using a processing focus to examine each dot in turn with shift and mark operations as follows: while unseen dots remain—(i) shift to an unseen dot; (ii) mark this dot seen and add 1 to the count; (iii) repeat.

Locally-driven selection singles our components of the image similar to the one that includes the current focus pixel. That is, in locally-driven selection the range of selection is determined by the attribute's value at the focus pixel. For example, if the focus pixel is on a curve, selection could be based on a value defined at that location for an attribute such as topological class (e.g., 2-exit), width, oreintation, and so on.

Figure 25:
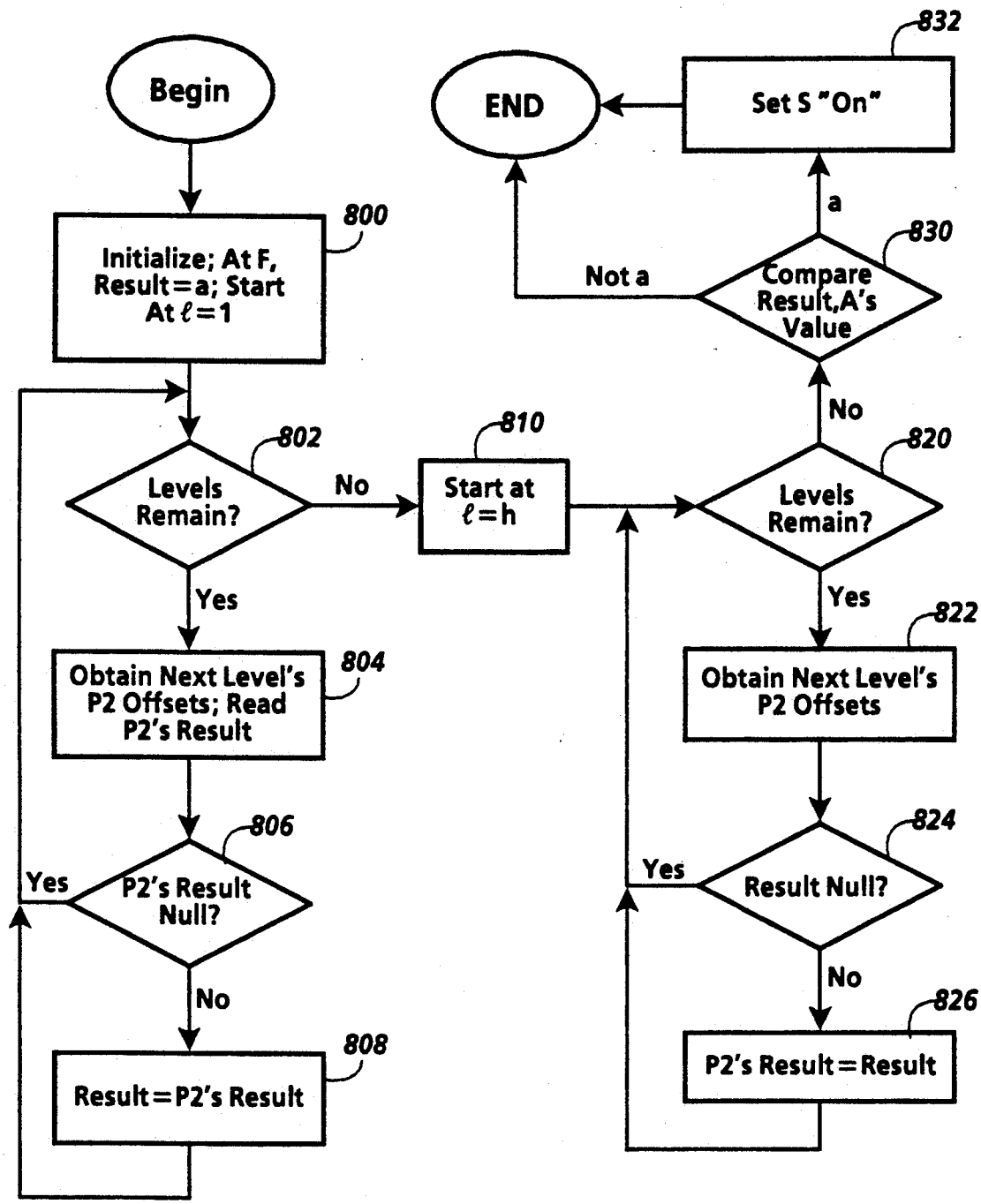
FIG. 25 illustrates an operation that labels all pixels that are similar to the current focus pixel according to the invention.

The current focus pixel can be labeled by a single bit F, which is "on" at the current focus pixel's processing unit and "off" at all other processing units. FIG. 25 illustrates an operation that labels all pixels that are similar to the current focus pixel with respect to an attribute A by propagating a, the value of A at the current focus pixel, to every other pixel, and then doing a comparison at every pixel to determine whether to set the selection label S to "on." The propagation includes one upward pass and one downward pass through the hierarchy, with the upward pass reading a to the upper left corner pixel of the image and the downward pass distributing a from there to every other pixel. The operation in FIG. 25 thus performs the steps in boxes 772 and 774 in FIG. 24.

The step in Box 800 initializes each processing unit, clearing S to "off" and, for the processing unit at which F is "on," setting a Result field to the value a. Result is set to a null value in all other processing units. The operation begins with l=1, in preparation for the upward pass.

The step in Box 802 begins an iterative loop that performs the upward pass, with the step in Box 804 obtaining the next level's offsets to P2 and using them to read P2's Result field. The step in Box 806 determines whether P2's Result has the null value and, if not, the step in Box 808 sets the Result field to the value from P2's Result.

When the upward pass is completed, the step in Box 810 prepares for the downward pass with l=h. The step in Box 820 begins an iterative loop that performs the downward pass, with the step in Box 822 obtaining the next level's offsets to P2. The step in Box 824 determines whether the Result field has the null value and, if not, the step in Box 826 uses the offsets from Box 822 to set P2's Result field to the value from Result.

When both passes are completed, the step in Box 830 compares the value in Result with each processing unit's value for A. The comparison can test for equality or for a difference that is less than a defined amount. If Result, which has the value a in every processing unit, is sufficiently similar to the value of A, the step in Box 832 sets S "on" to indicate that the processing unit is selected.

Figure 26:
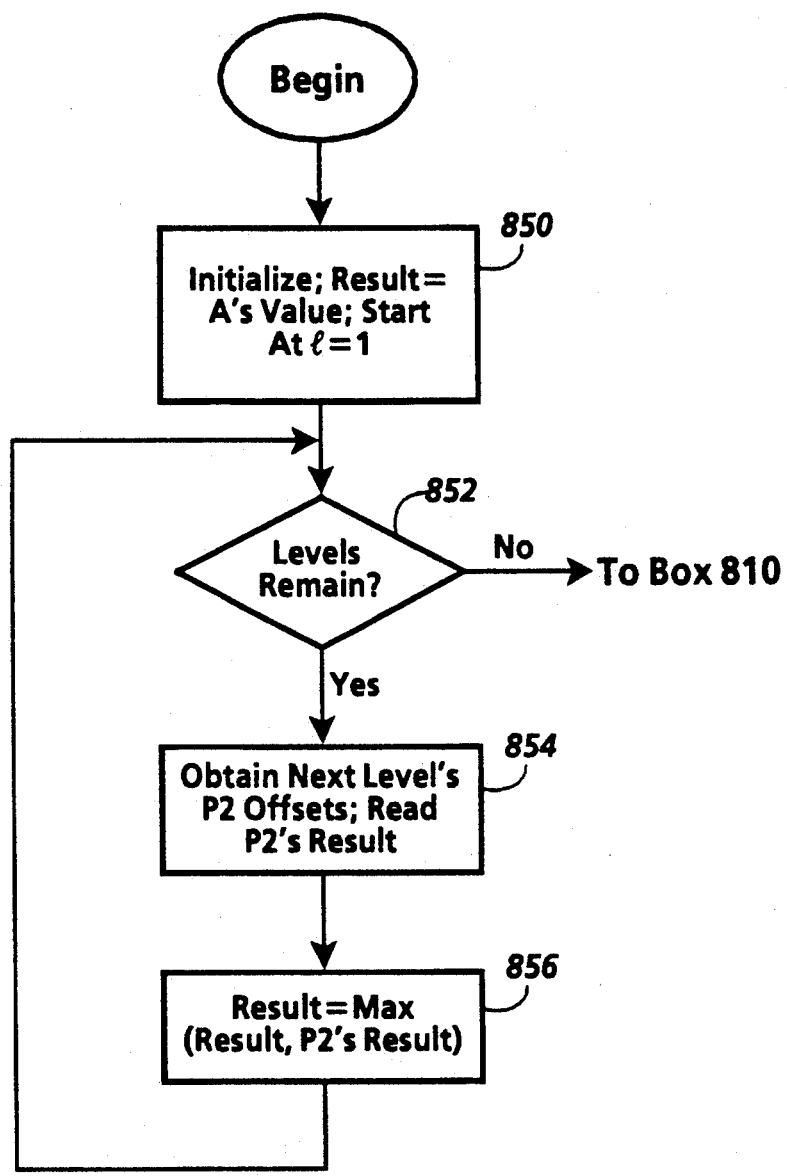
FIG. 26 illustrates an operation that propagates a globally salient maximum value to the upper left corner of an image, after which it can be propagated downward as in FIG. 25.

In contrast to locally-driven selection, globally-driven selection is selection based on a salient value of the global distribution of a local attribute, such as the maximum, minimum, or a prominent value. As explained more fully below, a prominent value is one whose population is large compared to most other values. FIG. 26 illustrates an operation that propagates a globally salient maximum value to the upper left corner of an image, after which it can be propagated downward as in FIG. 25.

The step in Box 850 initializes each processing unit, setting its Result field to its value for the attribute A. The level is set to l=1 to begin an upward pass through the hierarchy.

The step in Box 852 begins an iterative loop that performs the upward pass, with the step in Box 854 obtaining the offsets to P2 and using the offsets to read P2's Result field. The step in Box 856 then applies the maximum criterion to set Result to the maximum of its previous value and P2's Result. When all the levels have been handled, the operation can continue as in Box 810 in FIG. 25.

The operation in FIG. 26 could readily be modified to apply a minimum criterion instead of a maximum criterion.

Various operations can be performed on selected pixels once the selection operation is completed. For example, a coloring operation can be performed to propagate values from the selected pixels to other pixels in the same components. When the coloring operation of FIG. 23 is applied to the result of selection, performance can be moderately improved by computing $L_{valid}$ for the set of selected pixels and passing it to the operation in FIG. 23. This is usually worthwhile since it takes less time than a single coloring step. A simple modification to the operation in FIG. 23 applies it selectively—a pixel's Colored label is set "on" in Box 760 only if the pixel is in the selected set.

10. Finding Prominent Values

As noted above, a prominent value for an attribute can be used in establishing a range of limits for a selection criterion. One example of a prominent value is a mode, which can be defined as the most common value of a distribution. A local hierarchical operation can establish the mode when the mode is sufficiently prominent, that is, when the population associated with the mode is large enough compared to the populations of other values. Because the result of such a process is not necessarily the true mode, we refer to it as the hierarchical mode. The basic idea is that given a region R with two subregions r1 and r2, the hierarchical mode in R is simply the subregion mode with greater associated population.

Figure 27:
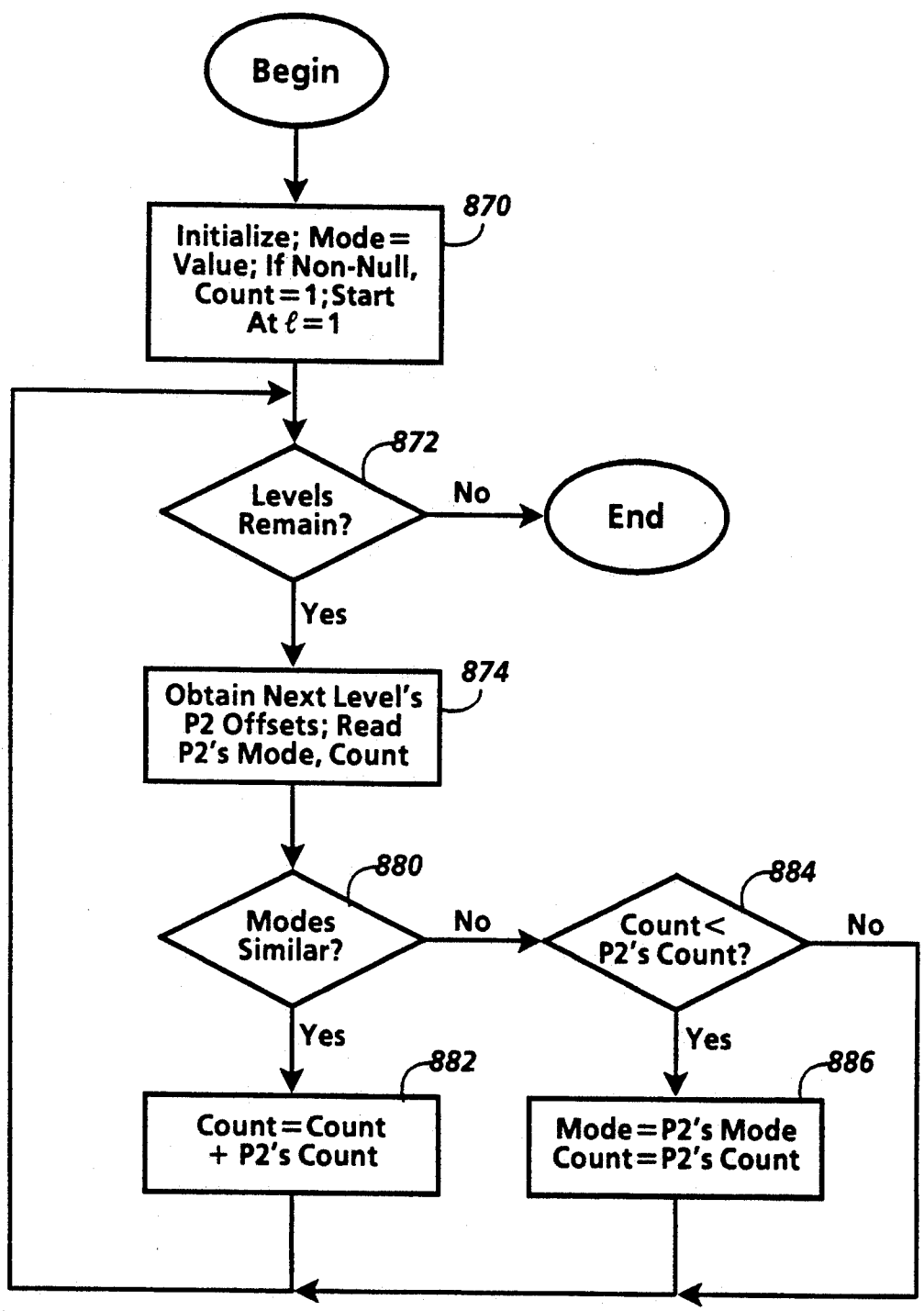
FIG. 27 shows an operation which finds a hierarchical mode and stores the result for further operations.

The operation in FIG. 27 finds a hierarchical mode, storing the result in the upper left corner of the image so that, for example, it can be propagated downward in a selection operation as in FIG. 25. The step in Box 870 begins by initializing, which includes setting a Mode field in each processing unit to equal the value in the Value field for the attribute being analyzed. Also, if the value in the Value field is non-null, a Count field in each processing unit is set to one. The level is set to l=1 to start an upward pass through the hierarchy.

The step in Box 872 begins an iterative loop, with the step in Box 874 obtaining the next level's P2 offsets and reading P2's Mode and Count fields. The step in Box 880 branches based on whether a processing unit's Mode field has a value sufficiently similar to P2's Mode field. The similarity measure used depends on the property in question, and may even be allowed to depend on the value of the property. For extent measures, such as width, more slop may be acceptable in comparing large values than small ones. For orientation, on the other hand, slop should not vary with value, but values must be allowed to wrap around.

If the Mode field values are sufficiently similar, the step in Box 882 sets the processing unit's Count field to be equal to the sum of its previous value and P2's Count field. But if the values in the Mode fields are not sufficiently similar, the step in Box 884 compares the Count fields to determine which Mode field value has a larger count. If P2's Count field is greater, the step in Box 886 changes the Mode and Count fields to have the values in P2's Mode and Count fields.

The steps in boxes 882 and 884 are biased to the mode in the first child, in the event of similar values of Mode or equal values of Count for the two children. This bias can be removed in Box 882 by setting Mode to the result of randomly choosing between its previous value and P2's value for Mode. The bias can be removed in Box 884 by introducing a step that explicitly handles the case of equal values of Count by randomly choosing which of the two values of Mode to accept.

The operation in FIG. 27 does not necessarily detect the true mode because incomplete information about the distribution is transmitted up the hierarchy at each step. The tendency of this operation to detect the true mode may be characterized in terms of the prominence of the mode because as the population of the mode grows in relation to other populations, the likelihood increases that the mode will outnumber other values in a majority of regions at each scale.

As described above, selection operations require the capacity to establish prominent values of the global distribution. The prominence of the hierarchical mode can be heuristically established by comparing its population to the total population—the hierarchical mode is prominent if it corresponds to a sufficiently large fraction of the total population.

Figure 28:
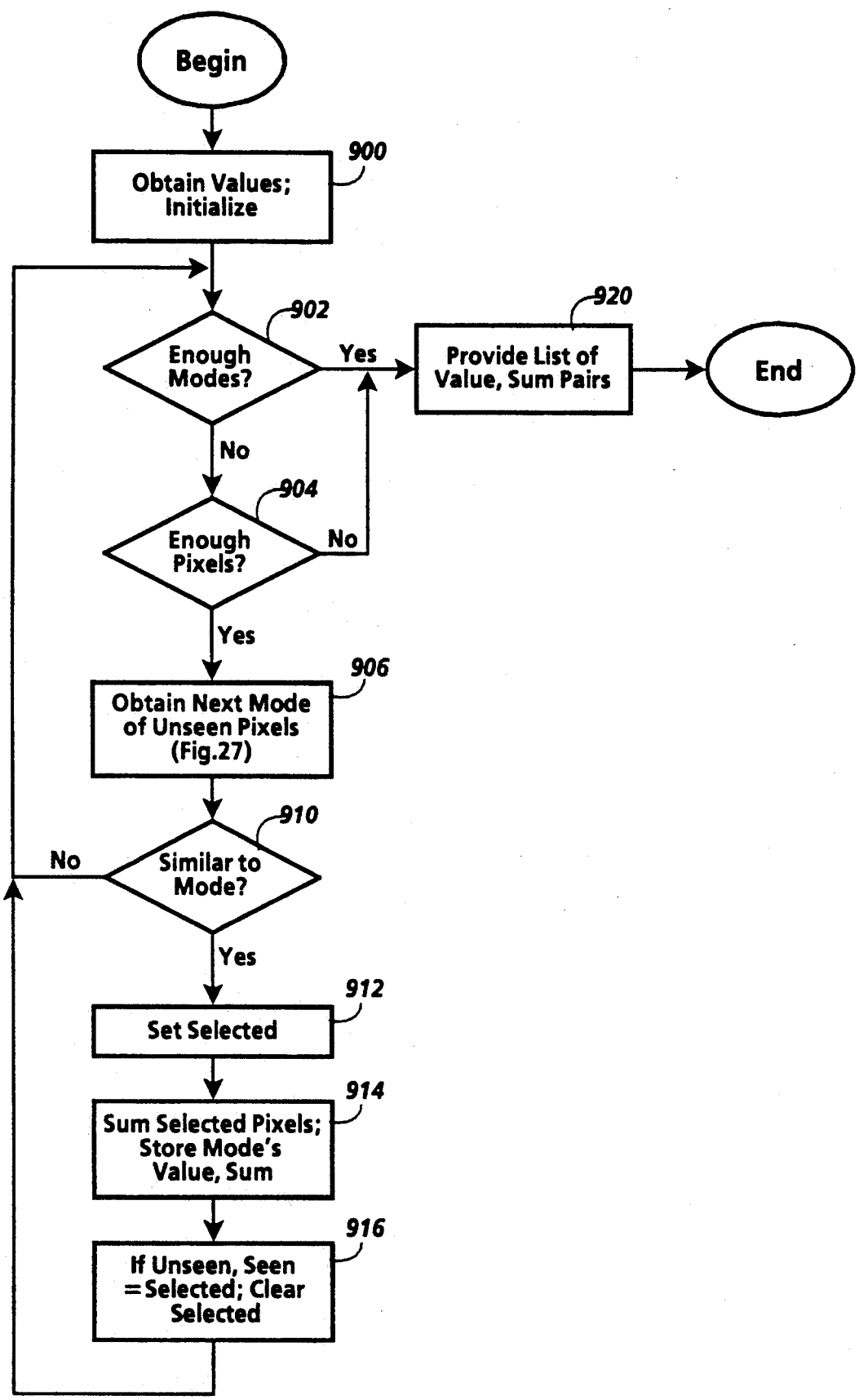
FIG. 28 shows how prominent values of the distribution can be established in sequence by an iterative process.

FIG. 28 shows how prominent values of the distribution can be established in sequence by an iterative process which at each step detects a prominent remaining value and deselects values in some range around that value. Failure to detect the true mode at each step only affects the order in which these prominent peaks are found, and the modes are found in roughly descending order of prominence. The operation in FIG. 28 can be used in scene summarization, because the overall geometric organization of a scene is often largely captured in the global distributions of local topological and geometric attributes. The computational problem of summarization involves characterizing the prominent peaks in the global distribution of each local attribute for a given image.

The step in Box 900 obtains values for the attribute of interest, saving them in a Value field at each processing unit. Other fields are initialized, including a Seen label indicating whether a pixel's Value field is included in a mode that has been found and a Selected label indicating whether a pixel is in the set of the current mode. The step in Box 902 determines whether enough modes have been found, which can be done by keeping a count of modes found and comparing it with a limit. Similarly, the step in Box 904 determines whether enough pixels remain to find additional modes, which can be done by counting the number of pixels with unseen labels "on" and comparing the count with a limit. If enough pixels remain, the step in Box 906 obtains the next mode from among the pixels with Seen labels "off" by following the steps in FIG. 27.

When a mode has been found, the step in Box 910 can apply a similarity test to determine whether each pixel with its Seen label "off" has a Value field sufficiently similar to the current mode to be included in the mode. If so, the step in Box 912 sets the pixel's Selected label "on." The step in Box 914 sums the pixels with Selected labels "on" and stores the value of the mode and the sum of pixels. The step in Box 916 prepares for the next iteration by setting the Seen label equal to the Selected label for each of the pixels whose Seen label was "off" and by then clearing the Selected label.

When enough modes are found or insufficient pixels remain to find further modes, the step in Box 920 provides a list of pairs, each including a mode value and a pixel sum. This list indicates the prominent modes of the attribute of interest, providing a summary of the scene.

The values used in the operation of FIG. 28 could be near neighbor values obtained as described in copending, coassigned U.S. patent application Ser. No. 07/535,438, entitled "Exhaustive Hierarchical Near Neighbor Operations on an Image," incorporated herein by reference.

F. Further Applications

The basic operations of scene analysis can be grounded effectively in simple local geometric units which are defined across a wide range of scales and in a densely overlapping manner at each scale. These image chunks are a critical missing link between traditional pointwise low-level visual representation—such as edge and texture images—and the high-level representation of scene objects and relations. They provide the representational power needed to support processes for controlling visual attention, separating figure from ground, and analyzing shape properties and spatial relations, and yet can be computed in fixed time even on simple, local parallel machines.

One main aspect of the representational power of image chunks is that they provide a useful peephole view of the objects in a scene, often obviating the cost and complications of extensive a priori segmentation into objects or other non-local spatial units. The other main aspect is that they can function as prefabricated spatial building blocks, leading to dramatic speedups in figure/ground separation rates—on simple local machines, chunks seem to provide the primary mechanism for exploiting parallelism in the context of inherently serial processes such as connected component labeling. Both of these aspects rely critically on the fact that image chunks are defined with dense overlap at multiple scales.

Various basic scene analysis operations can be performed on image chunks or representations derived from them. Schemes for selective analysis, summarization, visual indexing, and so on, can be implemented as operations on iconic (or image-like) representations. A local account of visual representation for scene analysis may eventually lead to a perspective in which higher-level vision, abstract spatial reasoning, and behaviors guided by vision are also understood as intrinsically spatial computations grounded directly in image-like representations.

It may be possible to extract the striking curves in a figure, and describe qualitatively the background, without first performing a full segmentation of the image. To distinguish between foreground and background curves in complicated scenes, more extended segments of the foreground curves must be described than the chunking method introduced here would be able to define directly. An efficient local iterative computation could label each point on an image curve with a measure of more global saliency in such situations. If globally salient structures are labeled in this way in a preprocessing stage, chunking operations could be applied selectively to the more salient subset of the image or, for that matter, to the less salient subset.

The techniques described above can be extended to handle color images, rather than binary images, when every object in the scene is uniformly colored, giving rise to a uniformly colored region in the image. (Color, in this context, includes uniform shades of grey.) Single-component region chunking could be extended to label a region as (i) being of a first color; (ii) as having one connected component of a second color and a specified number of connected components, up to four, of the first color; or (iii) as having components of more than two colors. The idea here is to let the components in a two-color-region play the roles that black and white did in the original method, as long as one of the colors is present in a single connected component. The first and second colors are defined on a per-region basis; in other words, the roles of figure and ground are assigned locally by the chunking process. One simple and appealing way of managing the figure/ground assignments is to use a predefined partial order on the set of colors to guide them. Given any two colors, this ordering defines one of them to stand out in relation to the other.

A valid region could be defined to be a region with two colors, the first of which occurs in a single connected component, termed the foreground component. A vacant region is one with only the second color—it lacks a foreground component, so the first color is null. A region with more than two colors is invalid. The notion of a full region vanishes—every single-color region is treated as background. Vacancy and validity can be computed hierarchically based on the following rules:

1. Every pixel is initially vacant.
2. The union of two adjacent vacant regions is vacant if the colors in the two regions are the same. The union of two adjacent vacant regions is valid if the colors in the two regions are different. In that case, the color labels $c_1$ and $c_2$ are assigned arbitrarily to the two colors.
3. The union of a vacant region $r_1$ and a valid region $r_2$ is valid if the color $c_2$ in $r_1$ is the same as one of the colors in $r_2$. The color assignment for the union is the same as the assignment for the valid subregion. (If the color $c_2$ in $r_1$ is the same as the foreground color $c_1$ in $r_2$, the color assignment in $r_1$ must be reversed—$c_1$ becomes $c_2$ and $c_2$ becomes nil—to make the color assignments in the union of the regions consistent with each subregion.)
4. The union of two adjacent valid regions is valid if the colors in $r_1$ are the same as the colors in $r_2$, and the foreground component in $r_1$ is connected to the foreground component in $r_2$.

The foreground components in two adjacent regions are connected if any foreground pixel in one region is adjacent to a foreground pixel of the same color in the other region. This relation may be established hierarchically by virtually the same process that was introduced earlier for the case of a binary image.

The techniques described above generally apply to binary images. Most of the time, however, it is not feasible to transform an image of a natural scene into a binary image in which black regions correspond to the meaningful scene objects. The objects of interest may correspond, at least in part, to image regions that vary slowly or are uniform in one or more local properties, but the properties defining each object are not fixed across all objects in the scene, and may even depend on the task.

Sometimes, pixel properties such as intensity or color, or aggregates of these properties over collections of pixels, are adequate for defining meaningful image regions. This is the case, for example, when every object in the scene is uniformly colored. In such cases, the extension to color or discrete grey images proposed described above may be applied. More often, however, the appropriate local properties for defining image regions correspond to properties of physical markings on surfaces in the scene, or to individual scene objects that appear small in the image. This is the case, for example, when a scene object is painted with polkadots, or when the object of interest is the shape formed on a tabletop by an arrangement of jellybeans.

Texture analysis is the computational problem of detecting the geometric counterparts in the image of these surface markings or scene items, along with the image regions they define. Even in the domain of binary graphic representations (diagrams and text), it is important to be able to define regions on the basis of texture. Regions are often explicitly rendered by halftone shading, cross-hatching, and so on. In running text, regions defined implicitly by the layout of the characters correspond to paragraphs and other text units useful in the reading process.

Single-connected-component chunking techniques may play a useful role in defining texture elements of an image—the geometric events corresponding to surface markings, etc. A textured image breaks up into many minute chunks, and these may provide the texture elements. As such, single- connected-component chunking cannot directly yield information about the texture regions themselves.

Some texture regions have a very salient boundary. This boundary can be a sequence of sharp local differences in the properties of texture elements, and it is immediately striking in the same sort of way that foreground curves can be. Such boundaries may easily be detected in parallel by comparing the properties of neighboring texture elements. If texture boundaries are found in this way in a prepocessing stage, the techniques described above could be applied selectively to these boundaries just as they could to other salient image curves.

Not all discriminable texture regions, however, have salient or easily detectable boundaries. Thus, a scheme for detecting chunks of texture regions directly would be useful in addition to the boundary based method above. It is possible to imagine processes closely analogous to the single- connected-component chunking method in this paper that apply criteria other than connectivity for defining image components. A scheme for defining texture chunks would probably involve a criterion of nearuniformity or slow-variation in specified properties. Such a scheme might in addition characterize the texture by specifying how exactly the properties of texture elements vary within a chunk.

Most scenes give the strong impression that one is immediately aware of some of the objects as units, not piecemeal. It is probably not possible to define a process that pulls out objects in a scene in fixed time by uniform, local parallel computations. It may be possible, however, to define an extremely fast serial, focused object extraction process, one that is minimally serial in the way that scene summarization and selective processing, for example, can be. There are, in that case, two computational issues to account for. The first issue is attention or indexing—the rapid direction of processing resources to the likely locations of important objects. The second issue is figure/ground separation--the process of rapidly making distinct that subset of the image corresponding to a particular scene object.

The figure/ground separation aspect of figural analysis is supported in part by single-connected-component chunking techniques, or their extensions to textured regions, since they provide an effective representation for the rapid component labeling required. For many purposes, proximity relations are involved in defining objects, in addition to connectivity relations; therefore, near neighbor techniques as described in the linking application may also be necessary.

G. Source Code Appendix

Appendix A is source code for implementing some of the features described above. The source code in Appendix A may differ in some respects from the above description, but execution of the source code in Appendix A on a Connection Machine provides substantially all the features described above. In some cases, the code has been optimized or includes additional features. Source code implementing other features is included in copending coassigned U.S. patent applications Ser. No. 07/535,438, entitled "Exhaustive Hierarchical Near Neighbor Operations on an Image"; Ser. No. 07/535,213, entitled "Hierarchical Operations on Border Attribute Data for Image Regions"; Ser. No. 07/535,089, entitled "Labeling Pixels of an Image Based on Near Neighbor Attributes"; Ser. No. 07/535,091, entitled "Comparison of Image Shapes Based on Near Neighbor Data"; and Ser. No. 07/537,468 now issued as U.S. Pat. No. 5,193,125, entitled "Local Hierarchical Processing Focus Shift Within an Image," all of which are incorporated herein by reference in their entireties.

In general, before executing the code in Appendix A, it is necessary to boot the Connection Machine so that it is configured as a square grid with a size that is an integer power of two. The size determines the image size that can be processed.

Some of the functions in Appendix A perform operations in relation to a specified quadrant, performing operations in relation to the fourth quadrant by default. Other functions that do not specify a quadrant operate in relation to the fourth quadrant.

The following are included in Appendix A:

The macro function QCHILD-REF!! is called to read a result from a child. This macro is called with the field in which the result is stored, a value indicating the first or second child, a level of the hierarchy, and a quadrant. If a result is to be read from the first child, the field in local memory is returned. If a result is to be read from the second child, the *Lisp function news-border!! is called to copy the result from the same field in another processing unit whose location is indicated by offsets. The function news-border!! automatically exploits the hypercube network of the Connection Machine at run time if it finds that the offsets are powers of two.

The set function QCHILD-REF!! is called to write a value to a child. This function is called with the field, a value indicating first or second child, a level, a quadrant, and with a value to be written. If a value is to be written to the first child, the *Lisp function *set is called to write the value to the field in local memory. If a value is to be written to the second child, the *Lisp function *news is called to write the value to the same field in another processing unit whose location is indicated by offsets.

The macro function CHILD-REF!! and the set function CHILD-REF!! operate in the same manner as the macro function QCHILD-REF!! and the set function QCHILD-REF!!, except only in the fourth quadrant.

The functions VALID-LEVEL?? and VALID-LEVEL=?? decode maximum valid level encodings.

The functions PROJECT-MAX-VALID-VALUE and PROJECT-PARENT-VALUE-TO-NULL-CHILD propagate information downward in the hierarchy, resolving collisions.

The function LABEL-VALID-SCALE establishes maximal valid regions and encodes maximum valid levels.

The functions LABEL-LEFT-VALID-SCALE and LABEL-TOP-VALID-SCALE to establish maximal valid slices.

Further functions establish properties of chunks and slices such as orientation and curvature.

The function SELECT-VALUE performs the basic selection operation.

The functions named READOUT-XXXX can be used to implement local or global selection.

The function READOUT-MODE provides the hierarchical mode.

The function LIST-MODES provides a list of hierarchical modes.

The function COLOR-FROM-SEED labels connected components.

H. Miscellaneous

The invention has been described in terms of operations on binary images, but could be applied to images of all types and, more generally, to bodies of data that map into arrays similar to those described.

The implementation described above divides an image into regions that each contain up to one connected component. The invention could also be implemented for regions that contain up to two or some higher number of connected components, or for regions of uniform color or texture.

Although described in terms of a Connection Machine, a SIMD machine with a powerful central controller, the invention could also be implemented on a machine with local distributed control, eliminating the need for a powerful central controller, for direct global communication of instructions, and for strict synchronous operation. This technique, in which all processing units would be simple and all communication would be local, might be more parsimonious than the standard SIMD model of the Connection Machine. The standard SIMD model is, however, a straightforward, familiar convention supported by a number of existing large scale parallel processors.

Furthermore, the invention could be implemented with special purpose hardware, including specialized integrated circuits. Some features described above in terms of software could then be provided through appropriate hardware.

The code in Appendix A invokes hypercube network communication by news-border!! calls. In some implementations, grid network communication might be sufficiently fast for power-of-two offset communication, in which case a loop could be performed for the number of steps necessary to move data by the appropriate power-of-two offset within the grid network.

In general, power-of-two offset communication could be implemented without a hypercube. If one processing unit is employed for each pixel of an image, for example, and if each processing unit has a bidirectional wire to each other processing unit with a power-of-two offset in each dimension, power-of-two offset communication is available. This arrangement can, of course, be mapped onto a hypercube just as a mesh can be embedded in a hypercube.

Although the invention has been described mainly in terms of image processing, the techniques of the invention might also be useful for other applications.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

© 1990 Xerox Corporation. All Rights Reserved.

========================================================================

```
;;;-*- Syntax: Common-lisp; mode: lisp; package: REVERSE-GRAPHICS; base: 10-*-

;;;
;;;
;;;
;;;

(defvar analyze-dim 512.)
(defvar base-chunking-level 0)
(defvar top-chunking-level)

(defun initialize-machine-parameters (&key (size analyze-dim))
  (setq analyze-dim size
        top-chunking-level (round (* (log analyze-dim 2) 2))
        base-chunking-level 0))

;;;

(*proclaim '(ftype (function (t) (unsigned-byte 9)) child-2-xoff child-2-yoff))

(defsubst child-2-xoff (level)
  (if (oddp level) 0 (expt 2 (1- (truncate level 2)))))

(defsubst child-2-yoff (level)
  (if (oddp level) (expt 2 (truncate (1- level) 2)) 0))

;;
```

```
(*proclaim '(ftype (function (t t t t) (field-pvar *)) child-ref!! qchild-ref!!))

(defmacro CHILD-REF!! (pvar child-number level &optional (border-val 0))
  (case child-number
    (1 `,pvar)
    (2 `(news-border!! ,pvar (!!f ,border-val) (child-2-xoff ,level) (child-2-yoff ,level)))))

(defsetf CHILD-REF!! (pvar child-number level) (newval)
  `(case ,child-number
     (1 (*locally
          (declare (type (field-pvar (pvar-length ,pvar)) ,pvar ,newval))
          (ignore ,level)
          (*set ,pvar ,newval)))
     (2 (let ((c2x (child-2-xoff ,level))
              (c2y (child-2-yoff ,level)))
          (*locally
            (declare (type fixnum c2x c2y))

(*unless (off-grid-border-relative-p!! (!! c2x) (!! c2y))
              (*news ,newval ,pvar c2x c2y)))))))

;;

(*proclaim '(ftype (function (t t) fixnum)
        sign-quad-x-offset sign-quad-y-offset))

(defun sign-quad-x-offset (xoff quad)
  (select quad ((1 4) xoff) ((2 3) (- xoff))))

(defun sign-quad-y-offset (yoff quad)
  (select quad ((1 2) (- yoff)) ((3 4) yoff)))

(defmacro QCHILD-REF!! (pvar child-number level quad &optional (border-val 0))
  (case child-number
    (1 `,pvar)
    (2 `(news-border!!
          ,pvar (!!f ,border-val)
          (sign-quad-x-offset (child-2-xoff ,level) ,quad)
          (sign-quad-y-offset (child-2-yoff ,level) ,quad)))))

(defsetf QCHILD-REF!! (pvar child-number level quad) (newval)
  `(case ,child-number
     (1 (*locally
          (declare (type (field-pvar (pvar-length ,pvar)) ,pvar ,newval))
          (ignore ,level ,quad)
          (*set ,pvar ,newval)))
     (2 (let ((c2x (sign-quad-x-offset (child-2-xoff ,level) ,quad) )
              (c2y (sign-quad-y-offset (child-2-yoff ,level) ,quad) ))
          (*locally
            (declare (type fixnum c2x c2y))
            (*unless (off-grid-border-relative-p!! (!! c2x) (!! c2y))
              (*news ,newval ,pvar c2x c2y)))))))

;;=========================================
==========================================
=
```

```
;; The functions below are utilities pertaining to, but not central to,
the simulated BIJ.

;;;------------------------------------------------------------
;;;

(defun layer-image-region-width (level &optional (primary-dim :y) (base-region-size
1))
  (ash base-region-size (floor (if (eql primary-dim :x) (1+ level) level) 2)))

(defun layer-image-region-height (level &optional (primary-dim :y) (base-region-
size 1))
  (ash base-region-size (floor (if (eql primary-dim :x) level (1+ level)) 2)))

(defun layer-nbr-x (level &optional (primary-dim :y))
  (ash 1 (floor (if (eql primary-dim :x) (1+ level) level) 2)))

(defun layer-nbr-y (level &optional (primary-dim :y))
  (ash 1 (floor (if (eql primary-dim :x) level (1+ level)) 2)))

(defsubst parent-width (level) (expt 2 (truncate level 2)))

(defsubst parent-height (level) (expt 2 (truncate (1+ level) 2)))

(defsubst parent-perimeter (l)
  (- (+ (* (parent-width l) 2) (* (parent-height l) 2)) 4))

(defun parent-diameter (l) (parent-width l))
(defun parent-radius (l) (truncate (parent-width l) 2))

(defun parent-level-from-width (w)
  (if (zerop w) 0 (* (ceiling (log w 2)) 2)))

(defun parent-level-from-width* (w)
  (if (zerop w) 0 (* (floor (log w 2)) 2)))

(defun parent-level-from-radius (r)
  (parent-level-from-width (* r 2)))

(defmacro !!f (x) `(!! (the fixnum ,x)))

;;;------------------------------------------------------------
;;;

(*proclaim '(ftype (function (t t t) (field-pvar *)) cref!!))

;; this should use new-border!! when it gets fixed.
(defmacro cref!! (pvar xoff yoff)
  `(*locally
     (declare (type (field-pvar (pvar-length ,pvar)) ,pvar)
              (type fixnum ,xoff ,yoff))
     (news-border!! ,pvar (!! 0) ,xoff ,yoff)))
```

```
(defsetf CREF!! (pvar xoff yoff) (value)
  `(*locally
     (declare (type (field-pvar (pvar-length ,pvar)) ,pvar ,value)
              (type fixnum ,xoff ,yoff))
     (*unless (off-grid-border-relative-p!! (!! ,xoff) (!! ,yoff))
       (*news ,value ,pvar ,xoff ,yoff))))
```
-------
```
;;;-*- Syntax: Common-lisp;mode: lisp; package: REVERSE-GRAPHICS; base: 10-*-

;;;
;;; This file contains propagation operations.
;;;

;;;----------------------------------------------------------------------
;;; decoding max-valid-level at a given level ;; These functions are for decoding max-valid-level at a given level.

;; These functions are at the top of this file for reasons of
;; compilation order.

(*proclaim '(ftype (function (t t) boolean-pvar) valid-level?? valid-level=??))

(*defun VALID-LEVEL?? (l max-valid-level)
  (declare (type (field-pvar (pvar-length max-valid-level)) max-valid-level))
  (*let ((result nil!!))
    (declare (type boolean-pvar result))
    (*set result (and!! (<=!! max-valid-level (!!f top-chunking-level))
                        (<=!! (!!f l) max-valid-level)))
    result))

(*defun VALID-LEVEL=?? (l max-valid-level)
  (declare (type (field-pvar (pvar-length max-valid-level)) max-valid-level))
  (*let ((result nil!!))
    (declare (type boolean-pvar result))
    (*set result (and!! (<=!! max-valid-level (!!f top-chunking-level))
                        (=!! (!!f l) max-valid-level)))
    result))

;;;----------------------------------------------------------------------
;;; Propagating maximal value (*defun PROJECT-MAX-VALID-VALUE
    (value result mvl &key dir active (combiner 'max!!)
        (top-level top-chunking-level))
  (declare (type (field-pvar (pvar-length value)) value result)
           (type (field-pvar (pvar-length mvl)) mvl))
  (*let ((ftemp (!! 0)) (ptemp (!! 0)) (nullval (!! 0)))
    (declare (type (field-pvar (pvar-length value)) ftemp ptemp nullval))
    (case combiner
      (min!! (*set nullval (1+!! (!!f (*max value))))))
    (*set ftemp (if!! (zerop!! value) nullval value))
    (*set ptemp nullval)
    (loop for l from top-level downto 1 do
      (*when (and!! (valid-level=?? l mvl) (=!! ptemp nullval))
```

```
           (*set ptemp ftemp))
        (when (or (null dir)
              (or (and (eq dir :x) (evenp l))
                  (and (eq dir :y) (oddp l))))
          (*let ((ctemp (child-ref!! ptemp 2 l)))
            (declare (type (field-pvar (pvar-length value)) ctemp))
            (setf (child-ref!! ptemp 2 l)
                 (fpv (*funcall combiner ptemp ctemp))))))
    (*if (=!! ptemp nullval) (*set ptemp (!! 0)))
    (if active
      (*set result (if!! (plusp!! (fpvl active 1)) ptemp (!! 0)))
      (*set result ptemp))))
```

```
;;;----------------------------------------------------------------
;;; Propagating minimum-scale non-null value (*defun PROJECT-PARENT-VALUE-TO-NULL-CHILD (value max-valid-level)
    (declare (type (field-pvar (pvar-length value)) value)
         (type (field-pvar (pvar-length max-valid-level)) max-valid-level))
  (*let ((proj-value value))
    (declare (type (field-pvar (pvar-length value)) proj-value))
    (loop for l from top-chunking-level downto 1 do
      (*when (valid-level?? l max-valid-level)
        (*let ((cvalue (child-ref!! proj-value 2 l)))
          (declare (type (field-pvar (pvar-length value)) cvalue))
          (setf (child-ref!! proj-value 2 l)
               (if!! (zerop!! cvalue) proj-value cvalue)))))
    (*set value proj-value)))

;; The remaining functions on this page are variations.

;; takes start-level rather than mvl
(*defun PROJECT-PARENT-VALUE-TO-NULL-CHILD1
    (value start-level &optional (q 4))
  (declare (type (field-pvar (pvar-length value)) value))
  (*let ((proj-value value))
    (declare (type (field-pvar (pvar-length value)) proj-value))
    (loop for l from start-level downto 1 do
      (*let ((cvalue (qchild-ref!! proj-value 2 l q)))
        (declare (type (field-pvar (pvar-length value)) cvalue))
        (setf (qchild-ref!! proj-value 2 l q)
             (if!! (zerop!! cvalue) proj-value cvalue))))
    (*set value proj-value)))

;; maybe generalize this to project-combine-value and pass combiner.
(*defun PROJECT-MAX-VALUE
    (value start-level &optional (q 4))
  (declare (type (field-pvar (pvar-length value)) value))
  (*let ((proj-value value))
    (declare (type (field-pvar (pvar-length value)) proj-value))
    (loop for l from start-level downto 1 do
      (*let ((cvalue (qchild-ref!! proj-value 2 l q)))
        (declare (type (field-pvar (pvar-length value)) cvalue))
        (setf (qchild-ref!! proj-value 2 l q)
             (max!! proj-value cvalue))))
    (*set value proj-value)))
```

```
;;;----------------------------------------------------------------
;;;
;;;
----------------------------------------------------------------
;;;-*- Syntax: Common-lisp;mode: lisp; package: REVERSE-GRAPHICS; base: 10-*-

;;;
;;; This file contains chunking and labeling operations.
;;;

;; For all operations in this file, the arguments bitmap and
;; max-valid-level are pvars. bitmap is a 1-bit field pvar.
;; max-valid-level is a field with enough bits to hold (1 +
;; top-chunking-level), which is by convention the null value.

;; The top-level operations in this file are all named with the prefix
;; LABEL-. Usually they take two arguments---the input bitmap, and
;; result pvar. The caller is responsible for allocating these pvars
;; appropriately. There are some utilities are the very end of the file
;; for doing this allocation, but they are not central to this
;; file---allocation may be done in any manner appropriate to the
;; application.

;; Most of the top-level LABEL-XXX operations in this file (except for
;; the ones on the next page) are self-contained chunk-measure-and-label
;; processes. They involve
;; computing maximal valid regions, computing some measures on their
;; contents, and then propagating the results to pixels across each
;; regions.

;; The operations in this file are in-place implementations of the
;; chunking and labeling processes. They were, however, derived from
;; independent-storage implementations in such a way that getting back
;; to a working independent-storage version should be easy. The
;; conversion to the in-place form was done by commenting out lines of
;; code that involve only the first child, since these computations are
;; redundant in the in-place case. (Also, the child-ref!! macro was
;; modified so that for the first child it simply expands to its
;; argument pvar.)

;;;----------------------------------------------------------------
;;; maximal valid regions (defun LABEL-VALID-SCALE-1
    (bitmap max-valid-level
     &optional (start-level base-chunking-level)
     &aux (nullv (1+ top-chunking-level)))
  (*locally
    (declare (type (field-pvar 1) bitmap)
        (type (field-pvar (pvar-length max-valid-level)) max-valid-level))
    (*let (rexit?? dexit?? vacant?? valid??)
```

```
    (declare (type (field-pvar 1) rexit?? dexit?? vacant?? valid??))
    (*set rexit?? (connections!! bitmap :right))
    (*set dexit?? (connections!! bitmap :down))
    (*set vacant?? (not01!! bitmap))
    (*set valid?? (if!! (=!! max-valid-level (!!f nullv)) (!! 0) bitmap))
    (loop for l from 1 to top-chunking-level do
      (*set valid??
         (or01!!
           (and01!! (child-ref!! valid?? 1 l) (child-ref!! vacant?? 2 l))
           (and01!! (child-ref!! vacant?? 1 l) (child-ref!! valid?? 2 l))
           (and01!! (child-ref!! valid?? 1 l) (child-ref!! valid?? 2 l)
              (child-ref!! (fpvl (if (oddp l) dexit?? rexit??) 1) 1 l))))
      (*when (plusp!! valid??) (*set max-valid-level (!!f l)))
      (when (oddp l)
        (if (<= l start-level)
          (*set rexit?? (and01!! valid?? (child-ref!! valid?? 2 (1+ l)))
              dexit?? (and01!! valid?? (child-ref!! valid?? 2 (+ l 2))) )
          (*set rexit?? (or01!! (child-ref!! rexit?? 1 l) (child-ref!! rexit?? 2 l))
              dexit?? (child-ref!! dexit?? 2 l))))
      (when (evenp l)
        (if (<= l start-level)
          (*set dexit?? (and01!! valid?? (child-ref!! valid?? 2 (1+ l)))
              rexit?? (and01!! valid?? (child-ref!! valid?? 2 (+ l 2))) )
          (*set dexit?? (or01!! (child-ref!! dexit?? 1 l) (child-ref!! dexit?? 2 l))
              rexit?? (child-ref!! rexit?? 2 l))))
      (*set vacant?? (and01!! (child-ref!! vacant?? 1 l) (child-ref!! vacant?? 2 l)))))))

;; assumes max-valid-level already initialized appropriately.
(defun LABEL-VALID-SCALE
    (bitmap max-valid-level   &optional (start-level base-chunking-level)
    &aux (nullv (1+ top-chunking-level)))
  (*locally
    (declare (type (field-pvar 1) bitmap)
       (type (field-pvar (pvar-length max-valid-level)) max-valid-level))
    (*set max-valid-level (if!! (plusp!! bitmap) (!! 0) (!!f nullv)))
    (label-valid-scale-1 bitmap max-valid-level start-level)))

(defun LABEL-VACANT-SCALE
    (bitmap max-vacant-level
    &aux (nullv (1+ top-chunking-level)))
  (*locally
    (declare (type (field-pvar 1) bitmap)
       (type (field-pvar (pvar-length max-vacant-level)) max-vacant-level))
    (*let (vacant??)
      (declare (type (field-pvar 1) vacant??))
      (*set vacant?? (not01!! bitmap))
      (*set max-vacant-level (if!! (plusp!! vacant??) (!! 0) (!!f nullv)))
      (loop for l from 1 to top-chunking-level do
        (*set vacant?? (and01!! (child-ref!! vacant?? 1 l) (child-ref!! vacant?? 2 l)))
        (*when (plusp!! vacant??)(*set max-vacant-level (!!f l)))))))

(defun LABEL-FULL-SCALE
    (bitmap max-full-level
    &aux (nullv (1+ top-chunking-level)))
```

```
(*locally
  (declare (type (field-pvar 1) bitmap)
      (type (field-pvar (pvar-length max-full-level)) max-full-level))
  (*let (full??)
    (declare (type (field-pvar 1) full??))
    (*set full?? bitmap)
    (*set max-full-level (if!! (plusp!! full??) (!! 0) (!!f nullv)))
    (loop for I from 1 to top-chunking-level do
      (*set full?? (and01!! (child-ref!! full?? 1 I) (child-ref!! full?? 2 I)))
      (*when (plusp!! full??) (*set max-full-level (!!f I)))))))

;;;------------------------------------------------------------
;;; Thin chunks and local width.

;; The operations on this page are the thin chunk (slice) counterparts
;; of LABEL-VALID-SCALE. "idling" has been
;; implemented here and below by commenting out the computations at odd
;; levels or at even levels, as appropriate.

(*defun LABEL-LEFT-VALID-SCALE
    (bitmap max-valid-level
        &optional (top-level top-chunking-level)
        &aux (nullv (1+ top-chunking-level)))
  (declare (type (field-pvar 1) bitmap)
      (type (field-pvar (pvar-length max-valid-level)) max-valid-level))
  (*let (dexit?? vacant?? valid??)
    (declare (type (field-pvar 1) dexit?? vacant?? valid??))
    (*set dexit?? (connections!! bitmap :down))
    (*set vacant?? (not01!! bitmap) valid?? bitmap)
    (*set max-valid-level (if!! (plusp!! valid??) (!! 0) (!!f nullv)))
    (loop for I from 1 to top-level do
      (when (oddp I)
        (*set valid??
          (or01!!
            (and01!! (child-ref!! valid?? 1 I) (child-ref!! vacant?? 2 I))
            (and01!! (child-ref!! vacant?? 1 I) (child-ref!! valid?? 2 I))
            (and01!! (child-ref!! valid?? 1 I)
                (child-ref!! valid?? 2 I)
                (child-ref!! dexit?? 1 I))))
        (*set dexit?? (child-ref!! dexit?? 2 I))
        (*set vacant?? (and01!! (child-ref!! vacant?? 1 I) (child-ref!! vacant?? 2 I))))
      (when (evenp I)
;       (*set valid?? (child-ref!! valid?? 1 I))
;       (*set dexit?? (child-ref!! dexit?? 1 I))
;       (*set vacant?? (child-ref!! vacant?? 1 I))
        )
      (*when (plusp!! valid??) (*set max-valid-level (!!f I))))))

(*defun LABEL-TOP-VALID-SCALE
    (bitmap max-valid-level
        &optional (top-level top-chunking-level)
        &aux (nullv (1+ top-chunking-level)))
  (declare (type (field-pvar 1) bitmap)
      (type (field-pvar (pvar-length max-valid-level)) max-valid-level))
  (*let (rexit?? vacant?? valid??)
    (declare (type (field-pvar 1) rexit?? vacant?? valid??))
    (*set rexit?? (connections!! bitmap :right))
```

```
      (*set vacant?? (not01!! bitmap) valid?? bitmap)
      (*set max-valid-level (if!! (plusp!! valid??) (!! 0) (!!f nullv)))
      (loop for I from 1 to top-level do
        (when (oddp I)
;         (*set valid?? (child-ref!! valid?? 1 I))
;         (*set rexit?? (child-ref!! rexit?? 1 I))
;         (*set vacant?? (child-ref!! vacant?? 1 I))
          )
        (when (evenp I)
          (*set valid??
            (or01!!
              (and01!! (child-ref!! valid?? 1 I) (child-ref!! vacant?? 2 I))
              (and01!! (child-ref!! vacant?? 1 I) (child-ref!! valid?? 2 I))
              (and01!! (child-ref!! valid?? 1 I)
                 (child-ref!! valid?? 2 I)
                 (child-ref!! rexit?? 1 I))))
          (*set rexit?? (child-ref!! rexit?? 2 I))
          (*set vacant?? (and01!! (child-ref!! vacant?? 1 I) (child-ref!! vacant?? 2 I))))
        (*when (plusp!! valid??) (*set max-valid-level (!!f I)))))))

■
;; The operations on this page are the thin chunk (slice) counterparts
;; of SUM-BORDER-EDGES.

(*defun SUM-LEFT-EDGES
    (bitmap max-valid-level max-bedge2-level
        &optional (top-level top-chunking-level)
        &aux (nullv (1+ top-chunking-level)))
  (declare (type (field-pvar 1) bitmap)
      (type (field-pvar (pvar-length max-valid-level)) max-valid-level max-bedge2-level))
  (*set max-bedge2-level (!!f nullv))
  (*let (left top-left bot-left)
    (declare (type (field-pvar 16) left)
        (type (field-pvar 1) top-left bot-left))
    (*set left (!! 0) top-left bitmap bot-left bitmap)
    (loop for I from 1 to top-level do
      (when (oddp I)
        (*set left (+!! (child-ref!! left 1 I) (child-ref!! left 2 I)
              (not=01!! (child-ref!! bot-left 1 I) (child-ref!! top-left 2 I))))
        (*set top-left (child-ref!! top-left 1 I))
        (*set bot-left (child-ref!! bot-left 2 I)))
      (when (evenp I)
;       (*set left (child-ref!! left 1 I))
;       (*set top-left (child-ref!! top-left 1 I))
;       (*set bot-left (child-ref!! bot-left 1 I))
        )
      (*when (valid-level=?? I max-valid-level)
        (*case left (2 (*set max-bedge2-level (!!f I)))))))))

(*defun SUM-TOP-EDGES
    (bitmap max-valid-level max-bedge2-level
        &optional (top-level top-chunking-level)
        &aux (nullv (1+ top-chunking-level)))
  (declare (type (field-pvar 1) bitmap)
      (type (field-pvar (pvar-length max-valid-level)) max-valid-level max-bedge2-level))
```

```
    (*set max-bedge2-level (!!f nullv))
    (*let (top top-left top-right)
      (declare (type (field-pvar 16) top)
          (type (field-pvar 1) top-left top-right))
      (*set top (!! 0) top-left bitmap top-right bitmap)
      (loop for l from 1 to top-level do
        (when (oddp l)
;         (*set top (child-ref!! top 1 l))
;         (*set top-left (child-ref!! top-left 1 l))
;         (*set top-right (child-ref!! top-right 1 l))
          )
        (when (evenp l)
          (*set top (+!! (child-ref!! top 1 l) (child-ref!! top 2 l)
              (not=0!! (child-ref!! top-right 1 l) (child-ref!! top-left 2 l))))
          (*set top-left (child-ref!! top-left 1 l))
          (*set top-right (child-ref!! top-right 2 l)))
        (*when (valid-level=?? l max-valid-level)
          (*case top (2 (*set max-bedge2-level (!!f l))))))))

∎
;; The operations on this page are the thin chunk (slice) counterparts
;; of SUM-BORDER-PIXELS.

(*defun SUM-LEFT-PIXELS (bitmap max-valid-level sum
        &optional (top-level top-chunking-level))
  (declare (type (field-pvar 1) bitmap)
      (type (field-pvar (pvar-length max-valid-level)) max-valid-level)
      (type (field-pvar (pvar-length sum)) sum))
  (*let (left)
    (declare (type (field-pvar 16) left))
    (*set sum bitmap left bitmap)
    (loop for l from 1 to top-level do
      (when (oddp l)
        (*set left (+!! (child-ref!! left 1 l) (child-ref!! left 2 l))))
      (when (evenp l)
;       (*set left (child-ref!! left 1 l))
        )
      (*when (valid-level?? l max-valid-level)
        (*set sum left)))))

(*defun SUM-TOP-PIXELS (bitmap max-valid-level sum
        &optional (top-level top-chunking-level))
  (declare (type (field-pvar 1) bitmap)
      (type (field-pvar (pvar-length max-valid-level)) max-valid-level)
      (type (field-pvar (pvar-length sum)) sum))
  (*let (top)
    (declare (type (field-pvar 16) top))
    (*set sum bitmap top bitmap)
    (loop for l from 1 to top-level do
      (when (oddp l)
;       (*set top (child-ref!! top 1 l))
        )
      (when (evenp l)
        (*set top (+!! (child-ref!! top 1 l) (child-ref!! top 2 l))))
      (*when (valid-level?? l max-valid-level)
        (*set sum top)))))

∎
```

;; This is the only LABEL-XXX operation that makes use of thin chunks.

```
(defun LABEL-WIDTH (bitmap width)
 (*locally
   (declare (type (field-pvar (pvar-length width)) width))
   (*let ((count (!! 0)) (max-bedge2-level (!! 0)) (max-valid-level (!! 0)))
     (declare (type (field-pvar (pvar-length width)) count)
          (type (field-pvar 8) max-valid-level max-bedge2-level))
     (label-left-valid-scale bitmap max-valid-level)
     (sum-left-edges bitmap max-valid-level max-bedge2-level)
     (sum-left-pixels bitmap max-bedge2-level count)
     (project-max-valid-value count count max-bedge2-level :dir :y)
     (*set width count)
     (label-top-valid-scale bitmap max-valid-level)
     (sum-top-edges bitmap max-valid-level max-bedge2-level)
     (sum-top-pixels bitmap max-bedge2-level count)
     (project-max-valid-value count count max-bedge2-level :dir :x)
     (*cond
      ((and!! (plusp!! width) (plusp!! count))
       (*set width (min!! width count)))
      (t!!
       (*set width (max!! width count))))
     (*when (zerop!! bitmap) (*set width (!! 0))))))
```

■

;;;------------------------------------------------------------
;;; orientation

;; These operation computes orientation.

```
(defvar min-orientation-edge-pixels 8.)
(defvar max-orientation-edge-pixels 8.)

(*proclaim '(ftype (function (t t t t t t t t) (field-pvar 9)) line-orientation!!))

(*defun line-orientation!!
    (top top-left left bot-left bot bot-right right top-right
     &optional (minpixels min-orientation-edge-pixels))
  (declare (type (field-pvar 16)
       top left bot right top-left bot-left bot-right top-right))
  (*let ((q1sum1 (+!! top top-left left)) (q1sum3 (+!! bot bot-right right))
     (q2sum2 (+!! left bot-left bot)) (q2sum4 (+!! right top-right top)))
    (declare (type (field-pvar 16) q1sum1 q1sum3 q2sum2 q2sum4))
    (*let ((q1sum (max!! q1sum1 q1sum3)) (q2sum (max!! q2sum2 q2sum4)) (result (!! 0)))
      (declare (type (field-pvar 16) q1sum q2sum)
           (type (field-pvar 9) result))
      (*if (>!! q1sum q2sum)
       (*if (>=!! q1sum1 q1sum3)
        (*when (>=!! q1sum1 (!!f minpixels))
          (*set result
            (atand*!! (crcs!! (+!! top-left left))
                 (crcs!! (+!! top top-left)))))
        (*when (>=!! q1sum3 (!!f minpixels))
          (*set result
            (mod!! (atand*!! (-!! (+!! bot-right right))
                    (-!! (+!! bot bot-right)))
                (!! 180.)))))
```

```
      (*if (>=!! q2sum2 q2sum4)
        (*when (>=!! q2sum2 (!!f minpixels))
          (*set result
             (mod!! (atand*!! (crcs!! (+!! left bot-left))
                    (-!! (+!! bot-left bot)))
                (!! 180.))))
        (*when (>=!! q2sum4 (!!f minpixels))
          (*set result
             (mod!! (atand*!! (-!! (+!! right top-right))
                    (crcs!! (+!! top-right top)))
                (!! 180.))))))
   result)))

(*defun GET-ORIENTATIONS
    (bitmap orientation &optional (q 4)
        (top-level (parent-level-from-width* max-orientation-edge-pixels)))
   (declare (type (field-pvar 1) bitmap)
       (type (field-pvar (pvar-length orientation)) orientation))
   (*let (top bot left right top-left bot-left top-right bot-right)
     (declare (type (field-pvar 16)
           top left bot right top-left bot-left bot-right top-right))
     (*set orientation (!! 0))
     (let ((sum-list (list top bot left right top-left bot-left top-right bot-right)))
       (*let ((up-edges (directed-edges!! bitmap :up))
              (left-edges (directed-edges!! bitmap :left))
              (down-edges (directed-edges!! bitmap :down))
              (right-edges (directed-edges!! bitmap :right)))
         (declare (type (field-pvar 1) up-edges left-edges down-edges right-edges))
         (*set top (and01!! up-edges (news-border!! up-edges (!! 0) 1 0))
               left (and01!! left-edges (news-border!! left-edges (!! 0) 0 1))
               bot (and01!! down-edges (news-border!! down-edges (!! 0) 1 0))
               right (and01!! right-edges (news-border!! right-edges (!! 0) 0 1))
               top-left (and01!! up-edges (news-border!! left-edges (!! 0) 1 -1))
               bot-left (and01!! down-edges (news-border!! left-edges (!! 0) 1 1))
               bot-right (and01!! right-edges (news-border!! down-edges (!! 0) 1 -1))
               top-right (and01!! right-edges (news-border!! up-edges (!! 0) 1 1)))
         (loop for l from 1 to top-level do
           (loop for sum in sum-list do (*locally
               (declare (type (field-pvar 16) sum))
               (*set sum (+!! (qchild-ref!! sum 1 l q) (qchild-ref!! sum 2 l q))))))
         (*set orientation
           (line-orientation!!
             top top-left left bot-left bot bot-right right top-right))))))

(defun LABEL-ORIENTATION (bitmap orientation &optional (q 4))
  (get-orientations bitmap orientation q)
  (project-parent-value-to-null-child1
    orientation (parent-level-from-width* max-orientation-edge-pixels) q))

(defun LABEL-ORIENTATIONS (bitmap orientations)
  (loop for orientation in orientations
        for q from 1 do
    (get-orientations bitmap orientation q)
    (project-parent-value-to-null-child1
      orientation (parent-level-from-width* max-orientation-edge-pixels) q)))
```

```
;;;----------------------------------------------------------------
;;; curvature ;; These operations compute a measure related to curvature (defvar min-curvature-edge-pixels 8.)
(defvar max-curvature-edge-pixels 16.)    ;8 doesn't work, understandably.

(defvar cusp-ratio1 0.7)           ;below this, terms can show up in result.
(defvar cusp-angl 60.)             ;below this, high curvature interior
                                   ;points show up (defvar cusp-low 0.5)
(defvar cusp-high 0.6)             ;even 0.5 works (so does 0.7)

(defmacro check-curvature!! (qasum qbsum thresh minpixels low high)
  `(*let ((qabsum (+!! ,qasum ,qbsum))
          (maxsum (max!! ,qasum ,qbsum)))
     (and!! (>=!! qabsum ,thresh)
            (>=!! maxsum (round!! (*!! qabsum (!!r ,low))))
            (<=!! maxsum (round!! (*!! qabsum (!!r ,high))))
            (>=!! (min!! ,qasum ,qbsum) (!!f ,minpixels)))))

(*defun label-curvature-1
    (top top-left left bot-left bot bot-right right top-right label
     &optional (minpixels min-cusp-edge-pixels) (ratio1 cusp-ratio1)
               (low cusp-low) (high cusp-high))
  (declare (type (field-pvar 8)
                 top left bot right top-left bot-left bot-right top-right)
           (type (field-pvar (pvar-length label)) label))
  (*set label (!! 0))
  (*let ((q1asum (+!! top top-left)) (q1bsum (+!! left top-left))
         (q3asum (+!! bot bot-right)) (q3bsum (+!! bot-right right))
         (q2asum (+!! bot-left bot)) (q2bsum (+!! left bot-left))
         (q4asum (+!! top-right top)) (q4bsum (+!! right top-right)))
    (declare (type (field-pvar 8) q1asum q1bsum q2asum q2bsum q3asum q3bsum
                                  q4asum q4bsum))
    (*let ((q1atheta (atand*!! (crcs!! top-left) (crcs!! (+!! top top-left))))
           (q1btheta (atand*!! (crcs!! (+!! top-left left)) (crcs!! top-left)))
           (q2atheta (atand*!! (crcs!! bot-left) (-!! (+!! bot-left bot))))
           (q2btheta (atand*!! (crcs!! (+!! left bot-left)) (-!! bot-left)))
           (q3atheta (atand*!! (-!! bot-right) (-!! (+!! bot bot-right))))
           (q3btheta (atand*!! (-!! (+!! bot-right right)) (-!! bot-right)))
           (q4atheta (atand*!! (-!! top-right) (crcs!! (+!! top-right top))))
           (q4btheta (atand*!! (-!! (+!! right top-right)) (crcs!! top-right))))
      (declare (type (field-pvar 9)
                     q1atheta q1btheta q2atheta q2btheta q3atheta q3btheta q4atheta q4btheta))
      (*let ((thresh (round!! (*!! (+!! top top-left left bot-left
                                        bot bot-right right top-right)
                                   (!!r ratio1)))))
        (declare (type (field-pvar 16) thresh))
        (loop for sum1 in (list q1asum q1bsum q2asum q2bsum
                                q3asum q3bsum q4asum q4bsum)
              for theta1 in (list q1atheta q1btheta q2atheta q2btheta
                                  q3atheta q3btheta q4atheta q4btheta) do
```

```
        (loop for sum2 in (list q1asum q1bsum q2asum q2bsum
                                q3asum q3bsum q4asum q4bsum)
              for theta2 in (list q1atheta q1btheta q2atheta q2btheta
                                  q3atheta q3btheta q4atheta q4btheta) do
          (unless (eql sum1 sum2)
            (*when (check-curvature!! sum1 sum2 thresh minpixels low high)
              (*set label (orientation-difference-180!! theta1 theta2)))))))))))

(*defun GET-CURVATURE
    (pixel?? curvature &optional (q 4)
        (top-level (parent-level-from-width* max-curvature-edge-pixels)))
  (declare (type (field-pvar 1) pixel??)
           (type (field-pvar (pvar-length curvature)) curvature))
  (*let (top bot left right top-left bot-left top-right bot-right)
    (declare (type (field-pvar 8)
                   top left bot right top-left bot-left bot-right top-right))
    (*set curvature (!! 0))
    (let ((sum-list (list top bot left right top-left bot-left top-right bot-right)))
      (*let ((up-edges (directed-edges!! pixel?? :up))
             (left-edges (directed-edges!! pixel?? :left))
             (down-edges (directed-edges!! pixel?? :down))
             (right-edges (directed-edges!! pixel?? :right)))
        (declare (type (field-pvar 1) up-edges left-edges down-edges right-edges))
        (*set top (and01!! up-edges (news-border!! up-edges (!! 0) 1 0))
              left (and01!! left-edges (news-border!! left-edges (!! 0) 0 1))
              bot (and01!! down-edges (news-border!! down-edges (!! 0) 1 0))
              right (and01!! right-edges (news-border!! right-edges (!! 0) 0 1))
              top-left (and01!! up-edges (news-border!! left-edges (!! 0) 1 -1))
              bot-left (and01!! down-edges (news-border!! left-edges (!! 0) 1 1))
              bot-right (and01!! right-edges (news-border!! down-edges (!! 0) 1 -1))
              top-right (and01!! right-edges (news-border!! up-edges (!! 0) 1 1)))
        (loop for l from 1 to top-level do
          (loop for sum in sum-list do
            (*locally
              (declare (type (field-pvar 8) sum))
              (*set sum (+!! (qchild-ref!! sum 1 l q) (qchild-ref!! sum 2 l q))))))
        (label-curvature-1
          top top-left left bot-left bot bot-right right top-right curvature)))))

(defun LABEL-CURVATURES (pixel?? curvatures)
  (loop for curvature in curvatures
        for q from 1 to 4 do
    (get-curvature pixel?? curvature q)
    (project-parent-value-to-null-child1
      curvature (parent-level-from-width* max-curvature-edge-pixels) q)))
;;;------------------------------------------------------------------

;;;-*- Syntax: Common-lisp;mode: lisp; package: REVERSE-GRAPHICS; base: 10-*-

;;; This file contains operations that are applications of image
;;; chunking and labeling.

;; selected, active, focus, and value are conventional names often used
;; below as pvar parameters and internal pvars of functions. They
;; should be interpreted as pvars unless otherwise indicated. The
```

```
;; suffixes -pvar and -scalar are used when there is any ambiguity.
;; selected, active, and focus are always 1-bit pvars. value is always
;; a field pvar with enough bits to hold the relevant result.

;;;-----------------------------------------------------------------
;;; Selection operations.

;; All selection processes involve two stages. The first
;; stage establishes a salient value to be selected, on either a local
;; or global basis. The second stage distributes this value to all
;; pixels, where a local selection decision is made.

;; This hierarchical operation will distribute a value from the
;; upper-left corner of the image to all pixels. It distributes conditionally to
;; a given set of locations defined by cond-pvar.

(*defun DISTRIBUTE-VALUE-honest (value value-pvar cond-pvar)
  (declare (type (field-pvar (pvar-length value-pvar)) value-pvar)
       (type (field-pvar 1) cond-pvar)
       (type fixnum value))
  (*let ((projpvar (!! 0)))
    (declare (type (field-pvar (pvar-length value-pvar)) projpvar))
    (setf (pref-grid projpvar 0 0) value)
    (loop for l from top-chunking-level downto 1 do
      (setf (child-ref!! projpvar 2 l)
        (max!! projpvar (child-ref!! projpvar 2 l) )))
    (*set value-pvar (if!! (plusp!! cond-pvar) projpvar (!! 0)))))
;; The preceding operation is equivalent to the following, which is
;; slightly more efficient and simply makes a direct call to a primitive
;; *LISP operation !! function.

(*defun DISTRIBUTE-VALUE (value value-pvar cond-pvar)
  (declare (type (field-pvar (pvar-length value-pvar)) value-pvar)
       (type (field-pvar 1) cond-pvar)
       (type fixnum value))
  (*set value-pvar (if!! (plusp!! cond-pvar) (!! value) (!! 0))))

;; The following operation calls DISTRIBUTE-VALUE on its scalar argument
;; VALUE.

;; If the value of the method argument is :fixed, slop and high-slop are
;; interpreted as allowed ranges below and above value, respectively.
;; If the value of the method argument is :variable (the default), slop
;; and high-slop are interpreted as fractions which when multiplied by
;; value give the allowed ranges below and above value, respectively.
;; In either case, high-slop defaults to slop.

;; Locations selected by this function are labeld 1 in the argument pvar
;; SELECTED. Locations not selected are labeled 0. Given the optional
;; keyword argument ACTIVE, this function implements nested selection
;; (i.e., it subselects locations that are
;; labeled 1 in ACTIVE).

(defvar default-similarity-scale-factor 0.25)

(defun SELECT-VALUE (value value-pvar selected
            &key active (method :variable) (diff-fun '-!!)
              (slop default-similarity-scale-factor) high-slop
              (null-value 0.))
```

```
(*locally
  (declare (type (field-pvar (pvar-length value-pvar)) value-pvar)
        (type (field-pvar 1) selected))
 (*let ((temp (!! 0)))
   (declare (type (field-pvar (pvar-length value-pvar)) temp))
   (distribute-value value temp (or active (!! 1)))
   (*set selected (!! 0))
   (let ((lslop
           (case method
             (:fixed slop)
             (t (round (* value slop)))))
         (hslop
           (case method
             (:fixed (or high-slop slop))
             (t (round (* value (or high-slop slop)))))))
     (*let ((diff (!! 0)))
       (declare (type (signed-pvar 17) diff))
       (*set diff (*funcall diff-fun temp value-pvar))
       (*unless (=!! temp (!!f null-value))
         (*when (or!! (and!! (not!! (minusp!! diff))
                            (<=!! diff (!!f lslop)))
                     (and!! (minusp!! diff)
                            (<=!! (abs!! diff) (!!f hslop))))
           (*set selected (!! 1))))))))))

;;;------------------------------------------------------------
;;; Readout operations extract a scalar value from pvar.

;; Read out the value in the upper left corner location of the image.
(defun READOUT-HOME (pvar)
  (pref pvar (cube-from-grid-address 0 0)))

;; The pvar focus is 1 at exactly one location, and zero elsewhere.

;; This function implements the uppward pass, and
;; then reads the upper-left corner value into the front end processor.

(defun READOUT-FOCUS-honest (value focus)
  (*locally
    (declare (type (field-pvar (pvar-length value)) value)
          (type (field-pvar 1) focus))
   (*let ((temp (!! 0)) (result (!! 0)))
     (declare (type (field-pvar (pvar-length value)) result)
           (type (field-pvar 1) temp))
     (*set temp focus result value)
     (loop for l from 1 to top-chunking-level do
      (*cond
        ;((plusp!! (child-ref!! temp 1 l))
        ; (*set temp (!! 1) result (child-ref!! result 1 l)))
        ((plusp!! (child-ref!! temp 2 l))
         (*set temp (!! 1) result (child-ref!! result 2 l)))))
     (pref-grid result 0 0) )))

;; The following is equivalent to READOUT-FOCUS-honest and slightly more
;; efficient; it directly calls the *LISP operation *max.
```

```
(defun READOUT-FOCUS (value focus)
  (*locally
    (declare (type (field-pvar (pvar-length value)) value)
         (type (field-pvar 1) focus))
   (*let ((result (!! 0)))
    (declare (type (field-pvar (pvar-length value)) result))
    (*when (plusp!! focus)
     (*set result value))
    (or (*max result) 0))))
```

;;

```
(defun READOUT-FOCUS-LIST (value-pvars focus)
  (loop for value-pvar in value-pvars
     collect (readout-focus value-pvar focus)))
```

;;;----------------------------------------------------------------

```
(defmacro PARENT<-CHILD-1+CHILD-2 (pvar combination-function)
 `(*locally
    (declare (type (field-pvar (pvar-length ,pvar)) ,pvar))
    (loop for l from 1 to top-chunking-level do
       (*set ,pvar (,combination-function (child-ref!! ,pvar 1 l) (child-ref!! ,pvar 2 l))))))
```

;; This macro operation is a utility for defining functions that read
;; out a globally salient value (max, min) or global aggregate value
;; (sum, or, and).

```
(defmacro READOUT-FUNCTION (pvar fun active)
 `(*locally
    (declare (type (field-pvar (pvar-length ,pvar)) ,pvar)
         (type (field-pvar 1) ,active))
   (*let (result)
    (declare (type (field-pvar 32) result))
    (*set result (if!! (plusp!! ,active) ,pvar (!! 0)))
    (parent<-child-1+child-2 result ,fun)
    (readout-home result))))
```

;;

```
(defun READOUT-SUM (value-pvar active)
  (readout-function value-pvar +!! active))

(defun READOUT-MIN (value-pvar active)
  (*locally
    (readout-function
      (unzero!! value-pvar) min!! active)))

(defun READOUT-MAX (value-pvar active)
  (readout-function value-pvar max!! active))
```

-

;;;----------------------------------------------------------------

;; This operation establishes
;; the hierarchical mode.

```
(defun FLOAT-MODE
    (mode count slop method diff-fun sum-fun
     &key (null-value 0) (stop-level top-chunking-level))
  (*locally
    (declare (type (field-pvar (pvar-length mode)) mode)
      (type (field-pvar (pvar-length count)) count))
    (*unless (=!! mode (!!f null-value)) (*set count (!! 1)))
    (loop for l from 1 to stop-level do
      (*let (c2mode c2count)
        (declare (type (field-pvar (pvar-length mode)) c2mode)
          (type (field-pvar (pvar-length count)) c2count))
        (*set c2mode  (child-ref!! mode 2 l)
          c2count (child-ref!! count 2 l))
        (*if (zerop!! count)
          (*set mode c2mode count c2count)
          (*if (sloppy=!! mode c2mode slop method diff-fun sum-fun)
            (progn
              (*set mode (fpvl (random-choose (list mode c2mode))
                  (pvar-length mode)))
              (*set count (+!! count c2count)))
            (*when (<!! count c2count)
              (*set mode c2mode count c2count))))))))

(defun READOUT-MODE-AND-COUNT
    (pvar active &optional (slop 0) (method :variable)
     (diff-fun '-!!) (sum-fun '+!!) (null-value 0))
  (*locally
    (declare (type (field-pvar (pvar-length pvar)) pvar)
      (type (field-pvar 1) active))
    (*let (mode (count (!! 0)))
      (declare (type (field-pvar 32) mode count))
      (*set mode (if!! (plusp!! active) pvar (!!f null-value)))
      (float-mode mode count slop method diff-fun sum-fun :null-value null-value)
      (list (readout-home mode) (readout-home count)))))

(defun READOUT-MODE
    (pvar active &optional (slop 0) (method :fixed)
     (diff-fun '-!!) (sum-fun '+!!) (null-value 0))
  (let ((mode-and-count
      (readout-mode-and-count pvar active slop method diff-fun sum-fun null-value)))
    (first mode-and-count)))

;;;----------------------------------------------------------------
;;; Set and integer operations.

;; The operations on this page are
;; simple utilities for set operations used in operations described
;; below.

;;
;; Set operations
;;

(defun S<-0 (s)
  (*locally
    (declare (type (field-pvar 1) s))
    (*set s (!! 0))))
```

```
(defun S<-S- (s)
 (*locally
   (declare (type (field-pvar 1) s))
   (*set s (not01!! s))))

(defun S1<-S2 (s1 s2)
 (*locally
   (declare (type (field-pvar 1) s1 s2))
   (*set s1 s2)))

;;

(defun S1<-S1-S2 (s1 s2)
 (*locally
   (declare (type (field-pvar 1) s1 s2))
   (*set s1 (if!! (plusp!! s2) (!! 0) s1))))

(defun S1<-S1+S2 (s1 s2)
 (*locally
   (declare (type (field-pvar 1) s1 s2))
   (*set s1 (or01!! s1 s2))))

(defun S1<-S1*S2 (s1 s2)
 (*locally
   (declare (type (field-pvar 1) s1 s2))
   (*set s1 (and01!! s1 s2))))

;;
;;
;;
;;

(defun S<-P-> (s p v)
 (*locally
   (declare (type (field-pvar 1) s)
       (type (field-pvar (pvar-length p)) p))
   (*set s (>01!! p (!!f v)))))

(defun S<-P-< (s p v)
 (*locally
   (declare (type (field-pvar 1) s)
       (type (field-pvar (pvar-length p)) p))
   (*set s (<01!! p (!!f v)))))

(defun S<-P-= (s p v)
 (*locally
   (declare (type (field-pvar 1) s)
       (type (field-pvar (pvar-length p)) p))
   (*set s (=01!! p (!!f v)))))

;;
;; integer operations
;;

(defun P<-0 (p)
 (*locally
   (declare (type (field-pvar (pvar-length p)) p))
   (*set p (!! 0))))
```

```
(defun P<-P*S (p s)
  (*locally
    (declare (type (field-pvar (pvar-length p)) p)
             (type (field-pvar 1) s))
    (*when (zerop!! s) (*set p (!! 0)))))

(defun P1<-P2 (p1 p2)
  (*locally
    (declare (type (field-pvar (pvar-length p1)) p1)
             (type (field-pvar (pvar-length p2)) p2))
    (*set p1 p2)))

(defun P1<-P1+P2 (p1 p2)
  (*locally
    (declare (type (field-pvar (pvar-length p1)) p1)
             (type (field-pvar (pvar-length p2)) p2))
    (*set p1 (+!! p1 p2))))

(defun P1<-P1-P2 (p1 p2 &optional (diffun #'-!!))
  (*locally
    (declare (type (field-pvar (pvar-length p1)) p1)
             (type (field-pvar (pvar-length p2)) p2))
    (*set p1 (abs!! (*funcall diffun p1 p2)))))

(defun P1<-P1-MAX-P2 (p1 p2)
  (*locally
    (declare (type (field-pvar (pvar-length p1)) p1)
             (type (field-pvar (pvar-length p2)) p2))
    (*set p1 (max!! p1 p2))))

(defun P1<-P1-MIN-P2 (p1 p2)
  (*locally
    (declare (type (field-pvar (pvar-length p1)) p1)
             (type (field-pvar (pvar-length p2)) p2))
    (*set p1 (min!! p1 p2))))

;;
;; transfer utils
;;

(defun s<-0-multiple (lst)
  (loop for s in lst do (s<-0 s)))

(defun s1<-s2-list (l1 l2)
  (loop for s1 in l1 for s2 in l2 do (s1<-s2 s1 s2)))

;;;-----------------------------------------------------------------
;;; Scene summarization.

;; This function establishes hierarchical modes in sequence.

;; value-or-list is a value pvar or a list of value pvars.

(defun SELECT-VALUE-LIST
```

```
    (value pvar-list selected
     &key active (cond-pvars (circular-list nil))
     (method :variable) (diff-fun '-!!)
     (slop default-similarity-scale-factor))
  (declare (special selected active value pvar-list slop method diff-fun))
  (let-s (temp temp1)
    (s<-0 selected)
    (loop for value-pvar in pvar-list
        for cond-pvar in cond-pvars do
     (s1<-s2 temp1 active)
     (if cond-pvar (s1<-s1*s2 temp1 cond-pvar))
     (select-value value value-pvar temp :active temp1
         :method method :diff-fun diff-fun :slop slop)
     (s1<-s1+s2 selected temp))))
(defvar default-selection-termination-steps 5)
(defvar default-selection-termination-factor 0.05)
(defun LIST-MODES
     (value-or-list selected
      &key
      (diff-fun '-!!)
      (method :variable)
      (steps default-selection-termination-steps)
      (slop default-similarity-scale-factor)
      (cutoff default-selection-termination-factor)
      (cond-pvars (circular-list nil)))
  (declare (special value-or-list selected cond-pvars cutoff steps slop method diff-fun))
  (let ((vlist (if (listp value-or-list) value-or-list (list value-or-list)))
      (total 0) (modes ()) (counts ()) (step 0))
    (declare (special vlist total modes counts step))
    (let-s (active temp)
     (s1<-s2 active selected)
     (let ((remaining (readout-sum active active)) mode count)
       (declare (special remaining mode count))
       (setq total remaining)
       (loop while (and (> (/ remaining total) cutoff) (< step steps)) do
         (setq step (1+ step))
         (setq mode (readout-mode-list vlist active 0 :fixed))
         (push mode modes)
         (select-value-list
           mode vlist temp
           :active selected :cond-pvars cond-pvars
           :method method :diff-fun diff-fun :slop slop)
         (s1<-s1-s2 active temp)
         (setq count (readout-sum temp temp))
         (push count counts)
         (setq remaining (readout-sum active active))))
      (list (reverse modes) (reverse counts)))))
;;;------------------------------------------------------------
;;; Component labeling.
;; This function implements the basic coloring process.

(defun SPREAD-BY-CHUNKS
     (active mvl figure &optional disp? step?
      &aux (nullv (1+ top-chunking-level)))
  (*locally
    (declare (type (field-pvar 1) active figure)
          (type (field-pvar (pvar-length mvl)) mvl))
    (let ((top-level (*max (value-when!! mvl (not=0!! mvl (!!f nullv))))))
      (*let ((ftemp (!! 0)) (ptemp (!! 0)))
```

```
(declare (type (field-pvar 1) ftemp ptemp))
(*set ftemp figure)
(loop for I from 1 to top-level do
  (*when (valid-level?? I mvl)
    (*set ftemp
      (or01!! (child-ref!! ftemp 1 I)
        (child-ref!! ftemp 2 I)))))
(loop for I from top-level downto 1 do
  (*when (valid-level=?? I mvl) (*set ptemp ftemp))
  (*let ((ctemp (child-ref!! ptemp 2 I)))
    (declare (type (field-pvar 1) ctemp))
    (setf (child-ref!! ptemp 2 I) (or01!! ptemp ctemp))))
(*set figure (or01!! figure (and01!! ptemp active))))))))
;; a1, a2, and RESULT are binary pvar. pixels in a1 adjacent to pixels
;; of a2 are set to 1 in RESULT. Other pixels are set to 0 in result.
(defun FILTER-ADJACENT (a1 a2 result)
  (let-s (c2)
    (s1<-s2 c2 a2)
    (s<-s- c2)
    (filter-edges c2 c2)
    (s1<-s1*s2 c2 a1)
    (s1<-s2 result c2)))
;; This functions colors a connected component from one or more seed
;; locations in figure. Note that it computes the
;; maximum valid level for the given selected set, and pass the result
;; to SPREAD-BY-CHUNKS.
(defun COLOR-FROM-SEED
    (selected figure &key (start-level 0) disp? step?)
  (declare (special selected figure start-level disp? step?))
  (let-s (active new)
    (let-p (maxl-valid)
      (s1<-s2 active selected)
      (if (zerop (readout-max active figure))
        (s<-s- active))
      (label-valid-scale active maxl-valid start-level)
      (filter-adjacent active figure new)    ;display purpose only
      (loop while (plusp (readout-sum new active)) do
        (spread-by-chunks active maxl-valid figure disp? step?)
        (s1<-s1-s2 active figure)
        (filter-adjacent active figure new)))))
```

What is claimed is:

1. A method of analyzing a body of data that includes a plurality of data items; the method being performed by operating a system that includes memory and a processor connected for accessing the memory; the method comprising steps of:

storing in the memory the data items of the body of data; and operating the processor to produce a hierarchy of data items, the hierarchy including the data items of the body of data as a lowest level and at least one higher level of aggregative data items, each higher level having a respective next lower level, each level of the hierarchy have a respective number of data items:

the step of operating the processor to produce the hierarchy comprising, for each of the higher levels, a respective substep of producing each aggregative data item of the level by operating on a respective group of the data items of the respective next lower level, each aggregative data item of the level being for indicating an attribute of a respective group of the data items of the lowest level;

the respective number of aggregative data items of a first one of the higher levels being not substantially less than the respective number of data items of the next lower level.

2. The method of claim 1 in which the body of data defines an image, each data item indicating an attribute of a respective region of the image, the respective region of each aggregative data item including the respective regions of each data item in the respective group of the data items of the next lower level.

3. The method of claim 2 in which the higher levels of the hierarchy include a second level of the aggregative data items, a first one of the aggregative data items of the second level indicating that a geometric structure occurs in its respective region, the method further comprising a step of operating the processor to produce geometric data indicating the geometric structure by operating on the aggregative data items of the second level.

4. The method of claim 3 in which the higher levels of the hierarchy include a top level, all of the levels of the hierarchy except the top level having a next higher level, the second level being the top level.

5. The method of claim 2 in which the image has a plurality of pixels, each of the data items of the body of data including a pixel value for a respective one of the pixels of the image.

6. The method of claim 1 in which the respective number of aggregative data items of the first higher level is equal to the respective number of data items of the respective next lower level.

7. The method of claim 1 in which the data items at each level of the hierarchy form an array having a dimension, the data items in the respective group being separated from each other in the dimension by a power-of-two offset.

8. The method of claim 1 in which the data items at each level form a two-dimensional array having first and second dimensions, the levels of the hierarchy including alternating first and second types of levels; the data items in the respective group on each level of the first type being separated from each other by a power-of-two offset in the first dimension; the data items in the respective group on each level of the second type being separated from each other by a power-of-two offset in the second dimension.

9. The method of claim 1 in which the respective substeps of producing the aggregative data items for the higher levels of the hierarchy are performed in a sequence, the substep of producing the aggregative data items for the first higher level being, in the sequence, subsequent to the substep of producing the data items for the respective next lower level.

10. The method of claim 9 in which the respective substep of producing the aggregative data items for the first higher level comprises a substep of encoding the data items for the first higher level.

11. A system for analyzing a body of data that includes a plurality of data items; the system comprising: memory for storing the data items of the body of data; and
a processor connected for accessing the data items stored in the memory, the processor further being for producing a hierarchy of data items, the hierarchy including the data items of the body of data as a lowest level and a series of higher levels of aggregative data items, each of the higher levels having a respective next lower level, each level of the hierarchy having a respective number of data items;
the processor producing each of the higher levels of the hierarchy by producing each aggregative data item of the level by operating on a respective group of the data items of the respective next lower level, each aggregative data item of the level indicating an attribute of a respective group of the data items of the lowest level;
the respective number of aggregative data items of a first one of the higher levels being not substantially less than the respective number of data items of the next lower level.

12. The system of claim 11 in which the body of data defines an image, each data item indicating an attribute of a respective region of the image, the respective region of each aggregative data item including the respective regions of the respective group of the data items of the next lower level.

13. The system of claim 12 in which the higher levels of the hierarchy include a second level of the aggregative data items, a first one of the aggregative data items of the second level indicating a geometric structure that occurs in its respective region, the processor further being for operating on the aggregative data items of the second level to produce geometric data indicating the geometric structure of the image.

14. The system of claim 12 in which the image has a plurality of pixels, the data items of the body of data including, for each of the pixels of the image, a respective data item, the respective data item including a respective pixel value.

15. The system of claim 14 in which the respective next lower level of the first higher level of the hierarchy is the lowest level with the respective data items that include the respective pixel values for the pixels, the first higher level including a respective first level aggregative data item for a first one of the pixels; the processor comprising a plurality of processing units including a first respective processing unit for the first pixel; the first respective processing unit of the first pixel producing the first pixel's respective first level aggregative data item by operating on a respective group of pixel values from the respective data items of the lowest level, the respective group including the first pixel's respective pixel value.

16. The system of claim 15 in which the respective group includes only the first pixel's respective pixel value and a second pixel's respective pixel value.

17. The system of claim 15 in which the hierarchy of levels includes a second one of the higher levels, the respective next lower level of the second higher level being the first higher level, the second higher level including a respective second level aggregative data item for the first pixel; the processor further being for producing the first pixel's respective second level aggregative data item by operating on a respective group of data items from the first higher level, the respective group including the first pixel's respective first level aggregative data item.

18. The system of claim 17 in which the first higher level includes a respective first level aggregative data item for a third pixel, the respective group including only the first pixel's respective first level aggregative data item and the third pixel's respective first level aggregative data item.

19. The system of claim 17 in which the plurality of processing units further includes, for the first pixel, a second respective processing unit; the first pixel's second respective processing unit producing the first pixel's respective second level aggregative data item by operating on the first pixel's respective first level aggregative data item.

20. The system of claim 19 in which the first pixel's first respective processing unit produces the first pixel's first respective aggregative data item by operating on the respective pixel values of the first pixel and of a second pixel and the first pixel's second respective processing unit produces the first pixel's second respective aggregative data item by operating on the first pixel's first respective aggregative data item and on another aggregative data item of the first higher level.

21. The system of claim 14 in which each of the higher levels of the hierarchy includes a respective aggregative data item for a first one of the pixels, the processor comprising a plurality of processing units including a first pixel processing unit for the first pixel; the first pixel processing unit producing the first pixel's respective aggregative data item at each of the higher levels of the hierarchy by operating on a respective group of data items from the respective next lower level.

22. The system of claim 21 in which the respective group includes the first pixel's respective data item at the respective next lower level.

23. The system of claim 22 in which the respective group further includes only one additional data item at the respective next lower level other than the first pixel's respective data item.

24. The system of claim 23 in which the additional data item is a respective data item of a paired pixel that is separated from the first pixel by a power-of-two offset in the image.

25. The system of claim 14 in which each of the higher levels of the hierarchy includes a respective aggregative data item for each of the pixels, the processor comprising a plurality of processing units including a respective processing unit for each of the pixels; the respective processing unit producing each pixel's respective aggregative data item at each of the higher levels of the hierarchy by operating on a respective group of data items from the respective next lower level.

26. The system of claim 25 in which, for each pixel, the respective group of data items from the respective next lower level includes the pixel's respective data item at the respective next lower level and at most one additional data item from the respective next lower level.

27. The system of claim 26 in which, for each pixel whose respective group includes one additional data item, the additional data item is a respective data item of a paired pixel, the paired pixel being separated from the pixel by a power-of-two offset in the image.

28. The system of claim 11 in which the respective number of aggregative data items of the first higher level is equal to the respective number of data items of the next lower level.

29. The system of claim 11, further comprising an image input device for receiving input image data defining an image, the body of data being the input image data.

30. The system of claim 11, further comprising an image output device for providing an output image and a user input device for receiving signals from a user requesting modifications in the output image to produce a modified image, the body of data being data defining the modified image.

31. A method of operating a system that includes a plurality of processing units and, for each processing unit, respective local memory, each processing unit being connected for accessing its respective local memory, the processing units being connected for communication; the method comprising steps of:
    storing in the respective local memory of each of the processing units a respective lowest level data item, the respective lowest level data items together forming a body of data; and
    producing a hierarchy of data items, the hierarchy including the data items of the body of data as a lowest level and at least one higher level of aggregative data items, each higher level having a respective next lower level, each level of the hierarchy having a respective number of data items; the step of producing the hierarchy comprising, for each higher level, substeps of:
        operating each of the processing units to produce a respective aggregative data item of the higher level by operating on a respective group of the data items of the respective next lower level; each aggregative data item of the respective higher level indicating an attribute of the respective group of the data items of the respective next lower level; and
        operating each of the processing units to store the respective aggregative data item produced by each processing unit in its local memory;
    the substep of operating each of the processing units to produce a respective aggregative data item comprising a substep of communicating with a connected processing unit to obtain a first one of the respective group of the data items, the first one of the respective group of data items being stored in the local memory of the connected processing unit; the respective number of aggregative data items of each of the higher levels being equal to the respective number of data items of the lowest level.

32. The method of claim 31 in which the processing units are connected to form a hypercube network, the substep of communicating comprising a substep of communicating through the hypercube network.

33. A method of operating a system that includes memory and a processor connected for accessing the memory, the method comprising steps of:
    storing in the memory a body of data defining an image that includes a plurality of pixels, the body of data including a plurality of data items, each including a pixel value for a respective one of the pixels; and
    operating the processor to produce a dense hierarchy of levels of attribute data items by operating on the data items in the body of data, each attribute data item indicating an attribute of a respective region of the image; the levels further including a lowest level and a sequence of higher levels, each of the higher levels having a respective next lower level in the hierarchy; each level of the hierarchy having a respective number of attribute data items; the step of operating the processor comprising substeps of:
        operating on each of the data items in the body of data to produce a respective starting attribute data item for each pixel, the lowest level of the hierarchy including the respective starting attribute data items; and
        for each of the higher levels, producing each attribute data item of the level by combining a respective set of the attribute data items of the respective next lower level; the respective number of attribute data items of each of the higher levels being not substantially less than the respective number of attribute data items of the respective next lower level.

34. The method of claim 33 in which the respective number of attribute data items of each of the higher levels is equal to the respective number of data items of the respective next lower level.

35. The method of claim 33 in which each pixel's respective starting attribute data item is equal to the pixel's respective pixel value.

36. The method of claim 33 in which each pixel has a set of neighboring pixels, each pixel's respective starting attribute data item indicating whether the image includes an edge between the pixel and any of its neighboring pixels, the substep of operating on each of the data items in the body of data comprising a substep of operating on each pixel's respective data item and on the respective data item of each of the pixel's neighboring pixels to produce the pixel's respective starting attribute data item.

37. The method of claim 33 in which each attribute data item is a number; each substep of producing each attribute data item comprising adding the attribute data items in the respective set of the attribute data items of the next lower level.

38. The method of claim 33 in which the higher levels of the hierarchy include alternating first and second types of levels, the substep of producing each attribute data item comprising, for each of the first type of level, producing each attribute data item by operating on a respective set of data items from the next lower level that includes only one respective data item, the next lower level being of the second type of level; each attribute data item at one of the higher levels of the first type being the same as the one respective data item included in its respective set of data items from the next lower level.

39. The method of claim 38 in which the image has a first dimension and a second dimension, the respective region of each attribute data item in the hierarchy being a slice extending in the first dimension.

40. A method of operating a system that includes a plurality of processing units and, for each processing unit, respective local memory, each processing unit being connected for accessing its respective local memory; the method comprising steps of:

storing in the respective local memory of each of the processing units a respective lowest level data item, the respective lowest level data items together forming a body of data; and producing a hierarchy of data items, the hierarchy including the data items of the body of data as a lowest level and a plurality of higher levels of data items, each higher level having a respective next lower level; the lowest level being the respective next lower level of one of the higher levels;

the step of producing the hierarchy comprising, for each of the higher levels, a substep of operating each of the processing units to produce a respective data item of the higher level by operating on a respective set of the data items of the respective next lower level; each data item of the respective higher level indicating an attribute of the respective set of the data items of the respective next lower level; the attribute being a binary attribute having a first value and a second value; each processing unit producing a respective sequence of data items, the respective sequence including one data item for each of the higher levels; each respective sequence including at most one transition from the first value to the second value; the respective sequence of a first one of the processing units including a transition from the first value to the second value between first and second ones of the levels;

the step of producing the hierarchy further comprising a substep of operating the first processing unit to store level data indicating the transition from the first value to the second value between the first and second levels.

41. The method of claim 40 in which the level data indicates that the first level is the highest level at which the binary attribute has the first value.

42. The method of claim 40 in which the body of data defines an image, each respective lowest level data item including a pixel value for a respective pixel of the image.

43. The method of claim 42 in which the data items of each of the higher levels are aggregative data items, each of the aggregative data items indicating the binary attribute for a respective region of the image.

44. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels;

operating the processor to produce a hierarchy of levels of upward attribute data items by operating on the data items in the body of data, each upward attribute data item indicating an upward attribute of a respective region of the image; the levels further including a lowest level and a sequence of higher levels, each of the higher levels having a respective next lower level in the hierarchy; each level of the hierarchy having a respective number of upward attribute data items; the respective number of upward attribute data items of each of the higher levels being not substantially less than the respective number of upward attribute data items of the respective next lower level; and for a first one of the higher levels in the hierarchy, operating the processor to produce a number of downward attribute data items at a second level in the hierarchy by operating on a respective set of the upward attribute data items of the first higher level, the second level being the respective next lower level of the first higher level, each downward attribute data item indicating a downward attribute of a respective region of the image; each of the upward attribute data items of the second level having a respective one of the downward attribute data items.

45. The method of claim 44 in which the step of operating the processor to produce the downward attribute data items comprises a substep of operating on each of the upward attribute data items of the second level and on the respective set of the upward attribute data items of the first higher level, the method further comprising a step of replacing each upward attribute data item of the second level in the hierarchy with its respective downward attribute data item.

46. The method of claim 45 in which each of the respective sets of the upward attribute data item of the first higher level includes respective first and second ones of the upward attribute data items, the substep of operating on each of the upward attribute data items of the second level comprising substeps of:

operating on each upward attribute data item and on its respective first upward attribute data item to produce a respective preliminary downward attribute data item; and operating on each respective preliminary downward attribute data item and on the respective second upward attribute data item to produce the respective downward attribute data item.

47. The method of claim 44 in which the second level is one of the higher levels, the method further comprising a step of operating the processor to produce a number of downward attribute data items at a third level in the hierarchy by operating on a respective set of the downward attribute data items of the second level, the third level being the respective next lower level of the second level; each downward attribute data item at the third level indicating a downward attribute of a respective region of the image; each of the upward attribute data items at the third level having a respective one of the downward attribute data items at the third level.

48. The method of claim 44 in which each of the upward attribute data items at the first higher level includes a respective value of the attribute, each respective set of the upward attribute data items including a maximum data item whose respective value is a maximum of the respective values of the data items in the respective set; the step of operating the processing unit to produce the downward attribute data items comprising a substep of producing each downward attribute data item so that it includes a respective value of the attribute that is equal to the respective value of the maximum data item.

49. The method of claim 44 in which each of the upward attribute data items at the first higher level includes a respective value of the attribute, each respective set of the upward attribute data items including a minimum data item whose respective value is a minimum of the respective values of the data items in the respective set; the step of operating the processing unit to produce the downward attribute data items comprising a substep of producing each downward attribute data item so that it includes a respective value of the attribute that is equal to the respective value of the minimum data item.

50. The method of claim 44 in which each of the upward attribute data items at the first higher level includes a respective value of the attribute; the step of operating the processing unit to produce the downward attribute data items comprising a substep of producing each downward attribute data item so that it includes a respective value of the attribute that is a central value selected from the respective values of the attribute in the upward attribute data items.

51. The method of claim 44 in which the respective region of a first one of the upward attribute data items at the first higher level meets a criterion, the respective set of upward attribute data items of a second one of the downward attribute data items including the first upward attribute data item; the step of operating the processing unit to produce the downward attribute data items comprising a substep of producing the second downward attribute data item so that it indicates the attribute of the respective region that meets the criterion.

52. The method of claim 51 in which the criterion is that the respective region be included in a component for which a value for the attribute has been produced.

53. The method of claim 52 in which the attribute is orientation, the value for orientation being produced if the component includes a sufficient number of pixels.

54. A method of operating a system that includes memory and a processor connected for accessing the memory, the method comprising steps of:
storing in the memory a body of data that includes a plurality of data items, each including one of a set of respective values; and
operating the processor to produce a first hierarchy of levels of prominent value data items by operating on the data items in the body of data, each prominent value data item including one of the respective values and a count; the levels further including a lowest level and a sequence of higher levels, each of the higher levels having a respective next lower level in the first hierarchy; the step of operating the processor comprising substeps of:
operating on each of the data items in the body of data to obtain a respective starting prominent value data item for each data item in the body of data, each data item's respective starting prominent value data item including the data item's respective value; the lowest level of the first hierarchy including the respective starting prominent value data items; and
for each of the higher levels, producing each prominent value data item of the higher level by combining a respective set of the prominent value data items of the respective next lower level, each prominent value data item including one of the respective values from the prominent value data items in the respective set, the count in each prominent value data item being produced by operating on the counts in the prominent value data items in the respective set.

55. The method of claim 54 in which the data items of the body of data define an image, the respective value of each data item being a pixel value of a respective pixel of the image.

56. The method of claim 54 in which, for a first one of the prominent value data items at one of the higher levels, the substep of producing each prominent value data item comprises, if first and second ones of the prominent value data items in the respective set of prominent value data items of the respective next lower level are similar, a substep of adding the counts of the first and second next lower level prominent value data items to produce the count in the first higher level prominent value data item.

57. The method of claim 56 in which the count of the first next lower level prominent value data item is greater than the count of the second next lower level prominent value data item, the substep of producing each prominent value data item further comprising, if the first and second next lower level prominent value data items are not similar, a substep of producing the first higher level prominent value data item so that it includes the respective value and count of the first next lower level prominent value data item.

58. The method of claim 54 in which the count in each respective starting prominent value data item is one.

59. The method of claim 54 in which the first hierarchy includes a top level that does not have a next higher level, the top level including a top level prominent value data item that includes a top one of the respective values and a top level count, the method further comprising a step of producing the top respective value and the top level count from the top level prominent value data item.

60. The method of claim 59 in which the data items of the body of data include a subset of data items that have respective values other than the top respective value, the method further comprising a step of:
operating the processor to produce a second hierarchy of levels of prominent value data items by operating on the data items in the subset, each prominent value data item in the second hierarchy including one of the respective values other than the top respective value and a count; the levels further including a lowest level and a sequence of higher levels, each of the higher levels having a respective next lower level in the second hierarchy; the step of operating the processor to produce the second hierarchy comprising substeps of:

operating on each of the data items in the subset to produce a respective starting prominent value data item for each data item in the subset, each data item's respective starting prominent value data item including the data item's respective value; the lowest level of the second hierarchy including the respective starting prominent value data items; and for each of the higher levels, producing each prominent value data item of the higher level by combining a respective set of the prominent value data items of the respective next lower level, each prominent value data item including one of the respective values from the prominent value data items in the respective set, the count in each prominent value data item being produced by operating on the counts in the prominent value data items in the respective set.

61. The method of claim 54 in which the data items of the body of data define an image, each data item of the body of data including a pixel value for a respective pixel of the image; each of the prominent value data items indicating a prominent value of a respective region of the image.

62. A method of operating a system that includes memory and a processor connected for accessing the memory, the method comprising steps of:

storing in the memory a body of data defining an image that includes a plurality of pixels, the body of data including a plurality of data items, each including a pixel value for a respective one of the pixels; and operating the processor to produce a hierarchy of levels of first attribute data items by operating on the data items in the body of data, each first attribute data item indicating a first attribute of a respective region of the image; the levels further including a lowest level and a sequence of higher levels, each of the higher levels having a respective next lower level in the hierarchy; the step of operating the processor comprising substeps of:

operating on each of the data items in the body of data to produce a respective starting first attribute data item for each pixel, the lowest level of the hierarchy including the respective starting first attribute data items; the substep of operating on each of the data items in the body of data comprising, for each of the data items, a substep of operating on a set of data items that includes the data item and the respective data items of a number of neighborhood pixels to determine a respective neighborhood configuration; the data item's respective pixel and the neighborhood pixels together forming a respective neighborhood; the respective neighborhood configuration being a configuration of pixels of the respective neighborhood; and for each of the higher levels, producing each first attribute data item of the level by combining a respective set of the first attribute data items of the respective next lower level.

63. The method of claim 62 in which each respective neighborhood is a two pixel by two pixel neighborhood.

64. The method of claim 62 in which each of the respective neighborhood configurations is one of eight defined configurations.

65. The method of claim 62 in which each of the respective neighborhood configurations is one of a set of defined configurations, each of the first attribute data items indicating for each defined configuration a respective number of instances of the defined configuration that occur in the respective region; the substep of producing each higher level first attribute data item comprising a substep of, for each of the defined configurations, adding the respective numbers from the respective set of the first attribute data items of the respective next lower level.

66. The method of claim 62, further comprising a step of producing, for each of a set of the first attribute data items, a respective second attribute data item, each first attribute data item's respective second attribute data item indicating a second attribute of the first attribute data item's respective region.

67. The method of claim 66, further comprising a step of determining, for each of the first attribute data items, whether the first attribute data item is in the set of the first attribute data items.

68. The method of claim 67 in which each of the respective neighborhood configurations is one of a set of defined configurations, each of the first attribute data items indicating for each defined configuration a respective number of instances of the defined configuration that occur in the respective region; the step of determining whether the first attribute data item is in the set comprising substeps of:

combining the respective numbers of instances of a number of subsets of the defined configurations to produce a respective combined number of instances for each subset; the respective combined number of instances of each subset indicating a population in a respective zone of orientation; and finding the largest of the respective combined numbers of instances in order to identify the respective zone of orientation, the respective zone of orientation of the largest respective combined number of instances having a maximum population for the first attribute data item.

69. The method of claim 68 in which each of the respective zones of orientation is a quadrant.

70. The method of claim 68 in which each of the respective zones of orientation is an octant.

71. The method of claim 68 in which the step of determining whether the first attribute data item is in the set further comprises a substep of comparing the largest respective combined number of instances with a respective constant to determine whether the first attribute data item is in the set.

72. The method of claim 68 in which the combining substep produces first and second respective combined numbers of instances that indicate respective populations in the same respective zone of orientation, the largest respective combined number of instances being one of the first and second respective combined numbers of instances; the step of producing the respective second attribute data item comprising a substep of using the first and second respective combined numbers of instances to produce the respective second attribute data item.

73. The method of claim 72 in which the first respective combined number of instances indicates a displacement in an x-direction and the second respective combined number of instances indicates a displacement in a y-direction.

74. The method of claim 66 in which each of the respective neighborhood configurations is one of a set of defined configurations, each of the first attribute data items indicating for each defined configuration a respective number of instances of the defined configuration that occur in the respective region; the step of producing the respective second attribute data item comprising substeps of:

for each first attribute data item in the set of first attribute data items, combining the respective numbers of instances of first and second subsets of the defined configurations to produce respective first and second combined numbers of instances; the respective first combined number of instances of the first subset indicating a displacement in an x-direction and the respective second combined number of instances of the second subset indicating a displacement in a y-direction; and for each first attribute data item in the set of first attribute data items, using the respective first and second combined numbers of instances to produce the respective second attribute data item.

75. The method of claim 74 in which the substep of using the respective first and second combined numbers of instances comprises a substep of producing the respective second attribute data item so that the first attribute data item's respective second attribute data item indicates an orientation of a boundary in the first attribute data item's respective region.

76. The method of claim 66 in which each of the respective neighborhood configurations is one of a set of defined configurations, each of the first attribute data items indicating for each defined configuration a respective number of instances of the defined configuration that occur in the respective region; the step of producing the respective second attribute data item comprising substeps of:

for each first attribute data item in the set of first attribute data items, combining the respective numbers of instances of first and second subsets of the defined configurations to produce respective first and second combined numbers of instances; the respective first combined number of instances of the first subset indicating a displacement in an x-direction and the respective second combined number of instances of the second subset indicating a displacement in a y-direction;

for each first attribute data item in the set of first attribute data items, combining the respective numbers of instances of third and fourth subsets of the defined configurations to produce respective third and fourth combined numbers of instances; the respective third combined number of instances of the third subset indicating a displacement in an x-direction and the respective fourth combined number of instances of the fourth subset indicating a displacement in a y-direction; and for each first attribute data item in the set of first attribute data items, using the respective first, second, third, and fourth combined numbers of instances to produce the respective second attribute data item.

77. The method of claim 76 in which the substep of using the respective first, second, third, and fourth combined numbers of instances comprises a substep of producing the respective second attribute data item so that the first attribute data item's respective second attribute data item indicates a local orientation difference of a boundary in the first attribute data item's respective region.

78. The method of the claim 62 in which the pixel values have first and second types; the method further comprising, for a first one of the first attribute data items, a step of obtaining a count of pixels in the respective region whose respective pixel values have the first type, the count of pixels indicating a width of a component in the respective region.

79. A method of operating a system that includes memory and a processor connected for accessing the memory, the method comprising steps of:

storing in the memory a body of data defining an image that includes a plurality of pixels, the body of data including a plurality of data items, each for a respective one of the pixels; each pixel's data item including current selection data indicating whether the pixel is in a set of currently selected pixels; each pixel's data item further including first attribute data indicating a first attribute of the pixel;

operating the processor to produce a hierarchy of levels of upward attribute data items by operating on the data items in the body of data, each upward attribute data item indicating an upward attribute of a respective region of the image; the levels further including a lowest level and a sequence of higher levels, each of the higher levels having a respective next lower level in the hierarchy, one of the higher levels being a highest level, each of the levels other than the highest level having a respective next higher level; each level of the hierarchy having a respective number of upward attribute data items; the respective number of upward attribute data items of each of the higher levels being not substantially less than the respective number of upward attribute data items of the respective next lower level;

operating the processor to produce a hierarchy of levels of downward attribute data items by operating on the upward attribute data items at the highest level, each downward attribute data item indicating a downward attribute of a respective region of the image; the levels of the hierarchy of downward attribute data items being the same as the levels of the hierarchy of upward attribute data items; each downward attribute data item at the lowest level of the downward attribute data items indicating the downward attribute of a respective pixel of the image; and operating the processor to use the downward attribute data items at the lowest level in determining whether to set each pixel's current selection data to indicate that the pixel is in the set of currently selected pixels.

80. The method of claim 79 in which the step of operating the processor to produce the hierarchy of upward attribute data item comprises a substep of producing low and high limits of the upward attribute.

81. The method of claim 79 in which, prior to the step of operating the processor to produce the upward attribute data items, the current selection data of a first pixel indicates that the first pixel is in the currently selected set of pixels; the step of operating the processor to produce the hierarchy of upward attribute data items comprises a substep of producing the upward attribute data items of the highest level to indicate the upward attribute of the first pixel.

82. The method of claim 79 in which the step of operating the processor to produce the hierarchy of upward attribute data items comprises a substep of producing the upward attribute data items of the highest level to indicate a salient value of the upward attribute.

83. The method of claim 82 in which the salient value is a maximum value.

84. The method of claim 82 in which the salient value is a minimum value.

85. The method of claim 82 in which the salient value is a value with a large population compared to other values.

* * * * *